United States Patent [19]

Abbott et al.

[11] 4,330,885

[45] May 18, 1982

[54] PROTECTED MULDEM WITH IMPROVED MONITORING SYSTEM AND ERROR DETECTION

[75] Inventors: Ned E. Abbott, McKinney; Hampapur R. Keshavan, Dallas; Robert J. McGuire, Richardson, all of Tex.

[73] Assignee: Rockwell International Corporation, El Segundo, Calif.

[21] Appl. No.: 155,983

[22] Filed: Jun. 3, 1980

[51] Int. Cl.$^3$ .............................................. H04J 3/14
[52] U.S. Cl. ..................................................... 370/17
[58] Field of Search ....................... 370/17, 16, 41, 43, 370/84, 13, 14; 371/68, 69, 71, 5, 6, 24, 67; 178/2 R, 2 C; 179/18 EE, 175.3 S

[56] References Cited

U.S. PATENT DOCUMENTS

| | | | |
|---|---|---|---|
| 4,022,979 | 5/1977 | Smith | 370/14 |
| 4,156,110 | 5/1979 | Keeney et al. | 370/14 |
| 4,266,293 | 5/1981 | Anderson et al. | 370/16 |

*Primary Examiner*—Thomas A. Robinson
*Attorney, Agent, or Firm*—V. Lawrence Sewell; Howard R. Greenberg; H. Fredrick Hamann

[57] ABSTRACT

A muldem (100) has a monitor (101) for testing data path failures through the muldem (100) by comparing the latter's input and output. The monitor (101) includes comparing means (806, FIGS. 13a and b) with a data comparator (880, FIGS. 13b and 17) for bit error detection by comparision of a pair of data streams (A+B) processed through the monitor (101) from the input and output of the muldem (100). The data comparator (880) delays one of the data streams (A) by a fixed amount and variably delays the other data stream (B), and then slipshifts the data streams in time until they are in alignment to be compared. The data comparator (880) detects noncoincidences of bits in the two data streams and counts such errors over a given sampling interval, providing a bit error rate. If this rate is above a user selectable threshold, then a malfunction in the tested data path is probable, so the path is retested, using a longer sampling interval, to improve the statistical accuracy of the test. If the number of bit errors increases accordingly, then a malfunction is indicated and standby data path protective switching may be initiated. Return switching from standby back to the normally on-line main path is not permitted until the bit error rate drops below a second, lower threshold.

71 Claims, 30 Drawing Figures

INTERMEDIATE SPEED LBO/SWITCH

LOW SPEED LBO/SWITCH

FIG. 6  LOW SPEED INTERFACE - XMT  (LS INTFC)

LOW SPEED XMT COMMON
(LS XMT)

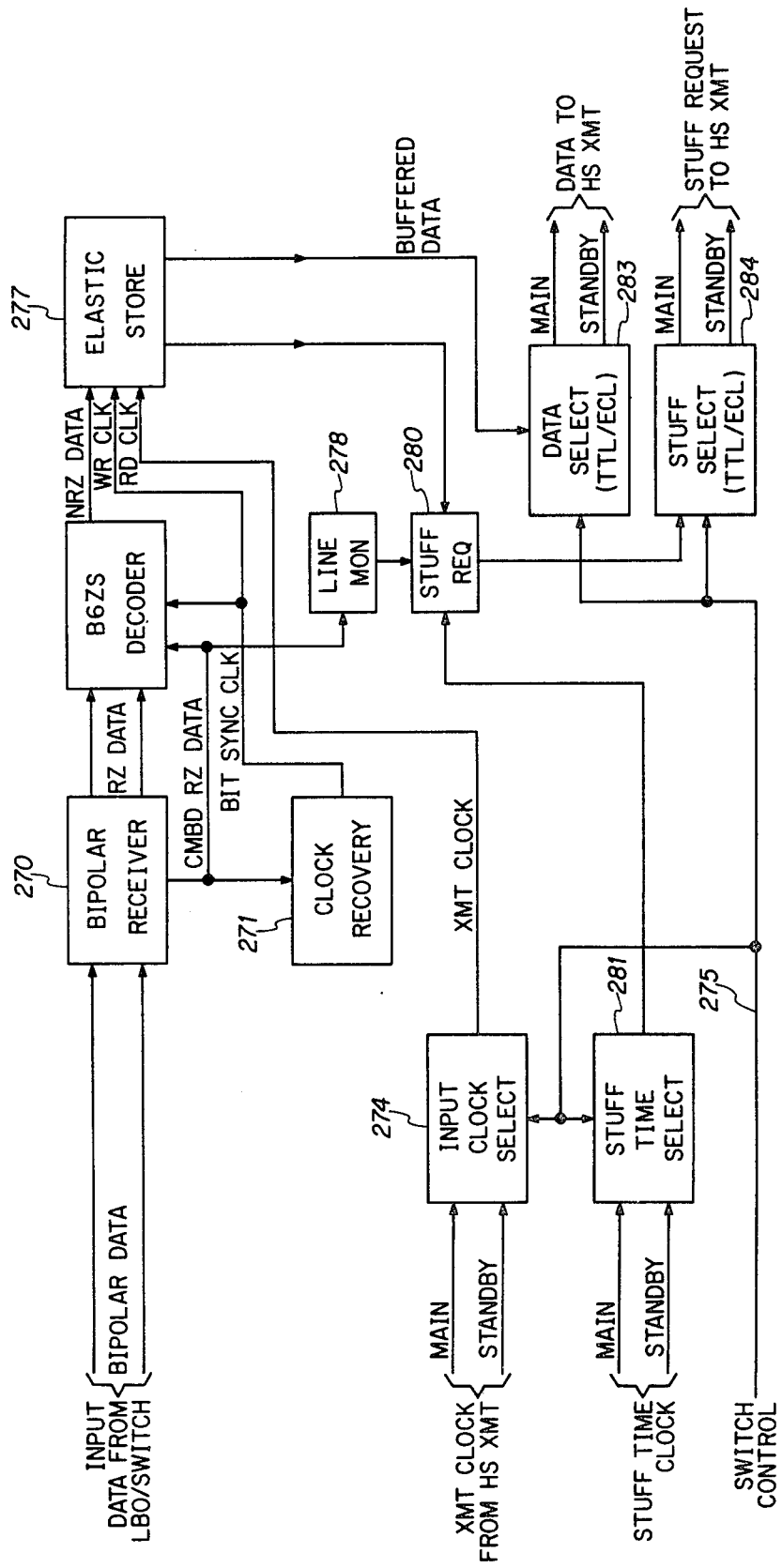
FIG. 8 INTERMEDIATE SPEED XMT INTERFACE (IS XMT INTFC)

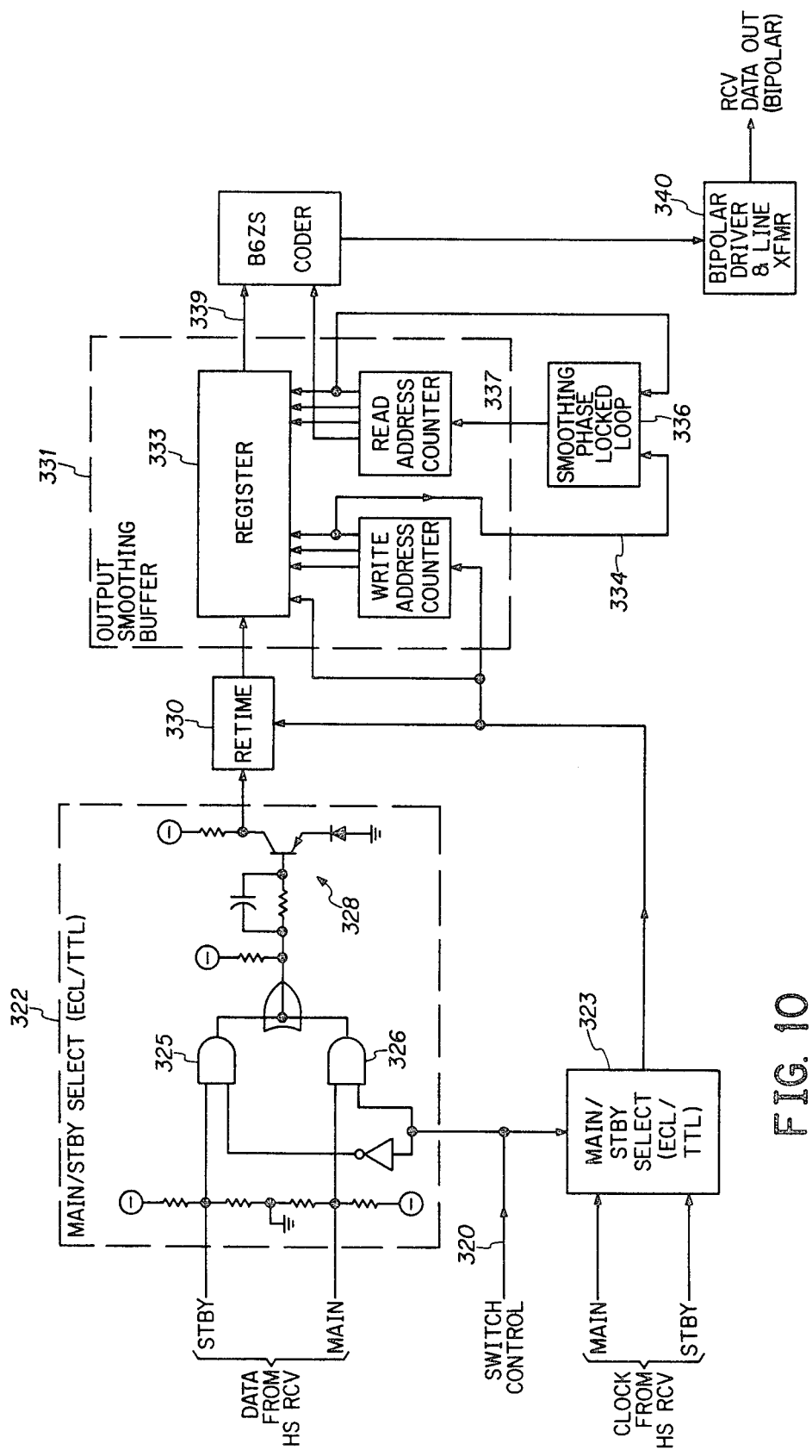
FIG. 10  INTERMEDIATE SPEED RCV INTERFACE  (IS RCV INTFC)

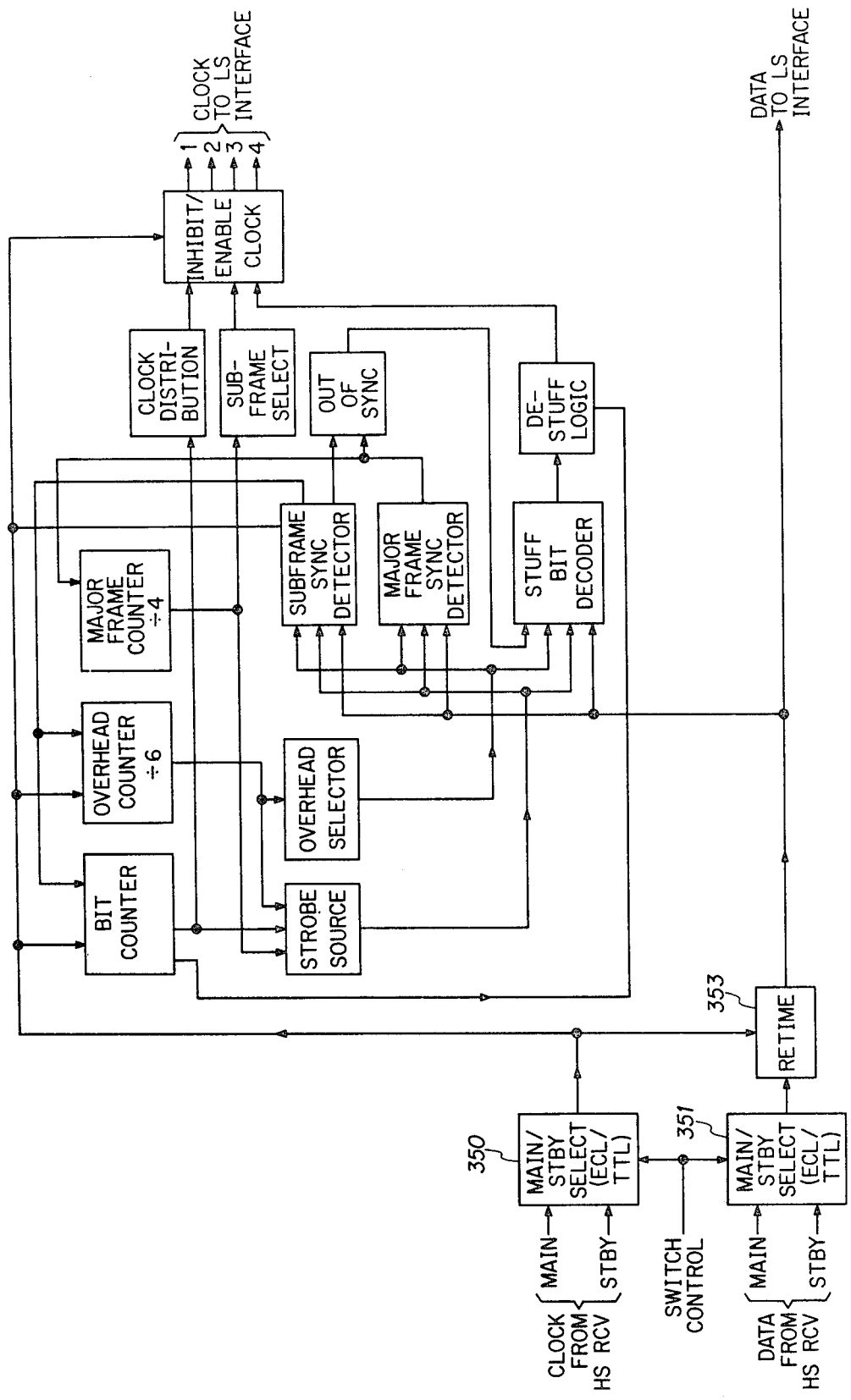

LOW SPEED INTERFACE – RCV (LS INTFC)

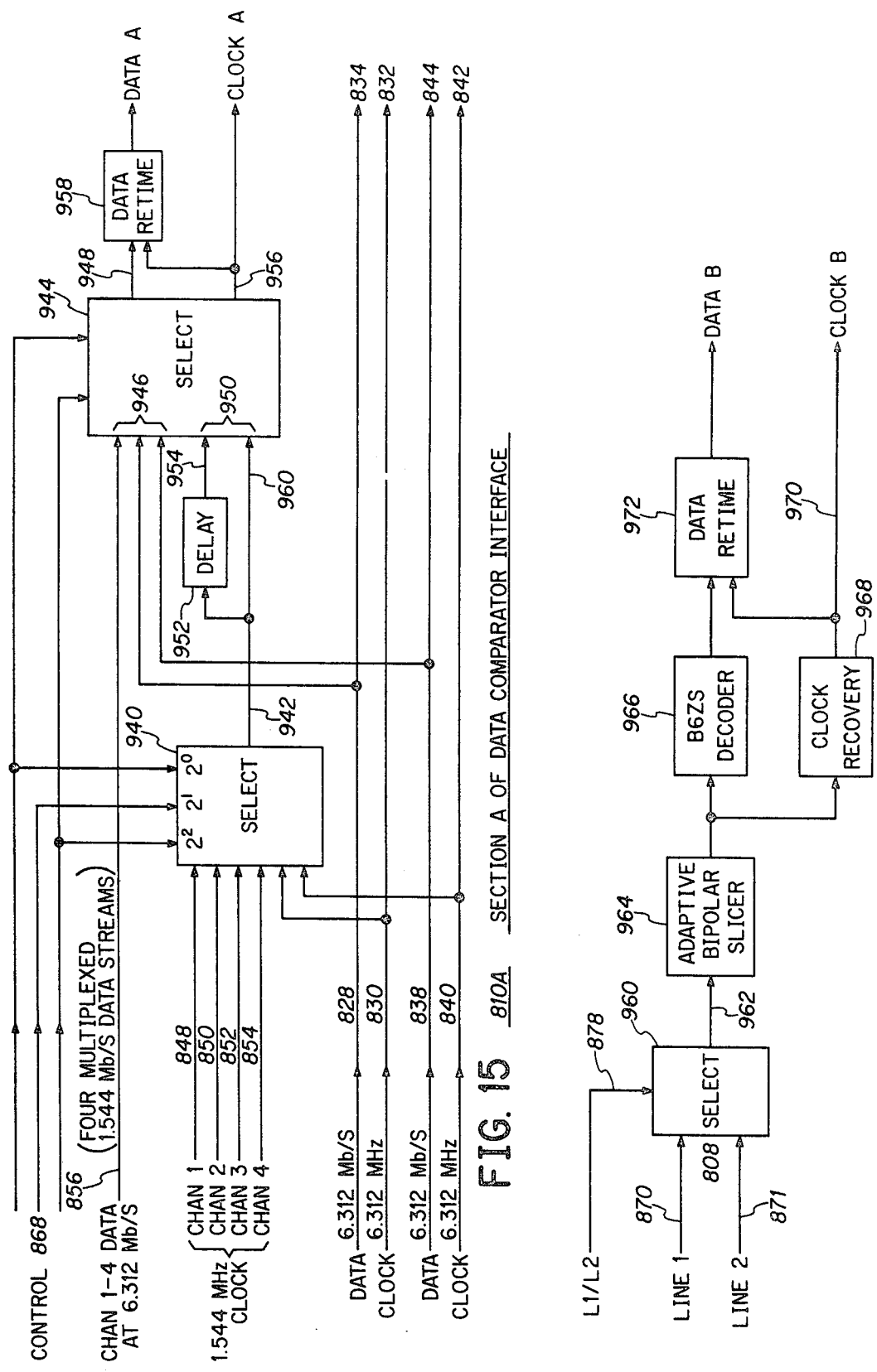
FIG. 15  810A  SECTION A OF DATA COMPARATOR INTERFACE
FIG. 16  810B  SECTION B OF DATA COMPARATOR INTERFACE

HIGH SPEED TRANSMIT INTERFACE

HIGH SPEED RECEIVE COMMON

FIG. 20 SWITCH TO HIGH SPEED STANDBY (XMT SECTION)

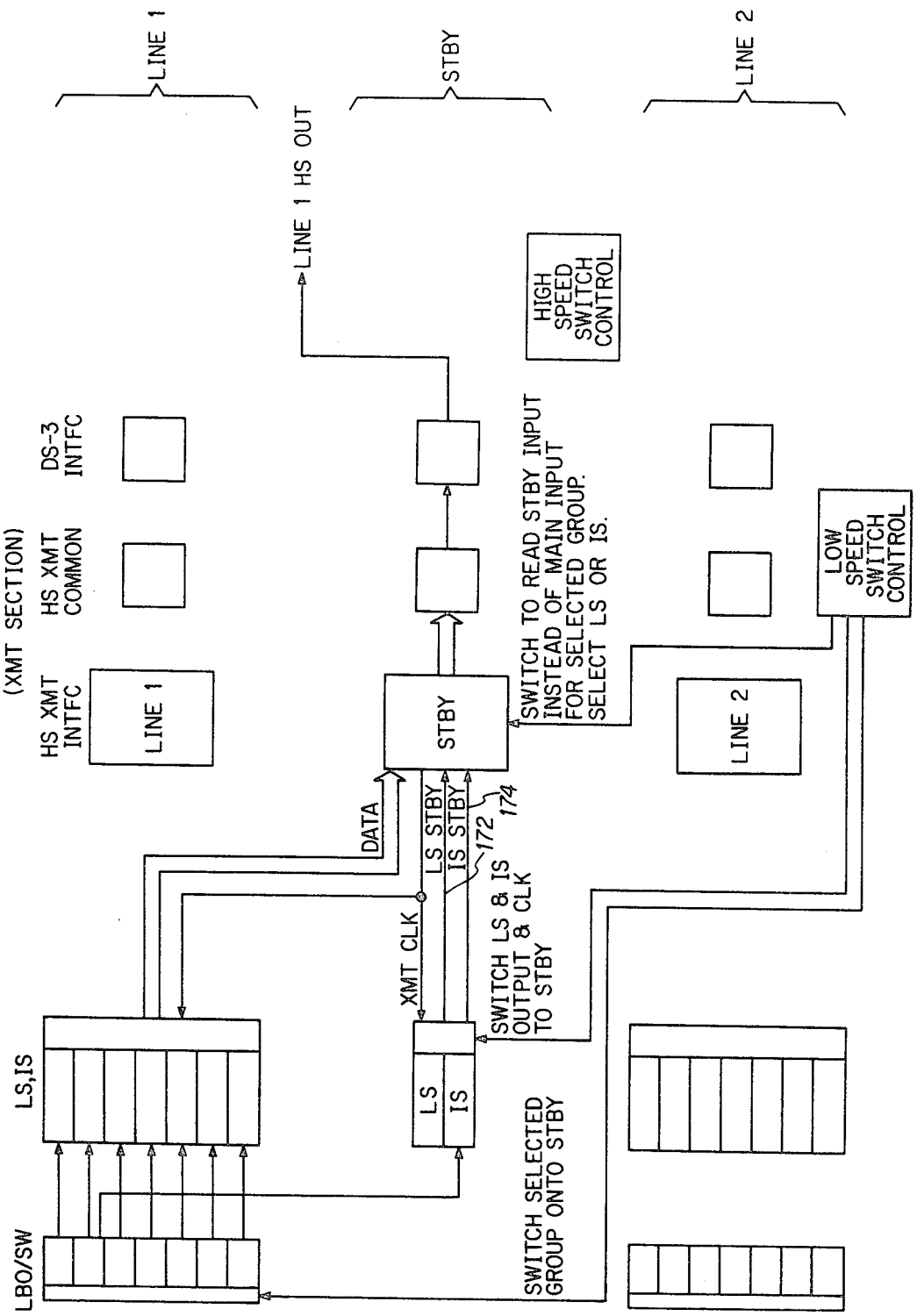

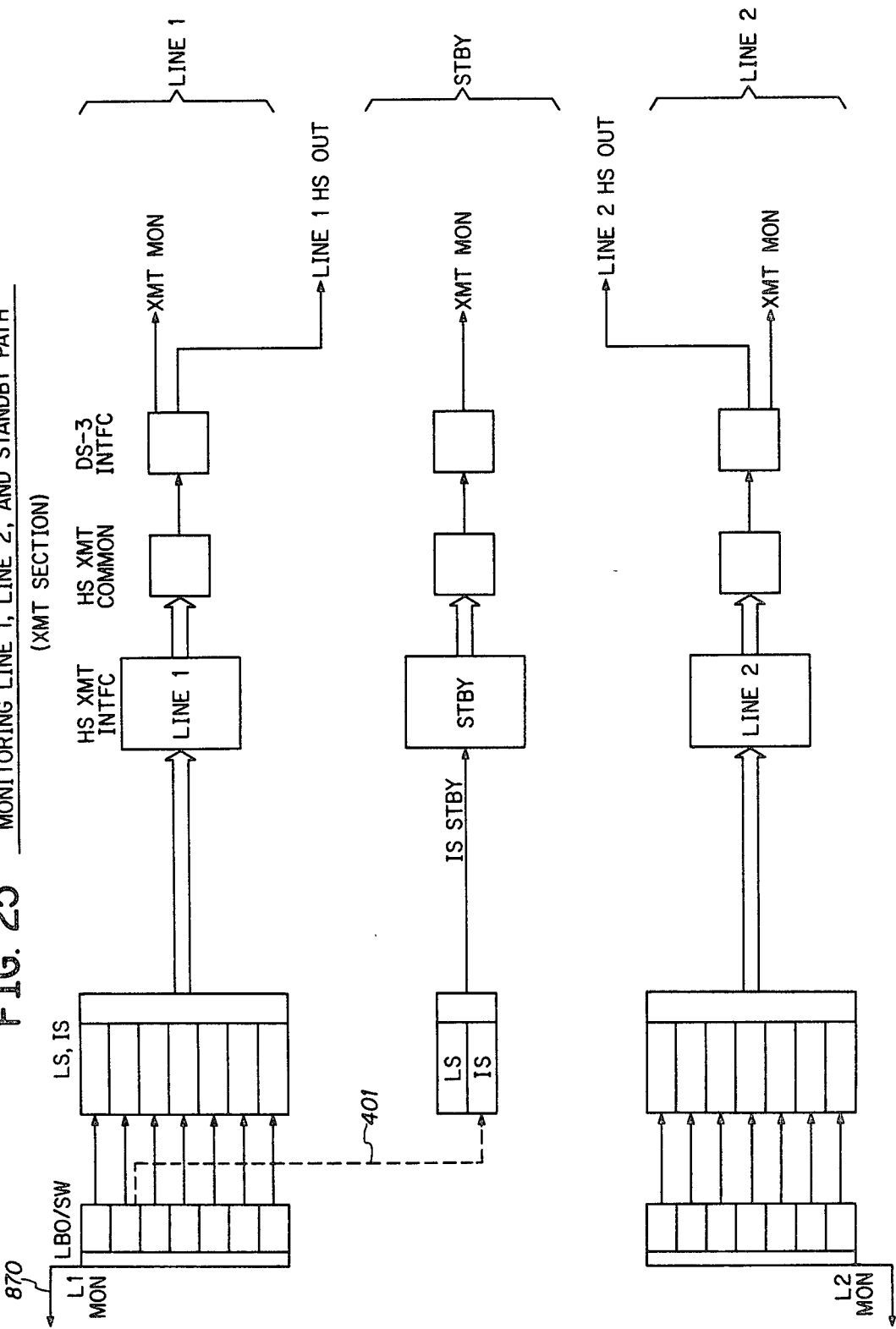

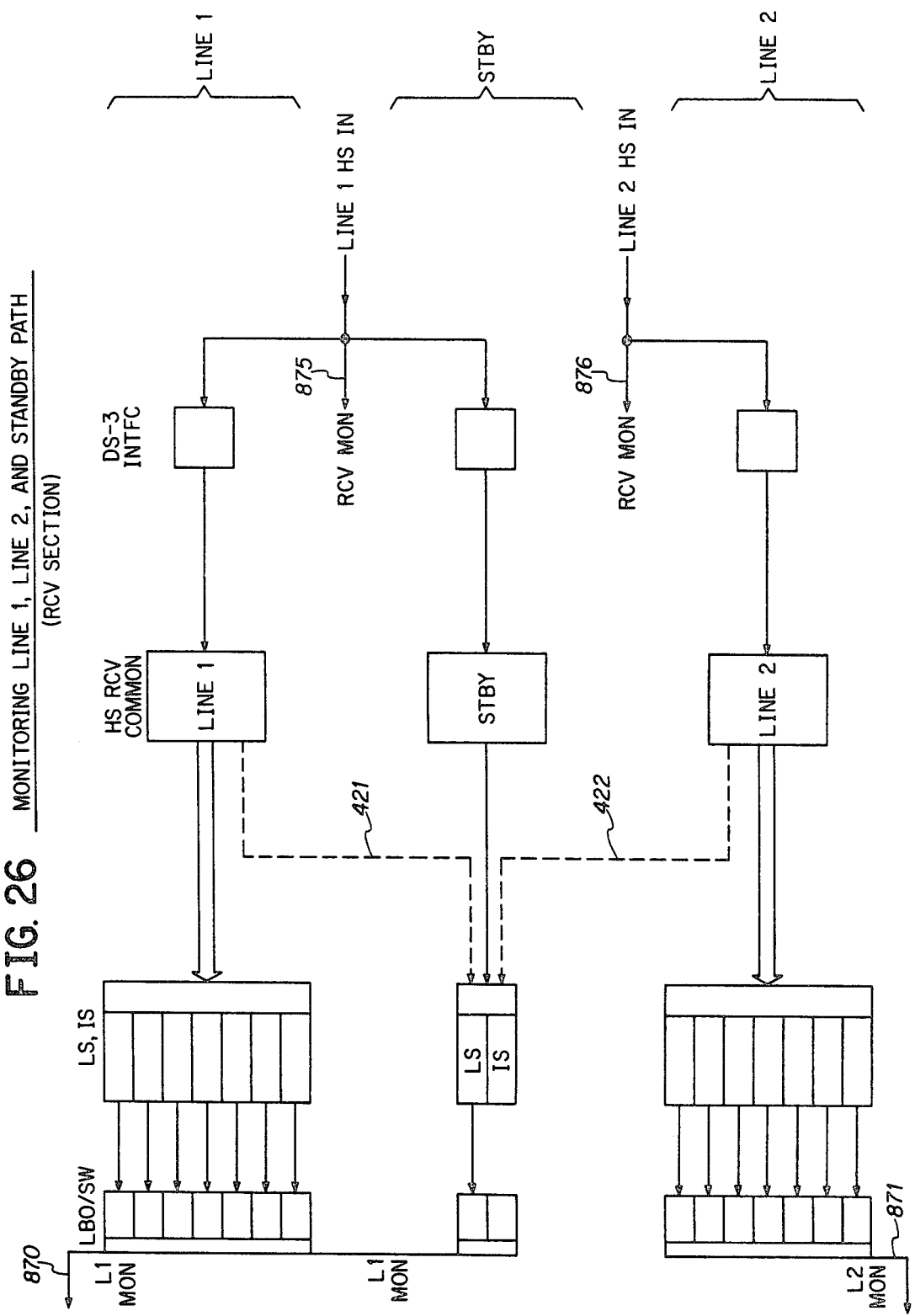

PROTECTED MULDEM WITH IMPROVED MONITORING SYSTEM AND ERROR DETECTION

SUMMARY OF THE INVENTION

The present invention provides a multiplexer, demultiplexer and muldem with an improved monitoring system for the detection of malfunctions. The monitor analyses the input and output of the muldem to ascertain whether there is a malfunction or failure in any of the data paths through the muldem which erroneously changes the data appearing at the output. The monitor includes comparing means for processing the data streams from the input and output of the muldem for comparison in a data comparator. The data comparator performs a bit error rate test by comparing the streams bit for bit and designating a malfunction condition above a user selectable threshold bit error rate. Standby data path protective switching means is provided for switching a normally on-line main data path to standby when a malfunction occurs. A lower threshold error rate is required before return switching from standby to main to ensure correction of the malfunction.

The monitor sequentially tests data paths through the muldem for a given short sampling time interval for each path. If the bit error rate for the currently tested path is above the user selectable threshold, then the same path is immediately tested over a longer sampling interval to verify the initial malfunction detection. These short and long sampling intervals enable quick sequential testing of all data paths through the muldem while also affording improved statistical accuracy of a malfunction detection.

BRIEF DESCRIPTION OF THE DRAWINGS

FIG. 8 is a block diagram of an Intermediate Speed Transmit Interface module for the muldem of FIG. 1.

FIG. 10 is a block diagram of an Intermediate Speed Receive Interface module for the muldem of FIG. 1.

FIG. 11 is a block diagram of a Low Speed Receive Common module for the muldem of FIG. 1.

FIG. 15 is a schematic circuit diagram showing section A of the Data Comparator Interface 810 of FIG. 13.

FIG. 16 is a schematic circuit diagram showing section B of the Data Comparator Interface 810 of FIG. 13.

FIG. 24 is a block diagram of the transmit section of the muldem of FIG. 1, illustrating a switch to the low-/intermediate speed standby unit after a preceding switch to the high speed standby unit.

FIG. 25 is a block diagram of the transmit section of the muldem of FIG. 1, illustrating monitoring of certain data paths.

FIG. 26 is a block diagram of the receive section of the muldem of FIG. 1, illustrating the monitoring of certain data paths.

DESCRIPTION OF THE PREFERRED EMBODIMENT

Figure 1:
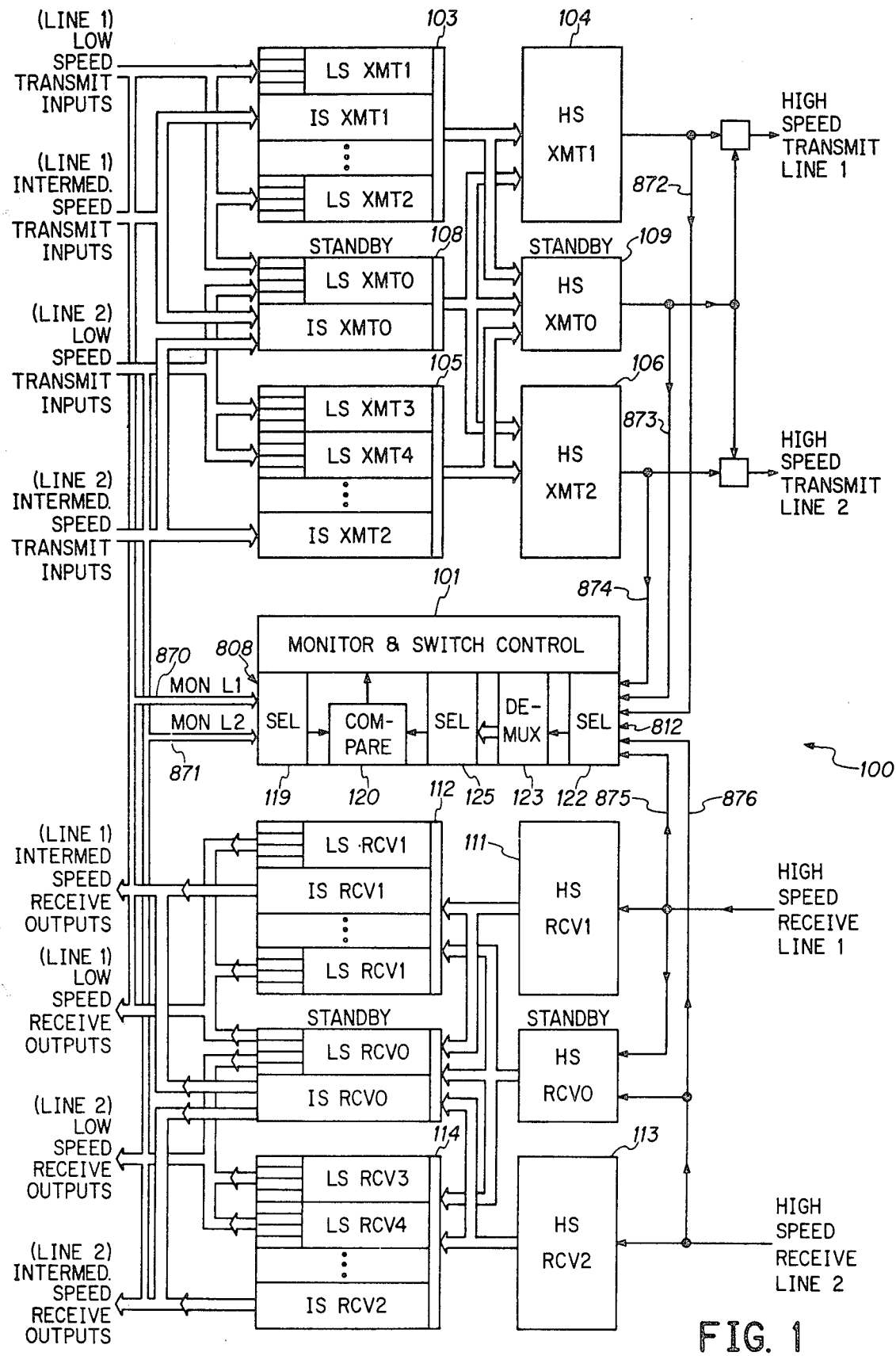
FIG. 1 is a general block diagram of a multiplexer/-demultiplexer (muldem) in accordance with the invention.

General Structure and Function (FIG. 1)

FIG. 1 shows a block diagram of a multiplexer/-demultiplexer system (or "muldem") according to the invention, indicated generally by the reference numeral 100. The upper part of the figure is devoted to the multiplexing section of the sytem, also referred to herein as the transmit section. The lower part of the figure is the demultiplexing or receive section. A monitor and switch control 101 monitors the various signal paths in the system for faults and automatically switches a standby unit in place of a failed unit.

There are three digital data rates of general interest in the system of the invention and corresponding to standard American Telephone & Telegraph Company bit rates. These are the 1.544 Mb/s rate, which is the telephone company T1 rate and referred to herein as the low speed or LS rate. The 6.312 Mb/s or T2 rate will be called the intermediate speed or IS rate. The 44.736 Mb/s or T3 rate will be called the high speed or HS rate in this application The invention is not limited to these particular rates, so the LS, IS and HS rates may assume other values.

In the preferred embodiment shown in FIG. 1, there are two high speed lines, Line 1 and Line 2. On the multiplexing side, associated with Line 1 there are a number of low speed and intermediate speed signal inputs which are multiplexed together by units 103 and 104 and transmitted at the high speed rate on Line 1. Similarly, a number of intermediate speed and low speed signals are multiplexed by units 105 and 106 and transmitted at the high speed rate on Line 2. Standby Low Speed and Intermediate Speed units 108 are automatically substituted for a low speed or intermediate speed path which fails in units 103 or 105. High speed standby unit 109 is automatically substituted for units 104 or 106 if one of them fails.

In the demultiplexing section of the system 100, data is received at the high speed rate on Line 1 and demultiplexed by units 111 and 112 into a number of intermediate and low speed outputs. Units 113 and 114 demultiplex the high speed data from Line 2 in a similar fashion. As in the multiplexing section of the system, low speed, intermediate speed and high speed standby units are provided for automatic switching to take the place of failed elements of the system.

Each of the units 103 and 105 may contain a number of input "groups", as represented in the figure by the blocks LS XMT1 and IS XMT1, among others. In a preferred embodiment, each of the units 103 and 105 can contain up to seven such groups. Individual input groups can remain unequipped, and in fact the whole of one of the units 103 or 105 can be unequipped.

Any one of the input groups can be a low speed group, receiving four low speed lines, or an intermediate speed group, receiving one intermediate speed line. In the preferred embodiment, the equipping of a group in the demultiplexing or receive section must be the same as the corresponding group in the transmit section.

The general operation of the monitor and switch control 101 is as follows. The monitor repeatedly tests, one at a time, each of the signal paths in the multiplexers and demultiplexers. For example, if the monitor is testing the intermediate speed path including IS XMT1 and HS XMT1, then selection circuit 119, under the control of the monitor, switches the input of intermediate speed path IS XMT1 to one input of compare circuit 120. Selection circuit 122, also under the control of the monitor, switches the output of HS XMT1 to be the input to demultiplexer 123. Demultiplexer 123 demultiplexes the high speed data from the transmit output of Line 1 back into the low speed and intermediate speed input formats of Line 1. Selector 125 connects those bits corresponding to the input of IS XMT1 to the second input of compare circuit 120.

Compare circuit 120 adjusts for the delays expected between the direct input from select circuit 119 and the input from select circuit 125 which has been multiplexed and demultiplexed. The compare circuit checks the input to intermediate speed circuits IS XMT1 against the corresponding portion of the demultiplexed data from the high speed output of Line 1, to see if there are any discrepancies between these two digital signals. If the comparator 120 counts a number of errors greater than a selected threshold, the monitor begins procedures to more closely identify the source of the fault and then to switch the appropriate standby circuit LS XMT0, IS XMT0 or HS XMT0 to protect the failed element.

Figure 2A:
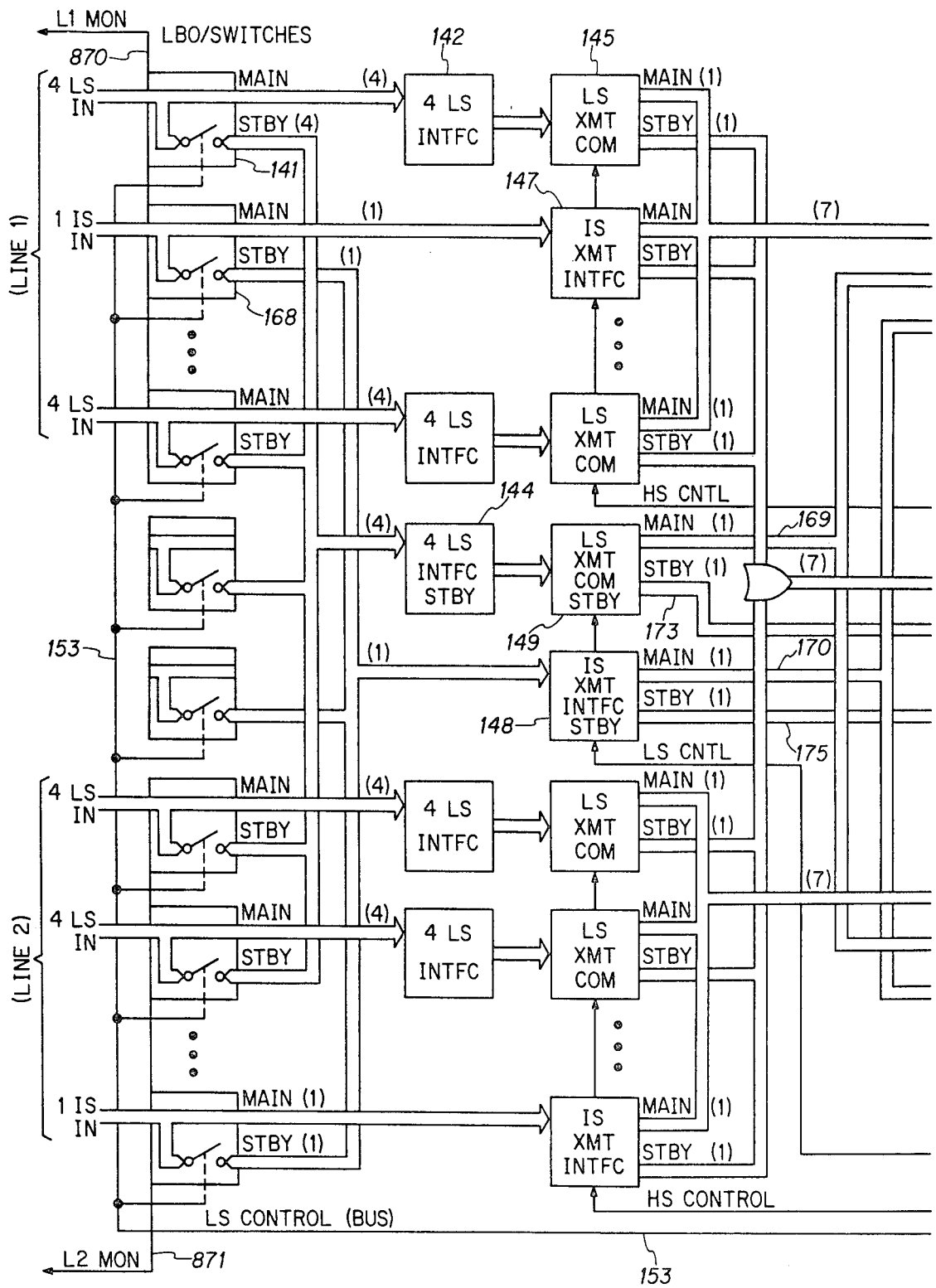
FIGS. 2a and 2b form a side-by-side composite block diagram showing the interconnection of elements of the multiplexer or transmit section of the muldem of FIG. 1.
Figure 2B:
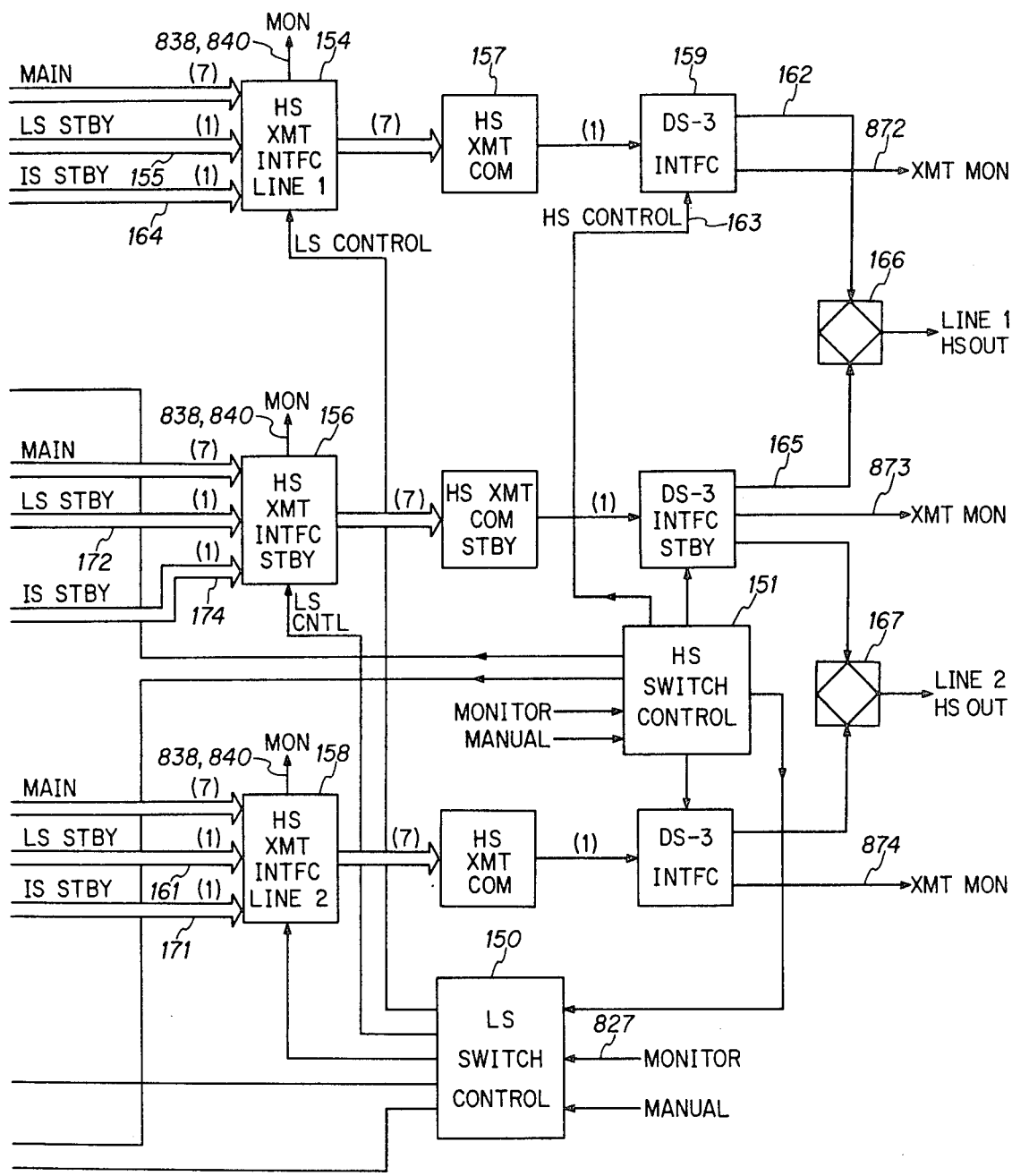

Multiplexer or Transmit Section-Low/Intermediate Speed Portion (FIG. 2)

FIG. 2 shows the transmit section of the multiplexer/demultiplexer system of the invention. Illustrative low speed and intermediate speed input groups are shown for both Line 1 and Line 2. The low speed inputs are applied to Low Speed LBO/Switch modules, such as module 141, which have the capacity for four inputs or channels. The Low Speed LBO/Switches have four main outputs and four standby outputs. An Intermediate Speed LBO/Switch module, such as module 168, has one input, one main output and one standby output.

Figure 9A:
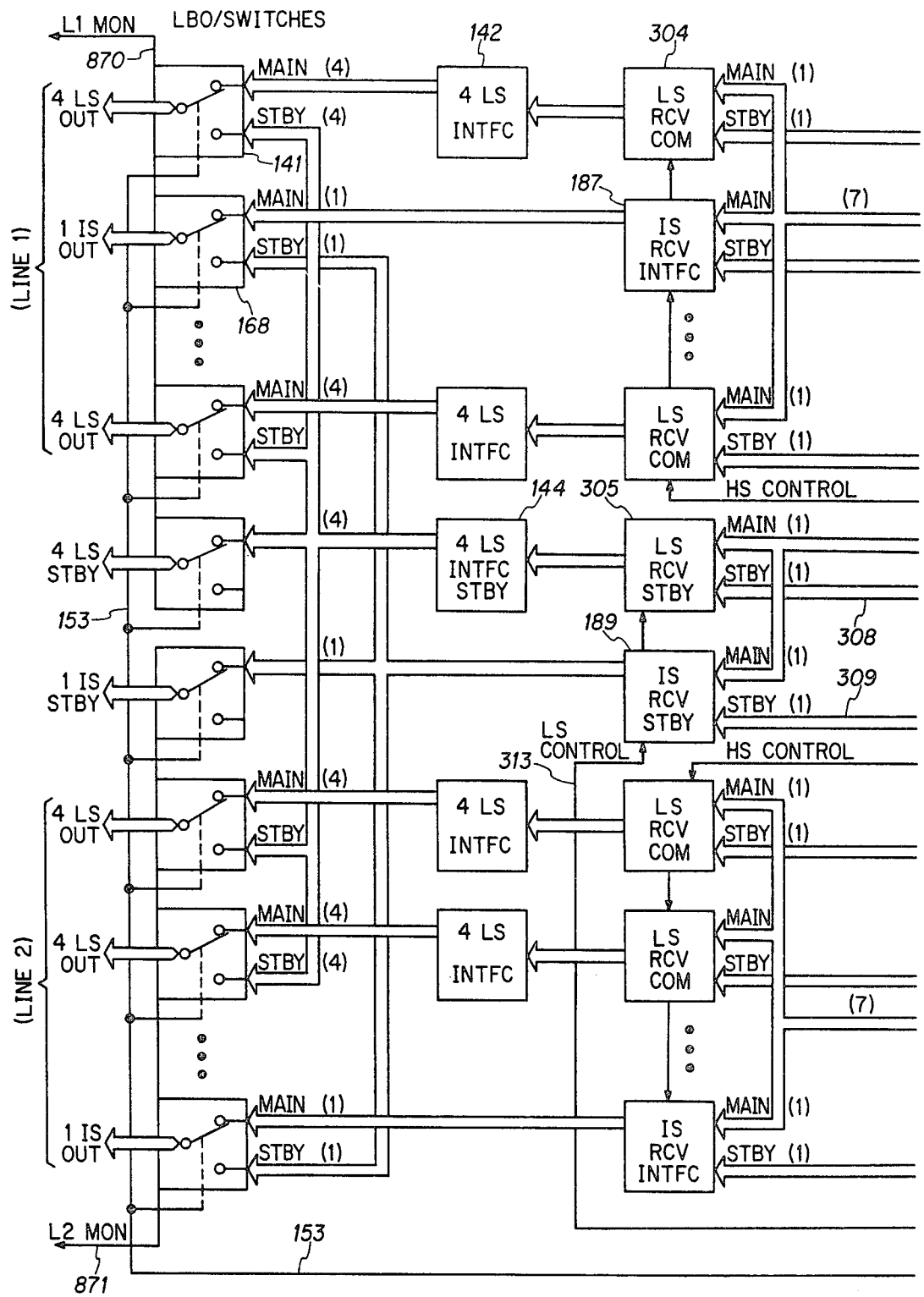
FIGS. 9a and 9b form a side-by-side composite block diagram showing the interconnection of elements of the demultiplexer or receive section of the muldem of FIG. 1.
Figure 9B:
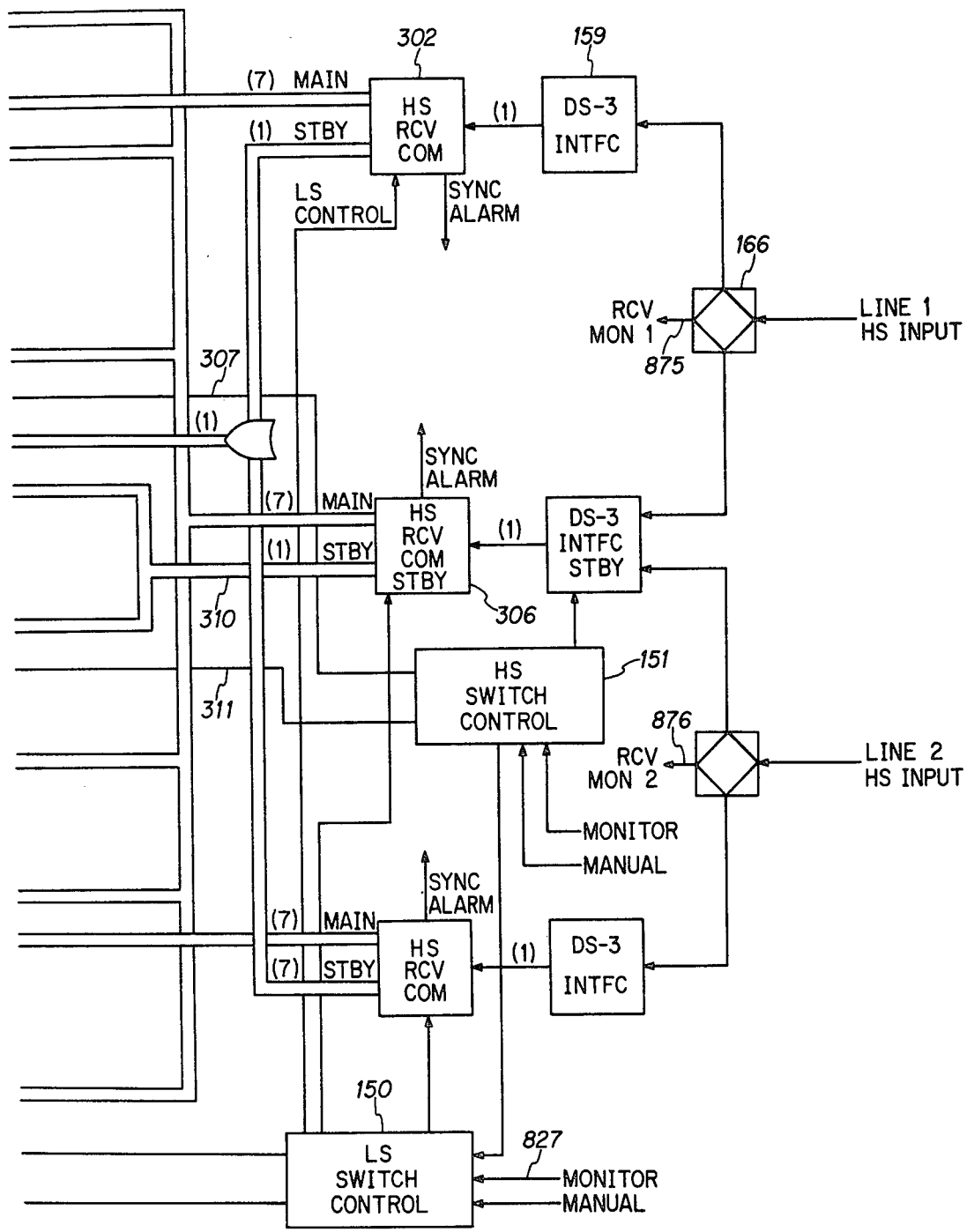

The numbers in parenthesis alongside various signal paths in FIG. 2 (and FIG. 9) indicate the number of data lines represented by the various paths.

The LBO/Switch modules have several functions. The line build-out (LBO) function is to provide a proper impedance interface between the multiplexer system and the particular input lines in an individual installation, as is well understood in the art. Further, these modules switch the input for a selected group to a standby path in the event of a low speed or intermediate speed circuit failure. In addition, the LBO/Switch modules provide the point at which the input data is examined by the system monitor. This is illustrated by the bus 870 labeled L1 MON, and by bus 871 labeled L2 MON, in FIGS. 1 and 2.

Each of the four main outputs or channels of a Low Speed LBO/Switch module such as module 141 goes to one of four different Low Speed Interface modules. In FIG. 2, up to four Low Speed Interface modules are indicated by one block such as block 142. Each of the four standby output channels of all the Low Speed LBO/Switch modules goes to a different one of four standby Low Speed Interface modules. The four standby Low Speed Interface modules are represented by one block 144 in the figure. Thus, each of the Channel 1 standby outputs of each of the Low Speed LBO/Switch modules in FIG. 2 is connected to the standby Low Speed Interface Channel 1 module. Likewise, the standby Channel 2 outputs of all the Low Speed LBO/Switch modules, both Line 1 and Line 2, are connected to the standby Low Speed Interface Channel 2 module, and so forth.

The outputs of all four Low Speed Interface modules in a particular group are brought to one Low Speed Transmit Common module such as module 145. The Low Speed Transmit Common module multiplexes four low speed inputs to form a single intermediate speed output. This output can be switched to either a main or standby terminal. When the standby Low Speed Transmit Common module and standby Intermediate Speed Transmit Interface module are switched, they are switched together so that their outputs appear either on their main terminals or their standby terminals. The switching signal, LS CNTL, comes from the monitor, by way of high speed switch control 151 through low speed switch control 150. The high and low speed switch controls are simply interfaces where manual controls, from panel switch settings, are substituted for the usual control switching signals from the monitor. The switching of the other (than the standby units) Low Speed Transmit Common modules and Intermediate Speed Transmit Interface modules from main to standby output is initiated by the monitor or manual control through the high speed switch control 151. The outputs of all the Intermediate Speed Interface modules and Low Speed Transmit Common modules for Line 1 (or for Line 2) are switched to main or to standby together. This routes data traffic through High Speed Transmit Interface module 154 or through standby High Speed Transmit Interface module 156, respectively.

There is considerable monitor interaction with the LBO/Switch modules. The monitor must read a transmit input or receive output from a selected LBO/Switch module. This is indicated in FIG. 2 by the signal path for Line 1, designated L1 MON 870, and for Line 2 by L2 MON 871. The monitor also controls the switching from main to standby of a selected LBO/Switch. This switching signal is passed through the low speed switch control 150 and is represented in FIG. 2 by bus 153. As with other switching, this control may also be performed manually.

The main output from each Intermediate Speed LBO/Switch goes to an Intermediate Speed Transmit Interface module such as module 147. The standby output from each Intermediate Speed LBO/Switch, both in Line 1 and in Line 2, goes to the standby Intermediate Speed Transmit Interface module 148. Each Intermediate Speed Transmit Interface module has a single main and a single standby output, which contain data at the intermediate speed bit rate.

Figure 3:
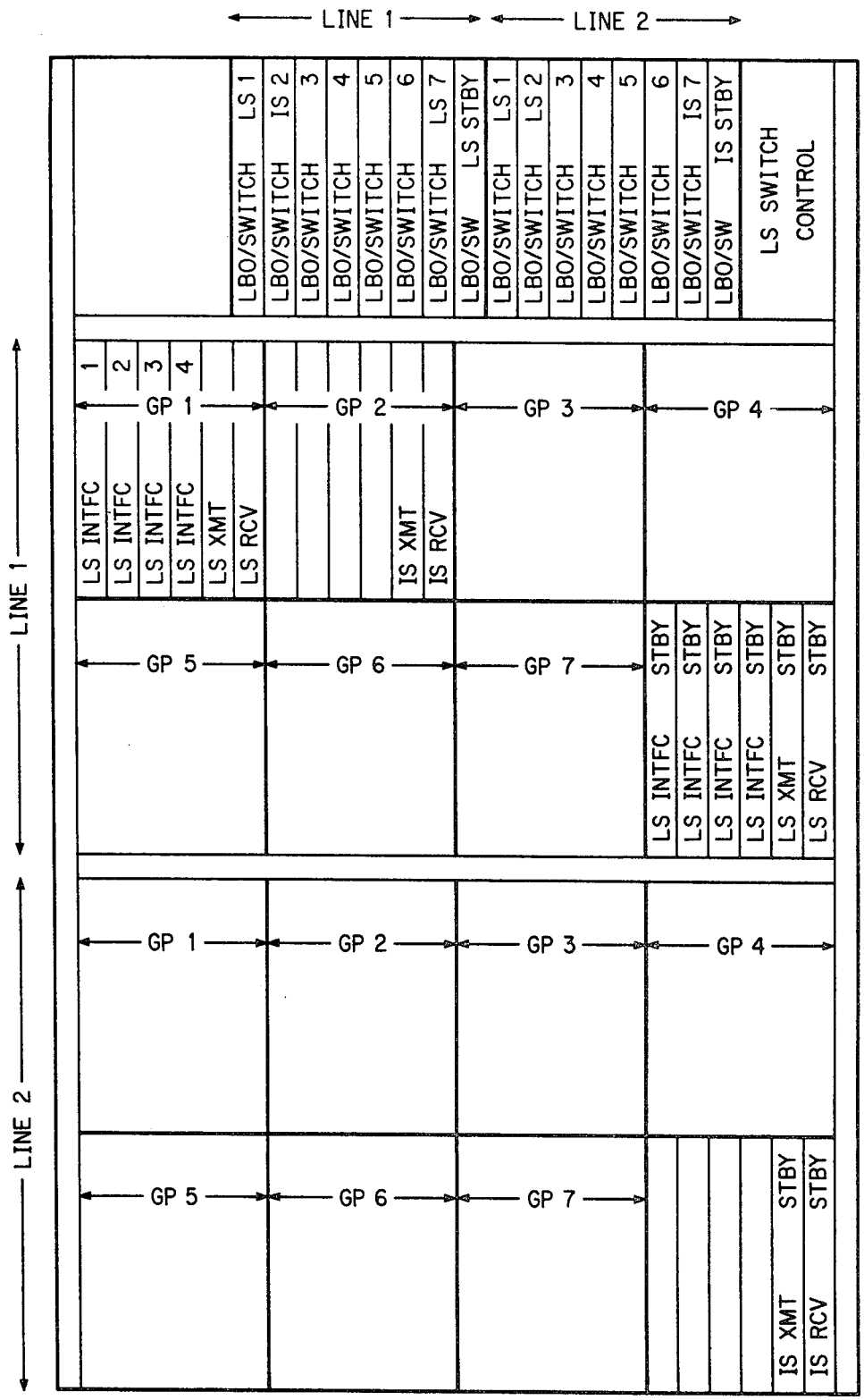
FIG. 3 is an illustration of equipment rack spaces for circuit card modules of the muldem of FIG. 1.

Physical Interchangeability of Low Speed and Intermediate Speed Modules (FIG. 3).

FIG. 3 shows how the various intermediate speed and low speed modules of FIG. 2 can be arranged as circuit boards in an electronic equipment rack. There are slots provided for eight LBO/Switch module cards for each of Lines 1 and 2. Seven LBO/Switch module spaces correspond to the seven groups in each line. The eighth LBO/Switch module associated with one line is for the low speed standby equipment, while the eighth LBO/Switch associated with the other line is for the intermediate speed standby. Each of the LBO/Switch modules must be of the appropriate intermediate speed or low speed type, depending upon how the particular groups are to be equipped. Any of the groups in either line which is not to be equipped does not need an LBO/Switch card. The LBO/Switch modules are duplex, including both transmit and receive portions for the particular group on one card.

Group 1, Line 1 is shown equipped for four low speed input channels. Thus it contains four Low Speed Interface cards. Like the LBO/Switch cards, these are duplex modules including both transmit and receive portions. If any of the channels are not to be used, a Low Speed Interface card need not be provided. In addition to the Interface cards for the equipped channels, each group must have a Low Speed Transmit Common card (LS XMT) as discussed in connection with FIG. 2, and a Low Speed Receive Common (LS RCV), to be described hereinafter.

The space for Group 2 of Line 1 shows the equipment for an intermediate speed group. In this case, only the Intermediate Speed Transmit Interface (IS XMT) and Intermediate Speed Receive Interface (IS RCV) are required. In accordance with the interchangeability of low speed and intermediate speed groups in the present system, it would be possible to put the cards from Group 1 in the slots of Group 2 and the cards from Group 2 in the slots of Group 1. Thus, for example, the Low Speed Transmit Common and the Intermediate Speed Transmit Interface must each be capable of plugging into the same slot. It is necessary therefore that the Low Speed Transmit Common card take its input data from backplane wiring that picks up the outputs of the associated Low Speed Interface modules. The Intermediate Speed Transmit Interface card in the same slot must take its data from a pin that comes from its associated LBO/Switch. The outputs of the Low Speed Transmit Common and Intermediate Speed Transmit Interface are completely compatible and go to the same backplane conductors.

Multiplexer or Transmit Section-High Speed Portion (FIG. 2)

The main outputs from the Line 1 Low Speed Transmit Common and Intermediate Speed Transmit Interface modules all go to a High Speed Transmit Interface module for Line 1, designated with reference numeral 154. Connections are present for all seven groups; if any group is unequipped, the associated input to the High Speed Transmit Interface will simply not contain a signal. Since provision must be made for seven groups, much of the description hereinafter will refer to seven groups, sometimes as though all groups were equipped.

The High Speed Transmit Interface 154 for Line 1 also receives at its single low speed standby input 155 the main output 169 of the standby Low Speed Transmit Common module 149. It is to be emphasized that input 155 is referred to as "low speed," because if comes from the standby low speed transmit common module 149. The data on input 155 is actually at the intermediate speed bit rate, being four low speed channels multiplexed together. The main output 169 of the standby Low Speed module 149 also goes to the low speed standby input 161 of the High Speed Transmit Interface module 158 for Line 2.

At the single intermediate speed standby input 164 of the High Speed Transmit Interface module 154 for Line 1 is the main output 170 of the standby Intermediate Speed Transmit Interface module 148. The main output 170 of the latter module also goes to the intermediate speed standby input 171 of the Line 2 High Speed Transmit Interface module 58.

The standby High Speed Transmit Interface module 156 receives seven data lines at its main inputs, from the standby output of the Low Speed/Intermediate Speed units of Line 1 or Line 2, if either of those sets of units is switched to standby output. The low speed standby input 172 to the standby High Speed Transmit Interface module 156 comes from the standby output 173 of the standby Low Speed Transmit Common module 149. The intermediate speed standby input 174 for the standby High Speed Transmit Interface 156 comes from the standby output 175 of standby Intermediate Speed Transmit Interface 148.

The High Speed Transmit Interfaces, which are all the same, are switches for selecting between their main and standby inputs. They are under monitor or manual switching control, passed through the low speed switch control 150. Each High Speed Transmit Interface is sent three principal pieces of control information. It is instructed whether to look only to its seven main inputs or whether instead to substitute for one of the main inputs one of its standby inputs. If it is to substitute a standby input, it must be sent a group code specifying which main input is to be replaced. The third piece of information chooses one of the two standby inputs from which to take the standby information. The output of each High Speed Transmit Interface module comprises seven data lines, either all taken from its main inputs or with a selected one of the seven outputs taken from one of its standby inputs.

The seven outputs of each High Speed Transmit Interface form inputs to an associated High Speed Transmit Common module, such as module 157. The High Speed Transmit Common modules are multiplexers of conventional design, which multiplex seven intermediate speed inputs together onto a single output line at the high speed bit rate.

The output of each High Speed Transmit Common module goes to an associated DS-3 Interface. The DS-3 Interface performs conventional B3ZS conversion and conversion to bipolar form. Each DS-3 Interface, such as Interface 159, provides an output 872 to the monitor. The main output 162 can be switched on or off in response to a manual or monitor control signal 163 passed through the high speed switch control 151. The main outputs 162 from Line 1 are provided to a conventional hybrid combiner unit 166 along with the main output 165 from the standby DS-3 Interface to derive the resultant Line 1 high speed transmit output. The output of the main DS-3 Interface for Line 2 also goes to a hybrid unit 167 along with the output of the standby DS-3 Interface, to form the Line 2 output.

Figure 4:
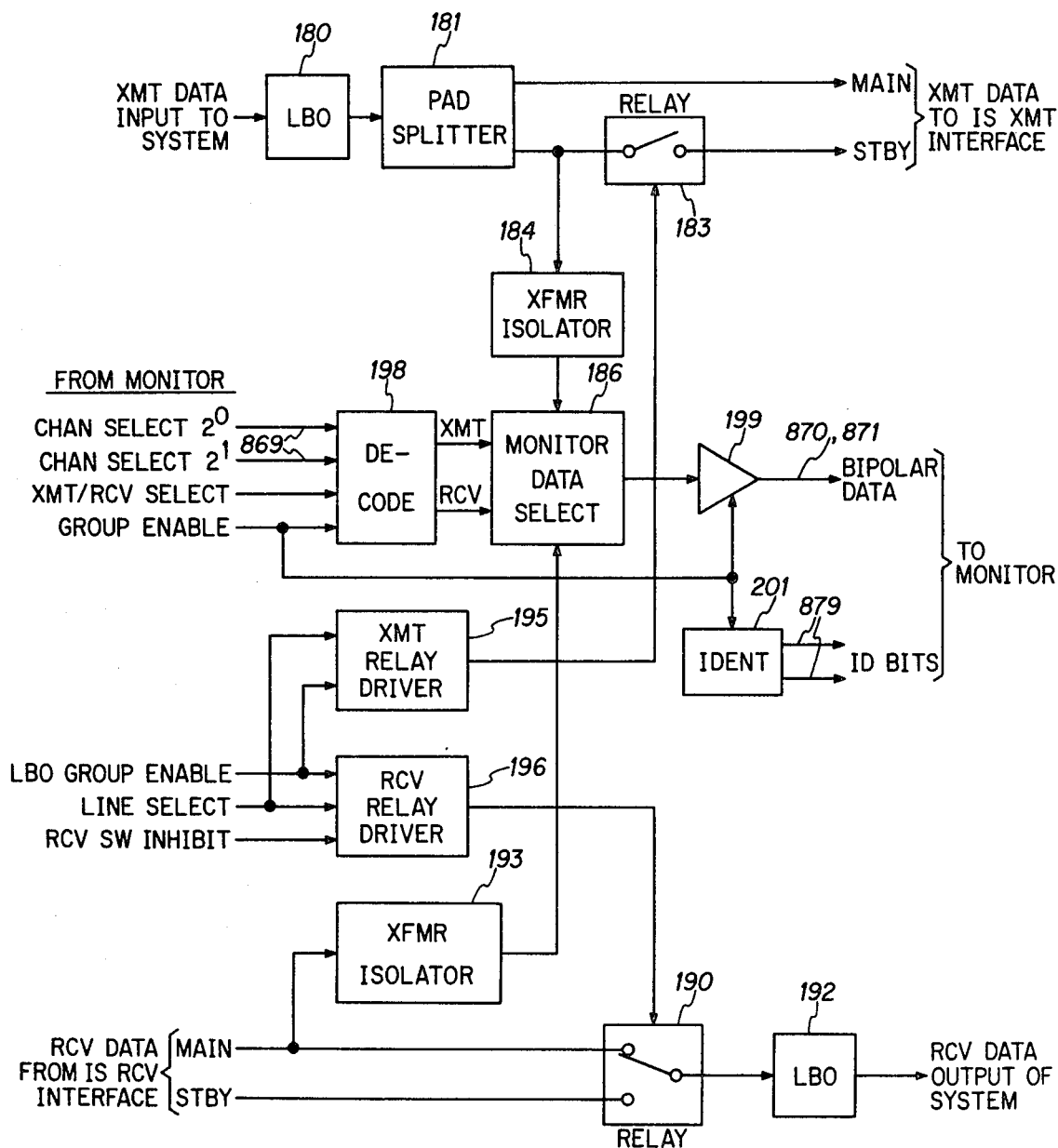
FIG. 4 is a block diagram of an LBO/Switch module for use in each intermediate speed data circuit of the muldem of FIG. 1.

Intermediate Speed LBO/Switch (FIG. 4)

FIG. 4 shows details of an Intermediate Speed LBO/Switch like LBO/Switch 168 in FIG. 2. The LBO/Switch circuit card is a duplex module, including both a transmit part discussed generally in connection with FIG. 2 and a receive part. The data input to the system on the transmit side is applied to a line build out (LBO) network 180 as is well understood in the art. The output of the LBO network is split by a pad splitter 181 into main and standby outputs. The main output is connected to the Intermediate Speed Transmit Interface of the same group, while a relay 183 determines whether the standby output is activated and connected to the standby Intermediate Speed Transmit Interface 148 (FIG. 2). A transformer isolator 184 taps off the signal from one of the outputs of pad splitter 181 and applies it to monitor data select circuit 186. On the receive side, data arrives at the main input from an Intermediate Speed Receive Interface such as Interface 187 in FIG. 9. The standby input to the LBO/Switch comes from the standby Intermediate Speed Receive Interface 189 (FIG. 9). A relay 190 determines whether the main or standby data is supplied through LBO circuit 192 to the output of the system. Regardless of the action of relay 190, data is taken from the main receive input by a transformer isolator 193 to monitor data select 186.

The switching of relays 183 and 190 is controlled by signals from the monitor through the low speed switch control at transmit relay driver 195 and receiver relay driver 196. When both the LBO Group Enable bit and Line Select bit to transmit relay driver 195 indicate that this line and group should switch, then relay 183 is thrown to the standby position. Since the receive relay driver 196 also receives these control inputs, it will switch to standby under the same circumstance, so long as the Receive Switch Inhibit bit does not direct the driver 196 not to switch.

Decode network 198 receives control bits from the monitor which indicate whether this particular LBO/Switch is to send data onto the monitor bus for the monitor to read. The Channel Select bits 869 to decode circuit 198 are relevant to a Low Speed LBO/Switch but not this intermediate speed unit in FIG. 4. The Transmit/Receive Select bit indicates whether it is the input from transformer isolator 184 or from transformer isolator 193 which is to be sent to the monitor. The Group Enable bit from the monitor signals that this particular group LBO/Switch is to send data to the monitor. The selected data, which is in bipolar form, is sent by way of driver 199 to the monitor on the respective monitor bus 870 or 871.

Also sent to the monitor, if this particular group is enabled, is a pair of identity bits 879, as indicated by circuit 201. The identity bit circuit provides two bits of preselected values, which are gated by the Group Enable signal to the monitor bus. If the LBO/Switch is an intermediate speed module, then the first ID bit is zero and the second ID bit is one. For a Low Speed LBO/Switch, the first bit is one and the second bit is zero. Through this means, the monitor can determine whether a particular group is equipped for intermediate speed or low speed operation.

Figure 5:
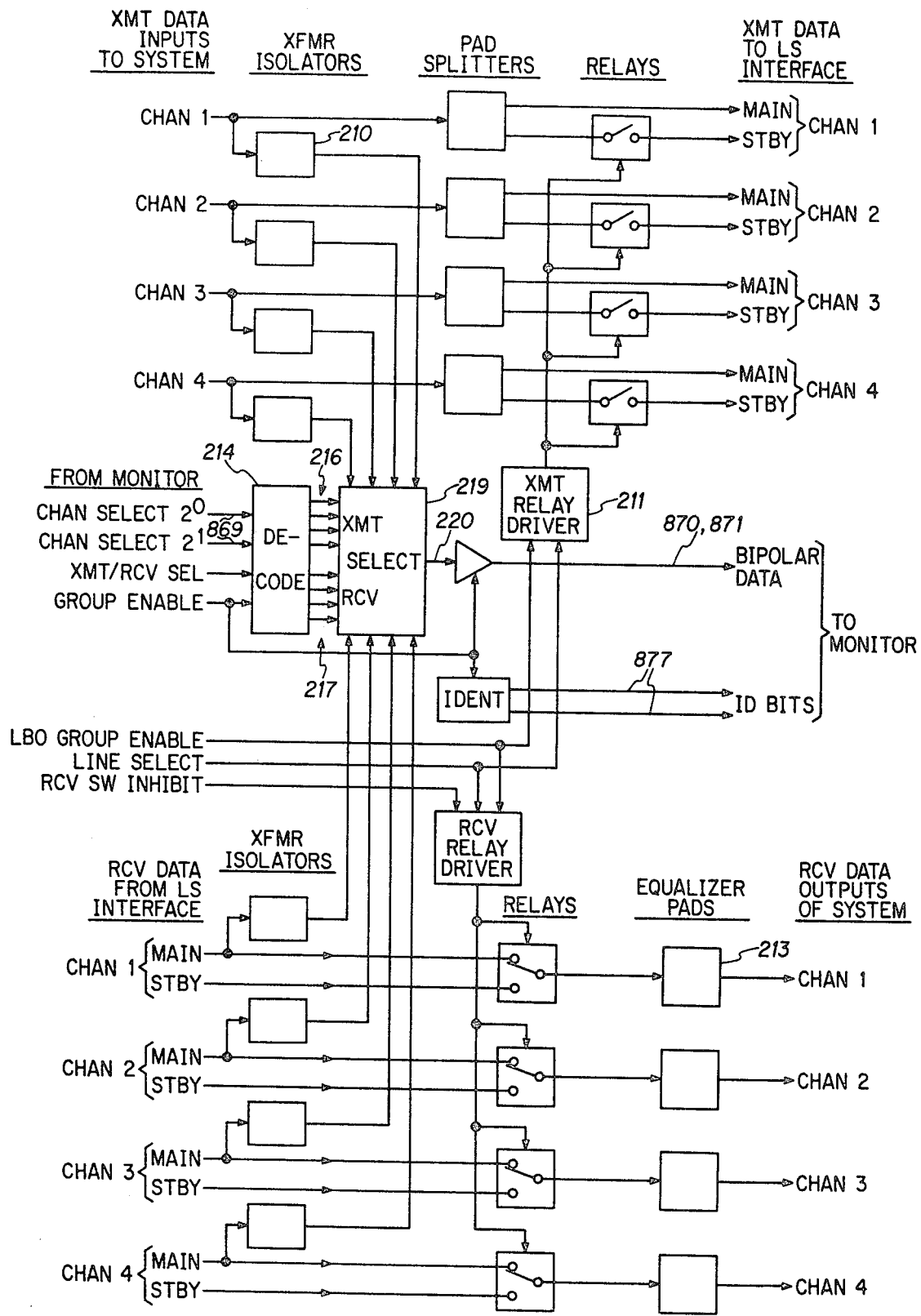
FIG. 5 is a block diagram of an LBO/Switch module for use in each low speed data group circuit of the muldem of FIG. 1.

Low Speed LBO Switch (FIG. 5)

The Low Speed LBO/Switch of FIG. 5 is the same in most respects as the Intermediate Speed LBO/Switch of the preceding figure, except that it has four data channels instead of one. Other differences are as follows. The transformer isolators on the transmit side, such as isolator 210, are located in the signal path before the pad splitters. There is no requirement for an LBO network in the transmit path, such as LBO network 180 in FIG. 4. There are four relays on the transmit side, one for each channel, and all are activated or deactivated together by the transmit relay driver 211. Similarly, on the receive side four relays are activated together by a receive relay driver. Equalizer pads such as pad 213 perform a function similar to line build-out circuit 192 of FIG. 4, as is well understood in the art.

In the circuitry for selecting data to be sent to the monitor, the two Channel Select bits 869 into decode circuit 214 have importance in the Low Speed LBO/Switch. If the group for this particular LBO/Switch is selected, as indicated by the state of the Group Enable bit, then the XMT/RCV select bit determines whether the four transmit decode outputs 216 or the four receive decode outputs 217 are activated. Then the value of the two Channel Select bits 869 determines which of the four outputs in group 216 or in group 217 goes to an enable state. The one which does go to this state determines which of the four transmit or four receive data inputs to select circuit 219 is switched to the output 220 of that circuit. This data is sent onto the respective monitor bus 870 or 871, along with the enabled identity bits 877, as in the Intermediate Speed LBO/Switch.

Figure 6:
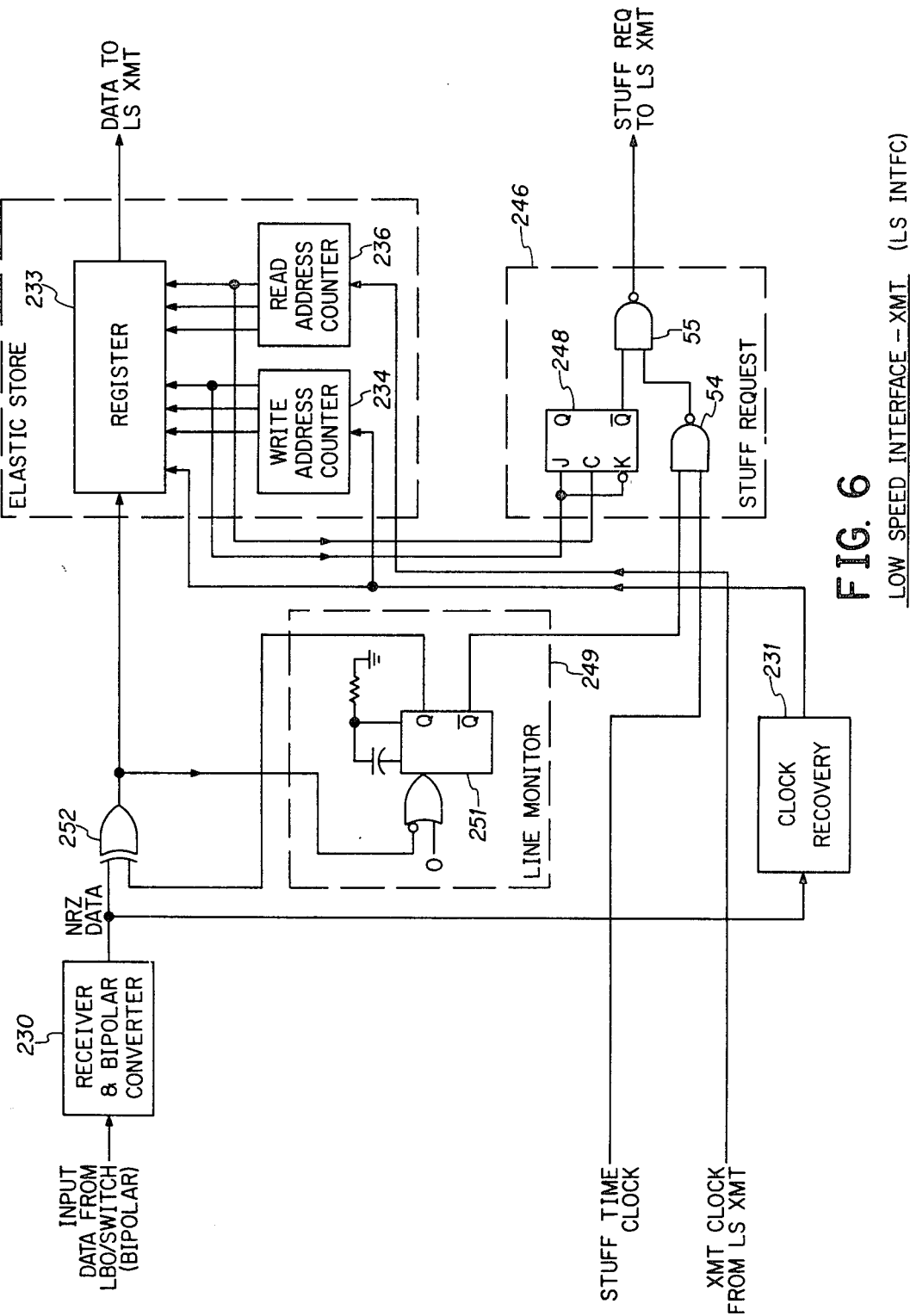
FIG. 6 is a block diagram of the transmit section of a Low Speed Interface module for the muldem of FIG. 1.
Figure 7:
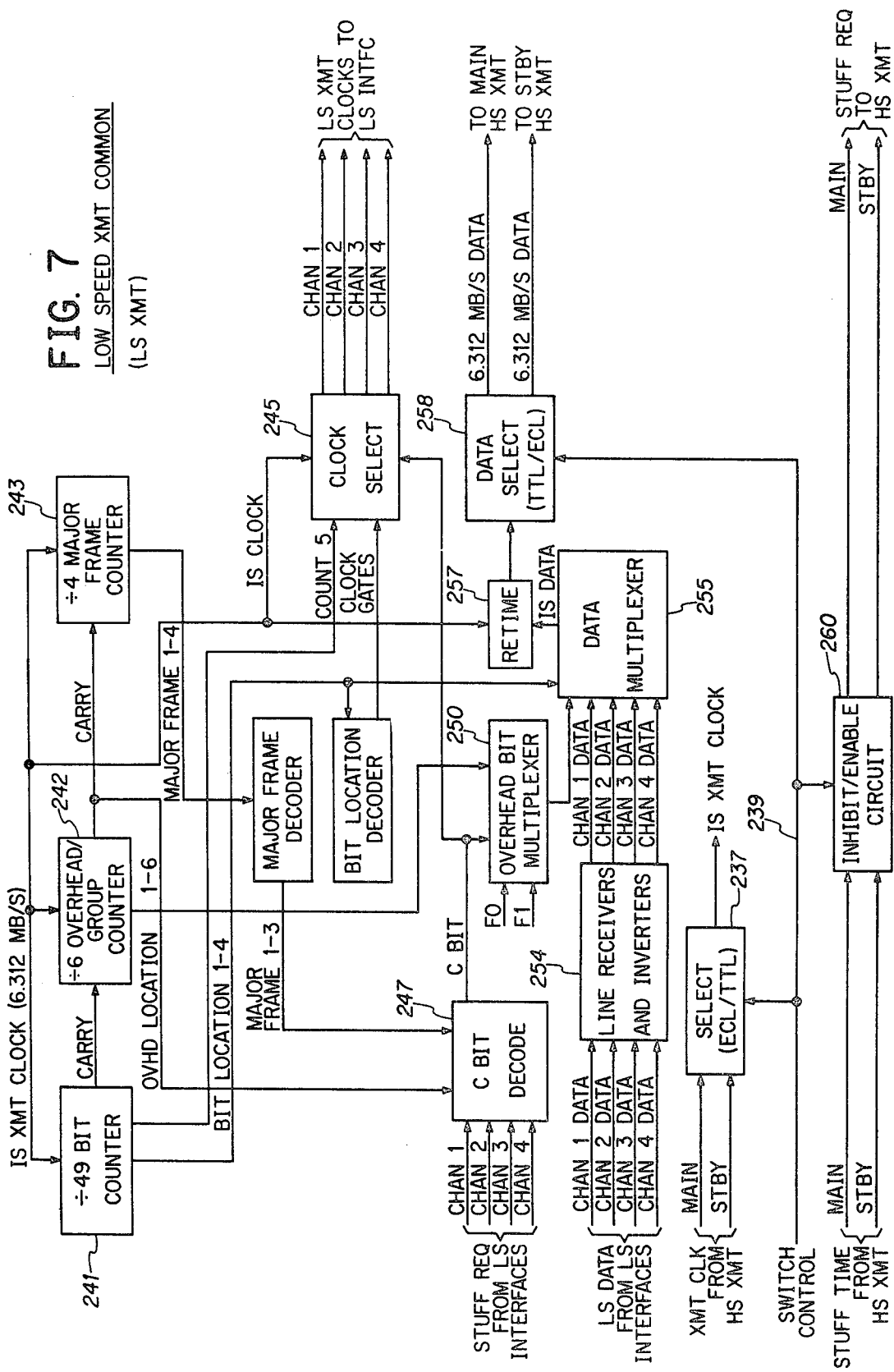
FIG. 7 is a block diagram of a Low Speed Transmit Common module for the muldem of FIG. 1.

Low Speed Interface and Low Speed Transmit Common (FIGS. 6 and 7)

For each low speed channel in multiplexer/demultiplexer 100, there is one Low Speed Interface module. The transmit portion of the Low Speed Interface is shown in FIG. 6. For each group of low speed channels in the multiplexer/demultiplexer, there is one Low Speed Transmit Common module, as shown in FIG. 7. Since there can be as many as four channels per low speed group, there can be as many as four of the Interface modules connected to each Low Speed Transmit Common module.

The input data to the Low Speed Interface is one channel of bipolar input data which has come through the associated LBO/Switch. For most of the Low Speed Interfaces, the input data is taken from the main output of an LBO/Switch; the data input of the standby Low Speed Interface is connected to the standby outputs of all the Low Speed LBO/Switches. The data received by the Low Speed Interfaces is in bipolar form and must be converted to NRZ data by converter 230, as is well understood in the art.

A major function of the Low Speed Interface is to synchronize the data bits input to the system with the clock that is going to be used in the multiplexing of the data, known hereinafter as the transmit clock. As a first step in this process, a clock is obtained from the input data by clock recovery circuit 231 which can be a conventional phase-locked loop clock recovery circuit. The clock recovered from the data is used to enter the data into a register 233 and to form the input to a write address counter 234. The write address counter increments a three bit input to register 233 causing the input data to be written in successive addresses of the register. A read address counter 236 receives as its input the transmit clock from the associated Low Speed Transmit Common module. The output of the read address counter increments in the same way as the counter 234, sequentially reading the data previously written in the register, but at times which are dictated by the transmit clock. The data read from register 233 is output to the associated Low Speed Transmit Common module.

The transmit clock is routed to the Low Speed Transmit Common module and distributed to the appropriate Low Speed Interfaces. The Low Speed Transmit Common module (FIG. 7) receives the transmit clock at select circuit 237 from the associated main high speed unit and standby high speed unit. The select circuit is directed by the same Switch Control signal 239 which signals whether the data from the Low Speed Transmit Common module is to go to its associated main High Speed Transmit Interface or to the standby High Speed Transmit Interface 156. The Switch Control signal 239, comes from the monitor or a manual switch through one of the switch control units 150 or 151. In accordance with the Switch Control signal 239, selector circuit 237 switches to the transmit clock from the main or standby high speed unit, and this becomes the transmit clock for this Low Speed Transmit Common group.

In a preferred embodiment, the high speed portion of the multiplexer/demultiplexer uses ECL logic, while the low speed and intermediate speed portion uses TTL logic. Accordingly, select circuit 237 receives an ECL compatible signal and outputs a TTL compatible signal. An example of such an ECL/TTL conversion in a main/standby select circuit is shown and described hereinafter in FIG. 10.

The output of select circuit 237 in FIG. 7, "IS XMT CLOCK" is required by many of the components in the figure, but in particular is shown at the top of the figure as an important input to the counters 241, 242 and 243. These counters, along with a major frame decoder, bit location decoder, C bit decode, overhead bit multiplexer and clock select circuit 245 are all involved in the activity of multiplexing together the four input channels to the Low Speed Transmit Common module and inserting overhead and framing bits in the multiplexed stream. Not all of these circuits and functions will be described in detail, since the multiplexing of the low speed channels and the insertion of framing information is well known in the art.

Clock select 245 receives inputs from the group of circuits performing the multiplexing and framing functions, as well as the intermediate speed transmit clock. Clock select 245 then outputs four low speed transmit clocks, one to each of the associated Low Speed Interface modules. It will be understood that the clock pulses can occur at staggered times on the different output channels of clock select 245 in order to facilitate the multiplexing of data on the channels.

Thus, in FIG. 6, the transmit clock is one of the outputs from clock select circuit 245 in FIG. 7. The rate of this transmit clock is somewhat higher than the rate of the clock from clock recovery circuit 231. As a result, data will be read from register 233 faster than it is written, and the register will tend to deplete. However, when the register becomes less than one-half full, stuff request circuit 246 generates a request which causes the Low Speed Transmit Common module to delete one pulse in the transmit clock to this Low Speed Interface. This allows the writing to jump ahead, so that the register 233 becomes greater than one-half full. The stuff requests are generated by connecting the most significant bit of the read address counter 236 to the clock input of flip-flop 248, while connecting the most significant bit of the write address counter 234 to the J input of the flip-flop.

The stuff request acts in the Low Speed Transmit Common module of FIG. 7 through a C Bit Decode circuit 247, which has an input to the clock select circuit 245. The C Bit Decode circuit commands the overhead bit multiplexer of the Low Speed Transmit Common module to insert a "stuff" bit in the data stream of the particular channel involved. As a result, there will be a data bit for each pulse of the transmit clock.

In a particular embodiment, a line monitor circuit 249, including a retriggerable one-shot 251 and an exclusive-OR gate 252 detects when the data in the channel comprises a long string of zeros. When this is detected, the line monitor gates a Stuff Time Clock of 1,789 Hz through gates 54 and 55 to produce a train of stuff requests. This output enables the Low Speed Transmit Common module to generate all logic 1's at the nominal low speed rate, in place of the all logic 0's detected by the line monitor.

The Low Speed Transmit Common module (FIG. 7) receives the data from the Low Speed Interfaces through line receivers and inverters 254. From the receivers and inverters 254 the data is input to a data multiplexer 255. Multiplexer 255 multiplexes data from channels 1-4, along with framing bits and stuff bits from overhead bit multiplexer 250, to form an intermediate speed output. The multiplexed data is passed through a retime flip-flop 257 to data select switch 258. There the Switch Control signal 239 sends the output of the Low Speed Transmit Common module either to the associated main High Speed Transmit Interface module 154/158 or to the standby High Speed Transmit Interface module 156, FIG. 2. Preferably data select switch 258 uses ECL gates for compatibility with the logic of the high speed modules.

There is a requirement for further insertion of stuff bits in the data stream by the High Speed Transmit Common module when it multiplexes the seven data groups together. In the Low Speed Transmit Common module this is handled simply by bringing in a Stuff Time signal from the high speed units to an inhibit/enable circuit 260, which is under the control of Switch Control signal 239. In the Intermediate Speed Transmit Interface to be discussed below, a stuff request will be generated in an elastic store circuit and sent to the appropriate high speed unit.

Intermediate Speed Transmit Interface (FIG. 8)

FIG. 8 shows a block diagram of an Intermediate Speed Transmit Interface module such as module 147 of FIG. 2. There are many points of similarity between the Intermediate Speed Transmit Interface on the one hand and the combination of the Low Speed Interface (FIG. 6) and Low Speed Common module (FIG. 7) on the other. A bipolar receiver 270 receives the input data from the main output of an associated Intermediate LBO/Switch module. A B6ZS decoder receives the data from the bipolar receiver and performs a formatting function peculiar to intermediate speed data transmission, which is well understood in the art.

A clock recovery circuit 271 recovers a bit sync clock from the data from the bipolar receiver 270. The transmit clock is selected from the main or standby high speed transmit unit at clock select switch 274 by the Switch Control signal 275. The clock from clock recovery circuit 271 becomes the write clock to an elastic store circuit 277, while the selected transmit clock becomes the read clock thereof.

The elastic store circuit 277, line monitor 278 and stuff request circuit 280 function as discussed in connection with FIG. 6. The Stuff Time clock supplied to stuff request circuit 280 is selected between the main and standby sources by select switch 281 under the control of Switch Control signal 275.

The buffered data from elastic store 277, now synchronized with the transmit clock, is applied to data select switch 283, while the stuff request from circuit 280 is applied to stuff select switch 284. These switches under the control of the Switch Control signal 275 send the data and stuff request to the selected main or standby high speed transmit unit. The switches 283 and 284 are implemented using ECL gates to be compatible with the logic of the high speed units.

The Intermediate Speed Transmit Interface module of FIG. 8 differs from the low speed modules of FIGS. 6 and 7 mainly in that there is no need to multiplex multiple channels together. Further, as a consequence, there is no requirement for the insertion of overhead bits into the data stream. Accordingly, much of the circuitry in FIG. 7 is not present in FIG. 8.

In order to obtain the result that a low speed group can be substituted for an intermediate speed group, a number of the inputs and outputs of the two groups must be identical at identical circuit card connector pins. On the input side, the transmit clock and Stuff Time from main and standby high speed sources are the same in the intermediate speed modules and the low speed modules.

On output, the data and stuff requests directed to the main and standby high speed transmit units are pin-for-pin compatible between the Low Speed Transmit Common module (FIG. 7) and the Intermediate Speed Transmit Interface (FIG. 8). All of these outputs are compatible with the ECL logic of the high speed units.

Receive or Demultiplexer Section (FIG. 9)

The high speed input to Line 1 of the receive section is to hybrid unit 166. From the hybrid unit, the high speed signal goes to the Line 1 DS-3 Interface 159 and to the standby DS-3 Interface. In addition, there is a receive monitor point 875 at the hybrid. The Line 2 high speed unit makes the same kinds of connections through its hybrid unit.

From the DS-3 Interface such as interface 159, the high speed signal goes to an associated High Speed Receive Common module, such as module 302. Each High Speed Receive Common module demultiplexes its high speed input into seven intermediate speed outputs. These modules, such as module 302, have seven main outputs and one standby output. These outputs are under the control of a monitor or manual signal which is passed through the low speed switch control 150. If the High Speed Receive Common module is appropriately signaled, it turns on its standby output and sends on the standby output one of the seven intermediate speed signals which are on its main outputs. As a part of the control signal to the module, there is included a group code which specifies which one of the signals is to appear on the standby output. A sync alarm is available from each High Speed Receive Common module, so that the monitor can determine when one of these modules is not able to synchronize with the high speed data coming in on its input.

The seven main outputs of High Speed Receive Common module 302 of Line 1 each go to a different one of the low/intermediate speed groups in Line 1. For example, as shown in FIG. 9, the first main output of High Speed Receive Common module 302 goes to the main input of Low Speed Receive Common module 304. The second main output from High Speed module 302 goes to the main input of Intermediate Speed Interface module 187.

The standby outputs of the High Speed Receive Common modules from both lines 1 and 2 go to the main input of standby Low Speed Receive Common module 305.

The standby High Speed Receive Common module 306 sends its seven main outputs to the standby inputs of the seven groups of Line 1 and also of Line 2. The single standby output 310 of the standby High Speed Receive Common module 306 goes to the standby inputs 308 and 309 of the standby Low Speed Receive Common module 305 and standby Intermediate Speed Receive Interface module 189.

The Low Speed Receive Common and Intermediate Speed Receive Interface modules of Line 1 are under the control of a switching signal which passes through the high speed switch control 151 from the monitor or manual panel switches. Switching signal 307 causes all of these low/intermediate speed units to switch together to their main inputs or to their standby inputs. the switching signal 311 for all the comparable low/intermediate speed Line 2 modules also comes through the high speed switch control. Both the standby Low Speed Receive Common module 305 and standby Intermediate Speed Receive Interface 189 are switched to their main or standby inputs by a switching signal 313 which passes through the low speed switch control.

Each of the Low Speed Receive Common modules such as module 304 feeds up to four Low Speed Interface modules. In FIG. 9, four Low Speed Interface modules are represented by one block, such as block 142.

The LBO/Switch modules for the multiplexer/demultiplexer system include transmit and receive portions. The transmit portions are illustrated in FIG. 2, while the receive portions are shown in FIG. 9. Each of the low speed LBO/Switch modules has four main and four standby inputs. The four main inputs come from the associated Low Speed Interfaces. For all the Low Speed LBO/Switches in the system, the Channel 1 standby input comes from the Channel 1 standby Low Speed Interface, while the Channel 2 standby input comes from the Channel 2 Low Speed Interface, and so on.

Each of the Intermediate Speed LBO/Switch modules receives its main input from the Intermediate Speed Receive Interface of the group. For every Intermediate Speed LBO/Switch in the system, the single standby input comes from the standby Intermediate Speed Receive Interface 189.

The lines marked L1 MON 870 and L2 MON 871 are intended to indicate that the individual outputs of the LBO/Switch modules are read by the monitor. Moreover, each of the LBO/Switch modules can be individually commanded to switch either to its main or standby inputs. This is represented in FIG. 9 by switching signals 153 coming through the low speed switch control. For a Low Speed LBO/Switch module, all four channels switch together to main or standby.

Intermediate Speed Receive Interface (FIG. 10)

At the inputs of the Intermediate Speed Receive Interface in FIG. 10, the module must first select the data and the clock from either the main or the standby high speed receive unit. This is performed by select circuits 322 and 323 under the control of Switch Control signal 320. Select circuit 322 has been expanded in detail to illustrate a conversion necessary to interface the ECL logic of the high speed units with TTL logic in the low/intermediate speed section of the system. This is done simply by bringing the main and standby data signals to the inputs of ECL AND gates 325 and 326, then applying the wired-OR output of the gates to a transistor logic circuit 328.

The data output of select circuit 322 is applied through a retime flip-flop 330 to an output smoothing buffer 331. In the receive section of the multiplexer/demultiplexer, there is not a requirement in the low/intermediate speed portion of the system to synchronize the data with the high speed clock. In the receive section, the data has been synchronized with the high speed clock as it was received in the high speed portion of the system. The requirement for an elastic or smoothing buffer arises from the fact that the high speed portion of the receive section has removed stuffing bits that it found in the incoming high speed data stream. This causes gaps in the intermediate speed data to both the intermediate speed and low speed groups. Therefore, it is necessary to readjust the data in time so that the bits of the data stream occur at a regular interval.

As a first step in the operation of the smoothing buffer 331, the destuffed data is written into a register 333. One of the bits of a write address counter used to enter the data in the register is taken to form one input 334 of a phase-locked loop 336. The phase-locked loop drives a read address counter 337 which causes the data in the register to appear at its output 339. A bit from the read address is taken back to the phase detector of the phase-locked loop 336. The result is that the data bits are read into and out of the register 333 at the same overall rate, but phase-locked loop 336 causes the bits in the output of the register to occur at a regular interval.

The output of the smoothing buffer 331 goes to a B6ZS encoder circuit which replaces a short string of zero data bits with a special code as is well-known in the art. A bipolar driver and transformer 340 converts the B6ZS encoded signal to bipolar form and send it to the associated LBO/Switch module.

Figure 12:
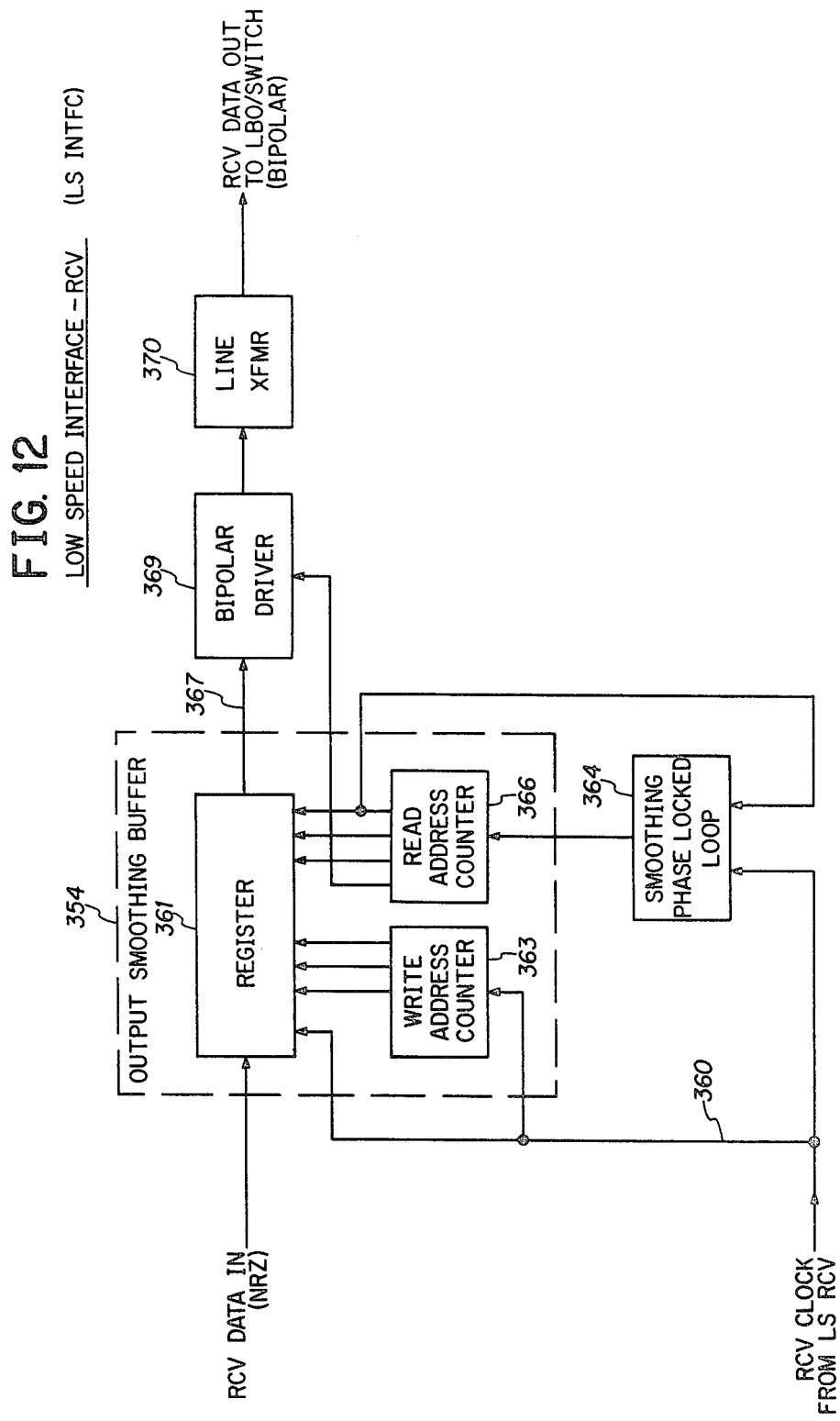
FIG. 12 is a block diagram of the receive section of a Low Speed Interface module for the muldem of FIG. 1.

Low Speed Receive Common (FIG. 11) and Low Speed Interface—Receive Portion (FIG. 12)

The Low Speed Receive Common module shown in FIG. 11 has select circuits 350 and 351 subject to a Switch Control signal to choose between the clock and data from the main high speed receive unit or the standby high speed receive unit, just as in the Intermediate Speed Receive Interface. The selected data is sent through a retime flip-flop 353 and out to the four associated Low Speed Interface modules. The remainder of the circuits in FIG. 11 carry out the conventional process of examining the overhead bits in the data stream to generate four clocks which will permit demultiplexing the intermediate speed data into four low speed channels, with overhead bits removed. Each of the four resulting clocks forms an output going to a different one of the four possible Low Speed Interface modules (FIG. 12) associated with the Low Speed Receive Common module In FIG. 12, the Low Speed Interface module is seen to receive from its Low Speed Receive Common module both the intermediate speed data and the appropriate one of the receive clocks. As with the Intermediate Speed Receive Interface (FIG. 10) there is a need for an output smoothing buffer 354. This is because stuff bits and other overhead bits are removed from the data stream, which must then be adjusted so that the bits occur at regular intervals. The receive clock 360 into the Low Speed Interface will have pulses only when there is data on the data input, and not when an overhead bit is occurring. As a result, only data bits are clocked into register 361 by the receive clock, and only the data bits for one channel. The clock which drives the register and the write address counter 363 is also input to the phase detector of a smoothing phase-locked loop 364. The other input to the phase-locked loop is from a bit of the read address counter 366 of smoothing buffer 354, as in the Intermediate Speed Receive Interface. Due to the action of the phase-locked loop, data face appears at the output 367 of register 361 at a regular frequency. A bipolar driver 369 and line transformer 370 place the data in condition for input to the associated LBO/Switch.

It is an aspect of the interchangeability of the Intermediate Speed Receive Interface (FIG. 10) and the Low Speed Receive Common module (FIG. 11) that they receive the same type of intermediate speed data and clock connections from the main and standby High Speed Receive sections. In addition, they must each receive the Switch Control signal to make the main and standby selection.

Figure 13A:
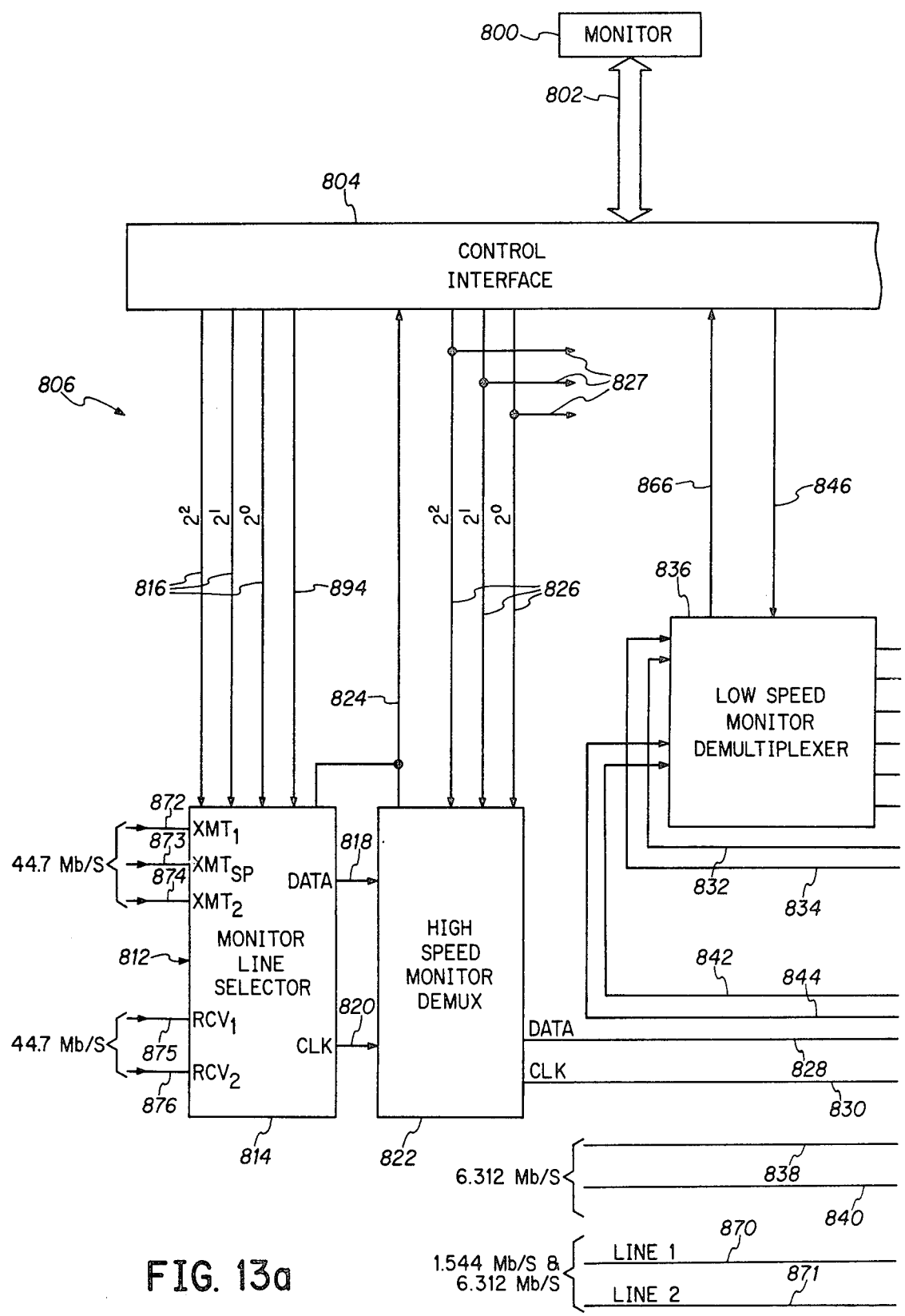
FIGS. 13a and 13b form a side-by-side composite diagram showing the monitoring and comparing means of the muldem of FIG. 1 in more detail.
Figure 13B:
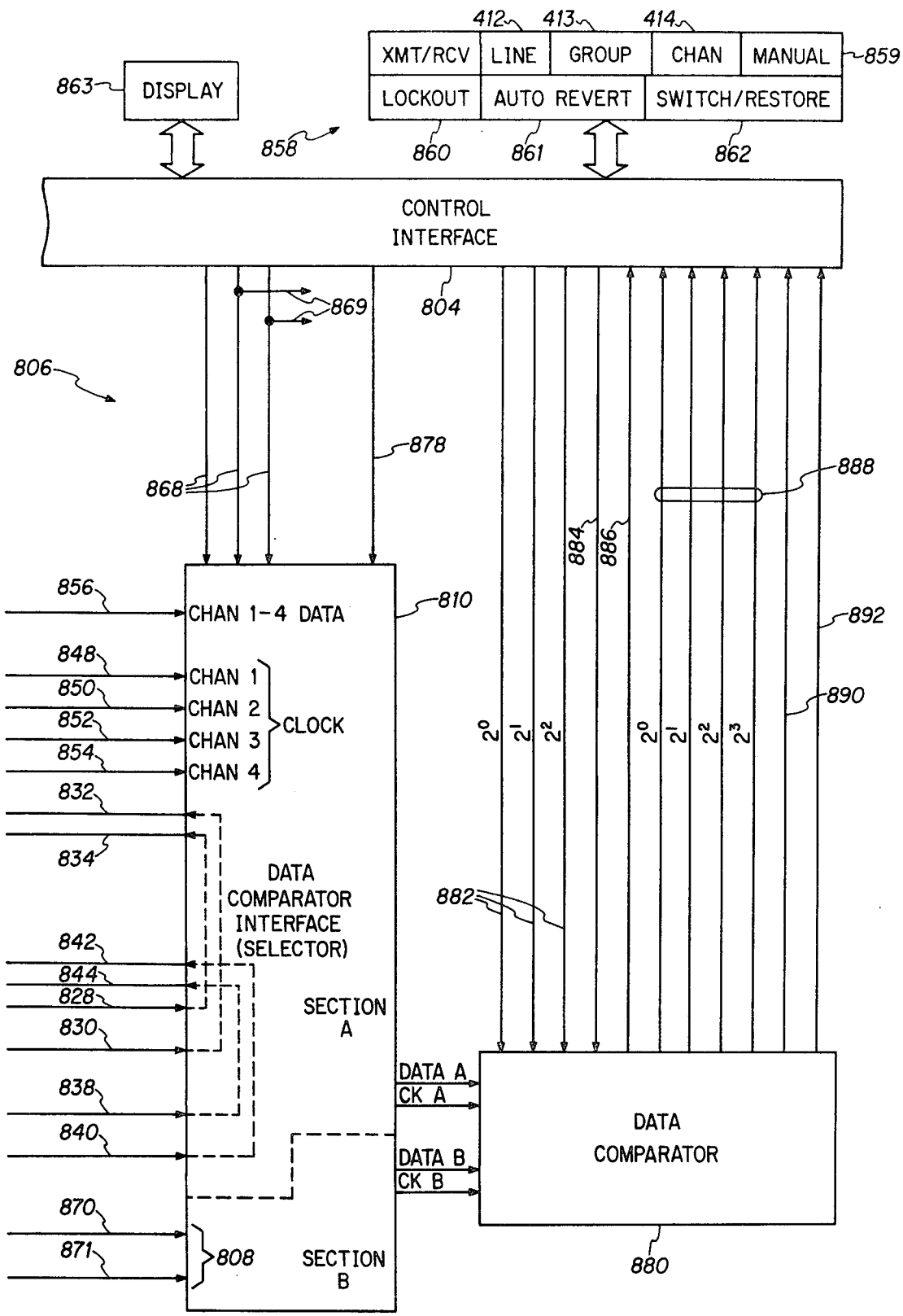

Monitoring and Comparing Means, FIGS. 13a and 13b:

The monitor and switch control means 101, including comparator 120, FIG. 1, is shown in more detail in FIGS. 13a and 13b, which are a side to side composite. Monitor 800 is connected by data bus 802 to control interface 804 for controlling monitoring and comparing circuitry generally designated 806.

As seen in FIG. 1, monitor and switch control means 101 has a first input side 808 connected in parallel with the inputs to the low and intermediate speed transmitters of each line and in parallel with the outputs of the low and intermediate speed receivers of each line. As shown in FIGS. 13a and 13b, this first input side 808 of the monitor is through data ports in a data comparator interface or select module 810. The inputs to data ports 808 are through the Line 1 and Line 2 LBO monitor buses 870 and 871, respectively, FIGS. 1, 2a, 9a, 4 and 5. The data at ports 808 is either low speed T1 rate data (1.544 Mb/s) or intermediate speed T2 rate data (6.312 Mb/s).

As seen in FIG. 1, monitor and switch control means 101 has a second input side 812 connected to the outputs of the high speed and standby transmitters and the inputs of the high speed and standby receivers. A separate connection from the input to the standby high speed receiver is not needed because the data to the standby high speed receiver must travel through either Line 1 or Line 2, as seen in FIG. 1. There are thus five inputs 872, 873, 874, 875 and 876 to the second input side 812 of the monitor, FIGS. 1, 2b, 9b and 13a. This side 812 is through data ports in a selector module 814, FIG. 13a.

The monitor chooses one of the five data entry ports in selector module 814, FIG. 13a, in accordance with a three bit selection code on connection 816 from control interface 804. Selector module 814 extracts or recovers clock information from the input high speed or T3 rate (44.7 Mb/s) data and delivers a data signal 818 and a clock signal 820 (at 44.7 MHz) to a first monitor demultiplexer 822 which demultiplexes the high speed data. A feedback line 824 is provided from the selector 814 and demultiplexer 822 to the control interface 804 for carrying a signal indicating the state of high speed monitor synchronization.

Demultiplexer 822 demultiplexes the high speed input data into seven groups of intermediate speed or T2 rate data. Three bit control line 826 selects one of the seven intermediate speed groups, and the demultiplexer delivers a data signal 828 and an intermediate speed or T2 rate clock signal 830 for the selected group. The three bit selection code on control line 826 is also sent via connection 827, FIG. 13a, to the low speed switch control as shown at 827 in FIGS. 2b and 9b.

Data comparator interface or selector module 810 receives the intermediate speed data and clock on signal lines 828 and 830 and delivers these signals directly to the data A and clock A outputs or to output lines 834 and 832 which in turn deliver the signals to a second monitor demultiplexer 836 for further demultiplexing of the clock signal to the low speed or T1 rate over four channels. Another set of intermediate speed data and clock signals are delivered to selector module 810 on lines 838 and 840 from the High Speed Transmit Interface modules for Line 1, standby and Line 2, as shown by the monitor tap-off at 838, 840 in FIG. 2b. These signals are tapped off the Interfaces modules before multiplexing, whereby to deliver intermediate speed data and clock signals on lines 838 and 840. These signals are delivered through selector module 810 directly to the data A and clock A outputs or to output lines 844 and 842 which carry the signals to low speed monitor demultiplexer 836. The two sets of intermediate speed data available to demultiplexer 836 are thus derived from different data path configurations through the system to enhance testing flexibility. Control line 846 selects which set of intermediate speed data is to be processed through demultiplexer 836.

Demultiplexer 836 demultiplexes the clock signals from the chosen intermediate speed input. Demultiplexer 836 outputs the demultiplexed Low Speed clock signals over four channels on signal lines 848, 850, 852 and 854 to selector module 810. Data for the four channels is delivered on signal line 856 to selector module 810 for later selectively clocked extraction of the desired channel of data, i.e. the data stream on 856 is gated with one of the four channel clocks to pick off the desired channel of data. Feedback signal line 866 carries another signal indicating the state of monitor synchronization. Demultiplexer 836 is comparable to the Low Speed Receive Common module of FIG. 11.

A three bit selection control 868 chooses one of six available sets of data and clock signals for delivery as data A and clock A (two intermediate speed sets: (a) 838, 840; (b) 828, 830; and four low speed sets: (c) 856, 848; (d) 856, 850; (e) 856, 852; and (f) 856, 854). The chosen data and clock set is delivered from section A of Data Comparator Interface or Selector module 810 to data comparator 880, FIG. 13b.

Selector module 810 has a section B which delivers a data B and clock B output to Data Comparator 880. Data B and clock B are derived from input port 808. Port 808 receives signals from the Line 1 monitor bus 870 and from the Line 2 monitor bus 871. Single bit selection control 878 to selector module 810 chooses 870 or 871 at entry port 808. The data at port 808 is either low or intermediate speed, either of which is accepted by selector Module 810 and output as data and clock B. The indentification bits 877, FIG. 5, and 879, FIG. 4, of the low and intermediate speed LBO/Switches, respectively, provide the speed selection part of control 868 to provide corresponding low or intermediate speed data clock A. Also, two of the bits of control 868 are sent via connection 869 to decoder 198, FIG. 4, of the Intermediate Speed LBO/Switch for channel selection; these two bits are also sent to decoder 214, of FIG. 5, of the Low Speed LBO/Switch for channel selection.

Data A and clock A and data B and clock B are input to a data comparator 880 for a bit-error-rate test. A three bit delay control connection 882 is provided for controlling a delay element to delay data stream B when a transmit path is being monitored. When testing a data path through the transmit side of the muldem, FIG. 1, data stream A has gone through multiplexing by the transmit side of the muldem and demultiplexing by the monitor which takes time, typically five or six time bits in the current system, and hence data stream B must be delayed to bring the two data streams into sync. Three bits of delay control has been found sufficient and affords eight selectable incremental delays. In one form, it has been found desirable to also provide a delay, which may be fixed, in data stream A. When testing a data path through the receive side of the muldem, data stream A has been demultiplexed by the monitor and data stream B has been demultiplexed by the receive side of the muldem, which may or may not take the same time. If demultiplexing by the monitor takes the shorter time, then data stream A will lead data stream B. To prevent this, data stream A is delayed to lag data stream B, and the selectable delay in data stream B then brings the streams into rough synchronization. Line 884 resets the data comparator and line 886 carries a comparator synchronization status signal.

Four bit error counting bus 888 registers noncoincidences of corresponding bits between data streams A and B. Lines 890 and 892 provide flag signals for lack of data activity in streams A and B, respectively. In the current system, a string of sixty-three consecutive zeros has been found statistically probable of lack of data activity and is used as the flag point.

Data streams A and B are compared bit for bit. After syncing, monitor 800 opens a short sampling time interval window and recognizes or counts errors therein. If the number of errors exceeds a given threshold, then the sampling time interval is expanded, in one preferred form by a factor of 10, and a re-test is performed and the same increased factor of errors is looked for. This long test provides improved statistical accuracy of a bit-error-rate determination. The short test enables quick sequential testing of a plurality of data paths.

The monitor and compare circuit 806 is self-tested by injection of errors in one of the compared data streams. Bit errors are injected at the second monitor input side 812, FIG. 1. Referring more particularly to FIG. 13a, a self-test signal on line 894 triggers error injection by Module 814 for processing through the monitor. This alters data stream A for comparison aganst data stream B. The introduction of errors is preferably accomplished by bit inversion. If these errors are not reflected in the comparison, then there is a probable monitor malfunction.

A manual control user interface 858 is provided and includes a plurality of selection switches for choosing transmit or receive line, group and channel, and a plurality of switches for controlling various monitor and-/or muldem functions. Manual override switch 859 interrupts the automatic sequential testing of data signal paths by the monitor and locks the monitor to a selected signal path through the muldem to facilitate analysis of such path and its associated high speed and low or intermediate speed transmitter or receiver means prior to placing such path in service, as more fully described hereinafter. Manual lock out switch 860 prevents a selected data path through the muldem from switching to standby. Auto-revert switch 861 controls whether data traffic switched to standby is permitted to automatically revert back to its normally on-line main data path configuration upon correction of the malfunction in the normally on-line main path, or whether manual permission is also required for such reversion in addition to correction of the malfunction. Switch/restore switch 862 provides manual switching to and from standby of a selected transmit or receive line, group and channel. User control of the monitor and muldem is preferably accomplished through iterfaces such as 858 by means of dedicated switches for user convenience, though of course other means may be used, such as keyboard entry or the like providing manual interaction with the system. One or more displays such as 863 are provided for the various indications afforded, including error indication, and a latched display of a failure condition even after the failure or malfunction has been corrected and the standby data path automatically switched back to its main normally on-line configuration when the system is in the auto-revert mode.

Figure 14:
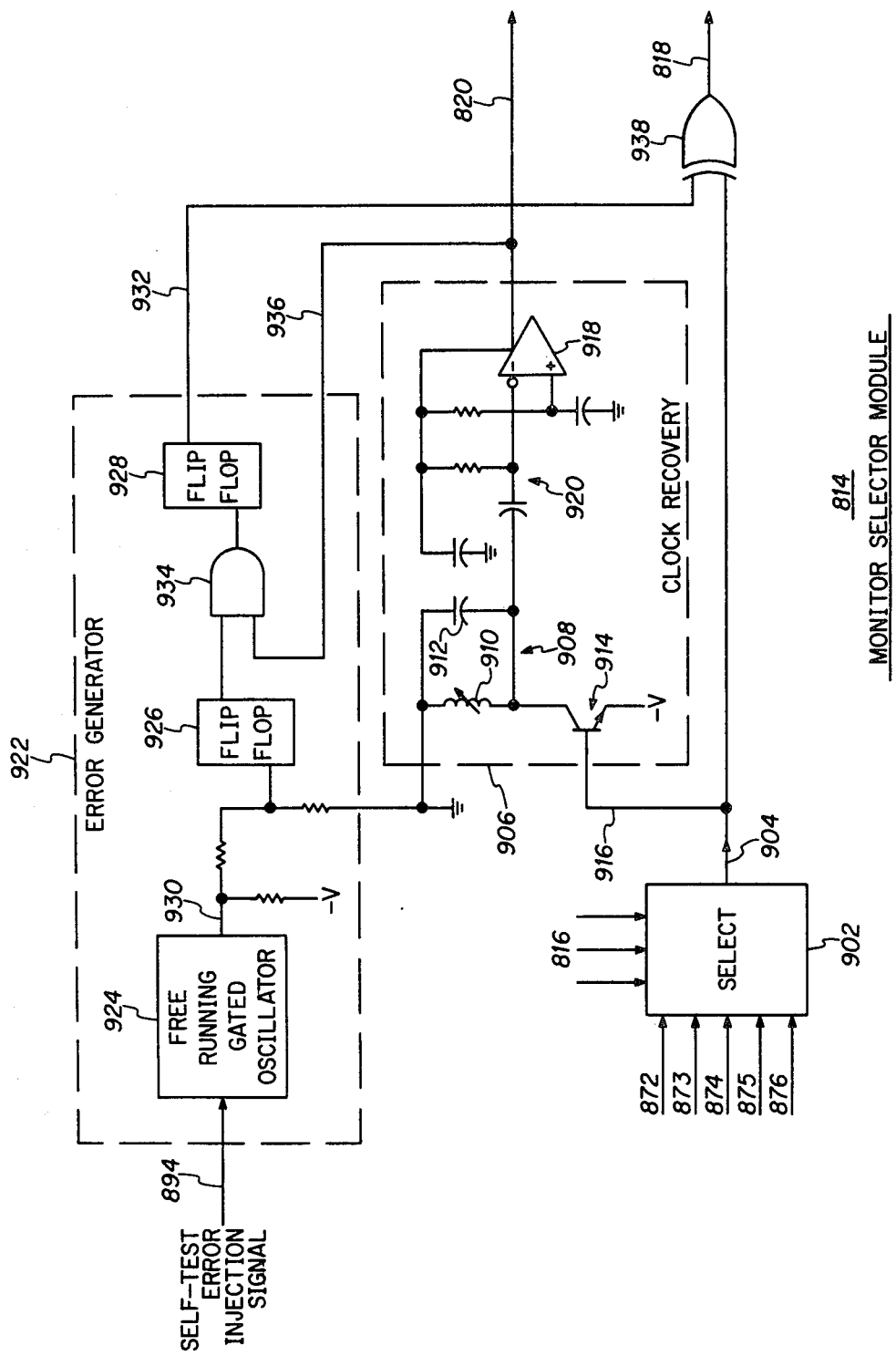
FIG. 14 is a schematic circuit diagram showing the monitor selector module 814 and error injection of FIG. 13.

Monitor Selector Module 814 and Error Injection, FIG. 14

The monitor selector module 814 of FIG. 13a is further illustrated in FIG. 14, including error injection. A data selector 902 chooses one of the inputs from lines 872-876 in accordance with the selection code on connection 816 for output on line 904. The output data on 904 is passed through a clock recovery circuit 906.

In one form, the clock signal is extracted by charging a frequency adjustable tank circuit 908 having inductance 910 and capacitance 912 with current from a transistor 914 during the time ones are being received on input 916. The energy stored in the tank oscillates and is representative of the clock signal. These oscillations may be converted to a different or appropriate logic level if desired. For example, amplifier means 918, with its associated resistance and capacitance network 920, converts the oscillations to ECL levels. The output of the clock recovery circuit 906 is delivered via connection 820 to the monitor receiver and demultiplexer 822, FIG. 13a.

An error generator circuit 922 is initiated by the input from the self-test error injection signal line 894, FIG. 13a. The error generator circuit 922 includes a free running gated oscillator 924 and a pair of toggled flip-flops 926 and 928. When the gated input on 894 is a logic zero, a logic zero is obtained on the output 930 of free running gated oscillator 924. When the gated input is a logic one, a square wave output is obtained on 930. The output toggles flip-flops 926 and 928, producing a one bit output pulse on line 932 synchronous with the system clock by means of AND gate 934 having one of its inputs connected via line 936 to the extracted clock signal on 820 at the output of the clock recovery circuit 906.

The output of the error generator circuit 922 and the output of the data selector 902 are delivered by connections 932 and 904 through an exclusive OR gate 938. The resulting data bits on output 818 of this gate are the inversion of the data stream on 904 and thus erroneous. The injected errors now appearing on 818 are delivered to the monitor receiver and demultiplexer 822, FIG. 13a.

Section A of Data Comparator Interface 810, FIG. 15

The section of the data comparator interface 810, FIG. 13b, which provides data A and clock A is shown in greater detail in FIG. 15. Section A receives one set of low speed inputs and another set of intermediate speed inputs. The low speed set includes four low speed clock signals at 1.544 MHz on lines 848, 850, 852 and 854 (channel 1 clock through channel 4 clock) and a data signal on line 856 containing four multiplexed 1.544 Mb/s data streams plus various overhead and stuff bits. The intermediate speed input set includes data streams on lines 828 and 838, each paired with a 6.312 MHz clock, on lines 830 and 840, respectively. The low speed inputs are from monitor receiver 836, FIG. 13a; the intermediate speed inputs on 828 and 830 are from monitor demultiplexer 822, FIG. 13A; and the intermediate speed inputs on 838 and 840 are from the High Speed Transmit Interfaces for Line 1, Line 2 and standby, FIG. 2b.

A Selector module 940 chooses one of the six clock inputs according to the selection code from control 868. The selected clock signal is output on 942. A data selector 944 has three data inputs at 946 from lines 856, 828 and 838, each carrying 6.312 Mb/s data streams. Two of the selection bits from control 868 determine which of these three data streams is passed through to output 948.

If the selection code on control 868 chooses clock signals from line 830 or 840 in clock selector 940, then this selection code will likewise choose data from line 828 or 838, respectively, in data selector 944 to be output on 948. If clock selector 940 chooses one of the four low speed clocks on 848, 850, 852 or 854 to be output on 942 in accordance with the selection code from 868, then such code chooses input data from 856 in data selector 944 to be output on 948.

In preferred form, selector 944 includes a clock select portion 950 in addition to data select portion 946. This provides for the selection of a delayed or a nondelayed clock signal from selector 940. The timing relationship between low speed clock signals and multiplexed data on line 856 may make it desirable to delay the clock, in the current system by approximately 100 nanoseconds, prior to demultiplexing the data stream. A delay may be provided by an RC delay circuit 952.

When the input data stream on 856 is delivered on output 948, then the clock select portion 950 of selector 944 delivers a delayed clock signal from 954 to output 956. In this situation, there is a 6.312 Mb/s data stream on output 948 and a 1.544 MHz clock signal on output 956. This clock signal picks off the correspondent data channel in the data stream on 948 by demultiplexing the data stream through a data retime flip-flop 958. This provides a 1.544 Mb/s data stream as data A and a 1.544 MHz clock signal as clock A.

When the data stream from 828 or 838 is passed through to output 948, then the clock select portion 950 of selector 944 delivers a nondelayed clock signal from 960 to output 956. The intermediate speed clock signal on 956 is applied to data retime flip-flop 958. This provides a 6.312 Mb/s data stream as data A synchronized with a 6.312 MHz clock signal as clock A. Data A and clock A signals are delivered to data comparator 880, FIG. 13b.

Section B of Data Comparator Interface 810, FIG. 16

The first input side 808 of monitor 101, FIG. 1, is provided by section B of the data comparator interface 810, FIG. 13b, as shown at data entry 808. Section B of the data comparator interface 810 includes a line selector 960, FIG. 16, receiving as inputs two bipolar data streams from the LBO/Switch monitor buses 870 and 871 for Lines 1 and 2, FIGS. 1, 2a, 9a, 13a and b and 16. These signals are either at a 1.544 Mb/s rate or a 6.312 Mb/s rate. In one form, the data streams are balanced bipolar and are converted to single-ended signals by transformers (not shown). The line selector 960 chooses one of the inputs 870 or 871 according to the selection bit on 878 for delivery to output 962.

The selected line signal on 962 is input to an adaptive bipolar slicer 964. This type of circuit typically includes an input buffer amplifier which is output to a peak detector which in conjunction with a threshold adjuster sets the threshold for the bipolar slicer in proportion to the signal amplitude. A minimum threshold clamp sets the minimum allowable signal level, so that an all zeros condition can be recognized as such. In one form, a slicer may have two TTL outputs, one output going to a logic 1 for positive pulses, and the other output going to a logic 1 for negative pulses. The output of the slicer may be passed through a B6ZS decoder 966 if needed to extract such code from the signal.

The output of the slicer 964 is also delivered to a clock recovery circuit 968 for extraction of clock signals. In one form, the clock recovery circuit OR's two TTL outputs of the slicer to obtain return-to-zero data (RZ). The RZ data is applied as the input to a clock recovery phase locked loop. The phase locked loop adjusts the phase of the recovered clock so that the RZ data can be retimed by a clock transition in the middle of the RZ data pulse. A sampling phase detector measures the phase error between the recovered clock and the RZ clock. The error signal is amplified by a loop amplifier to produce VCO control voltage, which increases or decreases voltage controlled oscillator frequency as necessary to maintain proper phase alignment. A voltage controlled oscillator operates at approximately 12.6 MHz and is divided in frequency by either 2 or 8 depending on the state of one of the selection bits in control 868 (FIG. 15). The output clock signal on 970 can thus be at either 1.544 MHz or 6.312 MHz. In this example, a voltage controlled oscillator frequency offset circuit is used since the ratio between 6.312 and 1.544 MHz is not exactly 4 to 1.

The output of the clock recovery circuit 968 is also applied to a data retime flip-flop 972 together with the output of the decoder 966. The output of the flip-flop is a 1.544 Mb/s or 6.312 Mb/s data stream as data B synchronous with clock signals of 1.544 MHz or 6.312 MHz respectively, as clock B. Data B and clock B are delivered to data comparator 880, FIG. 13b.

Figure 17:
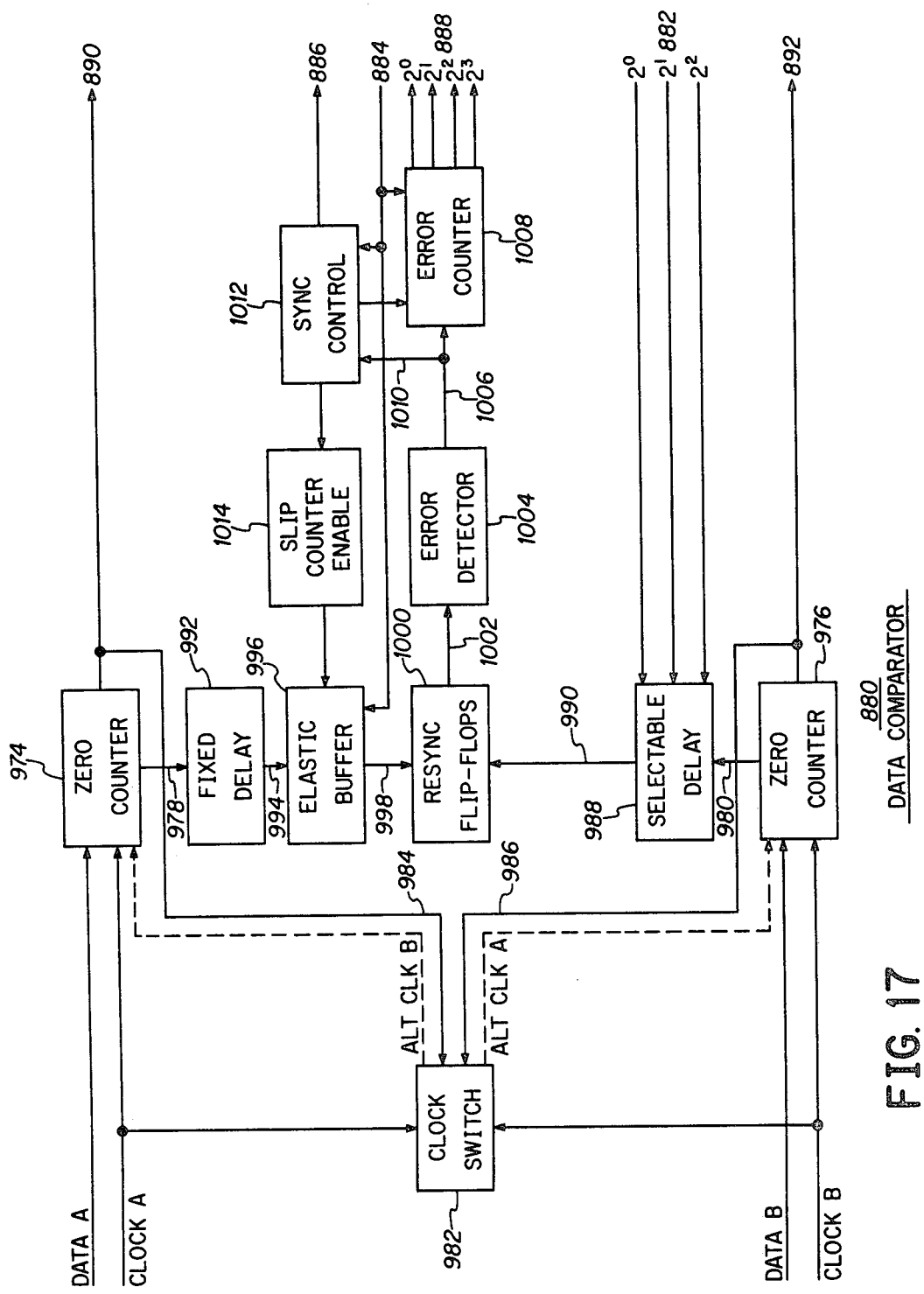
FIG. 17 is a schematic circuit diagram showing data comparator 880 of FIG. 13.

Data Comparator 880, FIG. 17

The data comparator 880 of FIG. 13b is illustrated in FIG. 17. Comparator 880 is used to compare two data signals A and B and their associated clocks A and B at either 1.544 MHz or 6.312 MHz. The comparator synchronizes these signals (in one form to plus or minus 7 bits input offset) and counts the errors that occur. The signal streams are compared bit for bit, and each noncoincidence constitutes an error. The number of errors occurring in a given sampling time interval or window indicates the bit error rate.

Each data line is provided with a zero counter 974 and 976 to detect a given number of consecutive zeros chosen to usually indicate an input disconnect, equipment malfunction or the like. In one form, 63 consecutive zeros has been found statistically satisfactory to indicate a lack of data activity, and the zero counters 974 and 976 are set to send flag signals over outputs 890 and 892 upon such occurrence. In normal operation, data and clock A are passed through zero counter 974 to output 978, and data and clock B are passed through zero counter 976 to output 980.

In one form, a clock switch 982 is provided with input connections 984 and 986 for receiving an all zeros indication from 890 or 892. When data is lost, it is assumed that the associated clock is also lost. The clock switch 982 routes the remaining clock signal in the missing one's place to clock that side of the system. If data A is lost, clock switch 982 sends clock B as an alternate or backup to zero counter 974 for processing through the system. If data B is lost, clock switch 982 sends clock A as an alternate or backup to zero counter 976 for processing through the system. Clock or data pulses override the substitution. Thus, a loss of either clock, when the data is lost, is compensated for by using the remaining input clock on both lines to the rest of the circuit.

Data B and clock B are delivered via 980 to a selectable delay circuit 988. In one form, this circuit includes a 32 bit tapable shift register comprising four 8 bit shift registers in cascaded relation. Eight jumper wires are connected to designated output ports of the registers, preferably two wires to each register, with one of the two wires connected to the highest order output port and the other wire to a middle level output port. The jumper wire from the highest order output port of the fourth or final register provides the maximum delay of 32 time bits, and this has been found sufficient for the current system. Longer delays can easily be provided by additional cascaded registers. The eight jumper wires lead to a one-of-eight selector which delivers an output on 990 in accordance with the selection code on 882.

Data A and clock A are delivered via 978 to an eight bit shift register 992. This provides a fixed delay in the A data at eight clock time bits, and delivers delayed data A at 994. It has been found desirable to provide a delay in the data A stream when the receive side of the muldem, FIG. 1, is being monitored. Data A is derived from 875 or 876 entering the second input side 812 of the monitor and passes through the demultiplexing circuitry of the monitor 101. Data B is derived from 870 or 871 entering the first input side 808 of the monitor and has already passed through the demultiplexing circuitry of the receive side of the muldem. In this situation, data B may or may not be ahead of data A. It is thus desirable to delay data A by a sufficient amount to insure it lags data stream B, and let selectable delay 988 for data stream B bring the two data streams A and B into alignment.

It may be recalled that when the transmit side of the muldem, FIG. 1, is being monitored, data stream B derived from 870 and 871 at the first input side 808 comes from the line and group inputs without passing through any demultiplexing or multiplexing circuitry and hence is substantially nondelayed. Data stream A, however, has passed through the multiplexing circuitry of the transmit side of the muldem and through the demultiplexing circuitry of the monitor, and thus is behind data stream B. Selectable delay 988, FIG. 17, delays data stream B to bring the two data steams A and B into alignment and enable bit for bit comparison.

Returning to FIG. 17, data stream A is fed via 994 to an elastic buffer 996. This elastic buffer enables data stream A to slip bits in time and more finely tune the alignment of data streams A and B beyond the preliminary alignment afforded by selectable delay 988. The buffer enables incremental one bit time shifts of data stream A and may be repeated as needed.

Delayed and slip shifted data stream A is delivered via 998 to a resynchronization flip-flop circuit 1000. Selectably delayed data stream B is delivered via 990 to this resynchronization flip-flop circuit 1000. In one form, this resynchronization circuit includes a pair of flip-flops, one receiving data stream A and the other receiving data stream B. Both flip-flops are clocked by clock B to thus provide synchronized outputs at 1002.

The output of the resynchronization circuit 1000 is delivered via 1002 to an error detector 1004. In one form, this error detector includes an exclusive OR gate having a pair of inputs from the parallel synchronized outputs of the flip-flops in circuit 1000. The output of the exclusive OR gate goes high when a bit error occurs, i.e. when there is a noncoincidence of bits between data stream A and data stream B for the current bit time slot.

The output of error detector 1004 is delivered via 1006 to an error counter circuit 1008. This circuit counts the number of noncoincidences or bit errors and registers the count over four bit connection 888, FIGS. 17 and 13b. In one preferred form, the error signal on 1006 to be counted in error counter 1008 is gated against a clock B pulse through an AND gate to provide count pulses even if a multibit error causes the line to remain high.

The output of the error detector 1004 is also delivered via 1010 to a synchronization control circuit 1012 which is connected to a slip counter enable circuit 1014 which in turn controls elastic buffer 996. An error signal from 1010 is gated against a slip signal and activates slip counter enable 1014 to cause elastic buffer 996 to slip shift data stream A. After this slip shift, data streams A and B on 998 and 990 are again compared, and if an error again appears at 1010, the slip shift is repeated. This sequence is carried out until data streams A and B are aligned or cannot be aligned due to data loss or the like.

In one form, elastic buffer 996 includes a pair of eight bit multiple port registers serving as read/write buffers which are simultaneously addressed by two counters, a write counter and a read counter. Storage flip-flops are provided so that the data strobed-in in accordance with the incremented addresses from the write counter may lead the data strobed-out in accordance with the incremented addresses from the read counter. The time lag between the correspondent write and then read addresses shifts or slips the data stream in time. Slip counter enable 1014 enables the read counter for incrementation of the read address. This offsets the write and read addresses by one additional bit, whereby the data is read out one bit later, and thus data stream A is shifted by one bit. Alternatively, an error signal on 1010 may disable the slip counter enable 1014 which in turn disables the read counter for one bit such that the read address lags the write address by one less bit and data stream A is read out one bit earlier whereby to shift or slip data stream A one bit forward. In this latter form, the read and write counters are continuously incremented by the system clock, for example, clock B.

Synchronization control 1012 includes counter circuitry which reacts to the processing of a given consecutive number of error free data bits, in the current system sixteen. This control sends a sync signal on 886 and also causes the above noted slip signal to go low to prevent slip shifting by elastic buffer 996 even if an error signal appears on 1010. A short sampling time interval or window, sixteen bits in the current system, is now open and counter 1008 is enabled and records the number of bit errors. At the end of this interval, reset can be provided the monitor 800 on 884.

Monitor Control Software

In a preferred embodiment, monitor 800 of FIG. 13 is implemented using a microprocessor. For example, it is possible to embody the monitor in a microprocessor with 8 K bytes of PROM and 512 bytes RAM. Program sequences important to the operation of the monitor are set forth below in considerable detail. Each sequence is presented as a listing of functional steps, expressed in English language form rather than in a computer language. Generally, following each sequence there is a discussion of the sequence.

| LIST OF SEQUENCES | |
|---|---|
| Sequence 1 | Main Test Control Sequence |
| Sequence 2 | Self Test |
| Sequence 3 | Error Injection Test |
| Sequence 4 | Bit-Error-Rate Test |
| Sequence 5 | Receive Data Path Test |
| Sequence 6 | Set Up Path to be Monitored |
| Sequence 7 | Monitor Test |
| Sequence 8 | Test of Standby LS/IS XMT in Preparation for Protective Switching |
| Sequence 9 | Test of Standby LS/IS RCV in Preparation for Protective Switching |
| Sequence 10 | Transmit Data Path Test |
| Sequence 11 | Standby Transmit Data Path Test |

-continued

LIST OF SEQUENCES

| | |
|---|---|
| Sequence 12 | Standby Receive Data Path Test |
| Sequence 13 | Isolation of Low Speed Failures to Channel or Common Module |
| Sequence 14 | Transmit Test of Off-Line Main High Speed Unit |
| Sequence 15 | Transmit Test of Off-Line Main Low Speed Unit |
| Sequence 16 | Manual Monitoring |
| Sequence 17 | Switch to Low Speed Standby |
| Sequence 18 | Switch to High Speed Standby |
| Sequence 19 | LS/IS Alarm Updating |
| Sequence 20 | Detecting Partially Equipped Low Speed Groups |
| Sequence 21 | Receive Test of Off-Line Main High Speed Unit |

| Sequence 1 Main Test Control Sequence |  |
|---|---|
| 1.0 | Start |
| 1.1a | Initialization |
| 1.1b | Read from hardware selectors: Bit error rate threshold Auto revert or manual revert after protective switching |
| 1.2 | Automatic monitoring or manual monitoring? Manual - Go to Sequence 16 Automatic - Go to 1.3 |
| 1.3 | Perform Self Test (Seq. 2) |
| 1.4 | Set channel number, CH = 1 Set group number, GP = 1 |
| 1.5 | Perform RCV data path tests (Sequence 5), for line numbers = 0, 1 and 2, then XMT tests (Sequence 10) for lines 0, 1 and 2. Line 0 is standby. |
| 1.6 | Increment GP |
| 1.7 | All groups tested? No - Go to 1.5 Yes - Go to 1.8 |
| 1.8 | Update alarms |
| 1.9 | Reset GP = 1 Increment CH |
| 1.10 | All channels tested? No - Go to 1.5 Yes - Go to 1.11 |
| 1.11 | Bridge standby LS/IS unit to XMT input of next equipped group and bridge standby HS RCV input to appropriate Line 1 or 2. |
| 1.12 | Go to 1.2 |

One of the important steps in initialization by the monitor is to read the bit-error-rate threshold at which a tested signal path is considered to have failed. The threshold can be set, for example, with back panel switches, by the user of the muldem to meet his particular communication and reliability requirements.

If the system is operating in its normal automatic monitoring mode, then it performs a self test, which will be described below in connection with Sequence 2.

After the self test, the monitor begins to perform bit for bit testing of the data paths of the multiplexer/demultiplexer 100. It is important to recognize that step 1.5 is the inner loop of the sequence, and it is the line number which is incremented in that loop, rather than the group or channel number. Both the transmit and receive paths are tested here. The group number is incremented at step 1.6, and the channel number is incremented at step 1.9 in the outermost loop. The effect is that the monitor switches from line to line as often as possible, so that if there is a high speed failure affecting all the groups on a particular line, it will be detected as soon as possible, with minimum loss of message traffic.

The tests of the standby paths use data taken from the various groups of Lines 1 and 2. On the transmit side, the relay 183 of FIG. 4 is closed for a selected one of the LBO/switches to send data to the standby unit. This monitoring path is illustrated in FIG. 25, wherein a broken line signal path 401 indicates an example in which the user data is "bridged" to the intermediate speed standby unit from the Line 1, group 2 LBO/-Switch. FIG. 26 shows that on the receive side, input data is taken from Line 1 or Line 2 to standby path for the monitor testing.

Accordingly, after all groups and channels have been tested once, the low speed/intermediate speed standby unit is bridged to the next equipped group in Line 1 or 2. If the standby line has been taking its data from the last equipped group in Line 1, it now begins taking its transmit input data from the first equipped group in line 2. In this latter situation, the receive section must be switched so that input to the standby line is the high speed input to Line 2.

| Sequence 2 Self Test |  |
|---|---|
| 2.0 | Enter |
| 2.1 | Perform ROM test |
| 2.2 | Perform RAM test |
| 2.3 | Perform Error Injection Test (Seq. 3) |
| 2.4 | Memory error detected? Yes - Display Error Code and Go to 2.1 No - Return |

| Sequence 3 Error Injection Test |  |
|---|---|
| 3.0 | Enter |
| 3.1 | Select an error free data path |
| 3.2 | Command Selector Module 814 to inject errors |
| 3.3 | Perform (long) bit-error-rate test (Seq. 4) |
| 3.4 | Errors detected? Yes - Go to 3.6 No - Go to 3.5 |
| 3.5 | Set monitor alarm |
| 3.6 | Remove the command to inject errors |
| 3.7 | Return |

In the self test, the processor performs a check sum test on the ROM and a write and compare test on the RAM. Then the error injection test of Sequence 3 is performed.

In the error injection test, after an error free data path has been selected, the selector module 814 of FIG. 14 is commanded to inject errors into its output. The bit error rate test of Sequence 4 is performed on the error free data path, while errors are purposely injected. If no errors are detected in step 3.4, then there is most likely a malfunction in the monitor equipment, so an alarm is set accordingly.

| Sequence 4 Bit Error-Rate-Tests |  |
|---|---|
| 4.0 | Enter |
| 4.1 | Is this a test on a path which has failed? Yes - Go to 4.2 No - Go to 4.3 |
| 4.2 | Set threshold of 1 error over very long time interval, then go to 4.6 |
| 4.3 | Short test? No - Go to 4.5 Yes - Go to 4.4 |
| 4.4 | Short Test - Set threshold at low number of erors over short time interval, then go to 4.6 |
| 4.5 | Long Test - Set threshold at larger number of errors over a long time interval |
| 4.6 | Reset the comparator |
| 4.7 | Is the comparator in sync? No - Go to 4.13 Yes - Go to 4.8 |
| 4.8 | Go into idle loop based on the selected test interval |
| 4.9 | Comparator detected all zeroes? No - Go to 4.11 |

| Sequence 4 Bit Error-Rate-Tests |
| --- |
| Yes - Go to 4.10 |
| 4.10 Declare failure, set "all zeroes detected" flag and Return |
| 4.11 Was threshold number of errors detected? No - Go to 4.13 Yes - Go to 4.12 |
| 4.12 Set "Section failed" flag and Return |
| 4.13 Clear "Section failed" flag (Pass) |
| 4.14 Return |

The basic test of Sequence 4 is to compare the number of bit errors detected by data comparator 880 with a threshold number. If the threshold is exceeded, then there is considered to be a failure in the path tested. One of the first questions to be asked in Sequence 4 is at step 4.1 which determines whether the path under test is a failed path which has never been determined by the monitor to be in proper operation. This is done because the system of the present invention subjects such failed sections to a more stringent test than unfailed sections. This is a form of hysteresis which prevents sections with marginal operation from being repeatedly automatically switched in and out of the main signal path by the monitor. For example, if the threshold for unfailed sections is $10^{-5}$ (1 error per $10^5$ bits), then an appropriate threshold for a failed section is $10^{-7}$. In step 4.2 this would be implemented by setting the threshold as one error, detected over the very long test interval necessary to test $10^7$ bits.

If the test is not on a failed section, then either the short or long test is performed. In the short test of 4.4, a low number of errors, for example one, is required to be detected over a short interval (e.g., necessary to test $10^5$ bits), in order to be classified as a failure. In the long test, a larger number of errors is required to be detected over a longer interval, for example 10 errors over a period testing $10^6$ bits. Preferably, the short and long test threshold is the same number of bit errors per second, but the long test has greater statistical significance, because of the longer measurement interval used.

Once the thresholds have been set, the monitor issues a reset command to the comparator and checks whether it is in synchronization. Then the monitor waits while the bit errors, if any, are counted. If the all zeroes detector of the data comparator 880 detects no data activity then this information is flagged by the monitor.

| Sequence 5 Receive Data Path Test |
| --- |
| 5.0 Enter and set up path to be monitored (Seq. 6) |
| 5.1 Is the selected group equipped? Yes - Go to 5.2 No - Return |
| 5.2 Is High Speed Receive Common in sync? Yes - Go to 5.6 No - Go to 5.3 |
| 5.3 Is High Speed Monitor Demultiplexer 822 in sync? Yes - Go to 5.5 No - Go to 5.4 |
| 5.4 External problem - Declare failure of receive input to muldem ("Line to Receive" failure) and Return |
| 5.5 Internal (High Speed Receive Common) problem - alarm and go to 5.20 |
| 5.6 Is High Speed Monitor Demultiplexer 822 in sync? Yes - Go to 5.8 No - Go to 5.7 |
| 5.7 Perform Monitor Test (Seq. 7) and Return |
| 5.8 Perform Short Bit-Error-Rate Test (Seq. 4) |
| 5.9 Results of Test? Failed - Go to 5.10 Passed - Return |
| 5.10 Perform Long Bit Error Rate Test (Seq. 4) Failed - Go to 5.12 Passed - Return |
| 5.11 All zeroes condition? Yes - Go to Seq. 20 (Detecting Partially Equipped Groups) No - Go to 5.12 |
| 5.12 Set up and perform Short Bit Error Rate Test on all equipped groups in this line, counting number of passes and fails |
| 5.13 Is number of failures greater than number of passes? Yes - Go to 5.20 No - Go to 5.14 |
| 5.14 (There is probably a LS/IS failure in the path originally under test) Perform Test of Standby RCV Before Protective Switching (Seq. 9) |
| 5.15 Result of test Pass - Go to 5.18 Fail - Go to 5.16 |
| 5.16 Report major alarm, Loss of Traffic |
| 5.17 Return |
| 5.18 Switch failed LS/IS path to standby (Seq. 17) and report alarm |
| 5.19 Return |
| 5.20 (There is probably a HS failure in the path originally under test) Perform Standby RCV/Data Path Test (Seq. 12) |
| 5.21 Result of test Pass - Go to 5.24 Fail - Go to 5.22 |
| 5.22 Report Major alarm, Loss of Traffic |
| 5.23 Return |
| 5.24 Switch filed HS unit to standby (Seq. 18) and Report Alarm |
| 5.25 Return |

Sequence 5 is the main test sequence of the receive data paths of Line 1 and Line 2. These are illustrated in FIG. 26. The receive input data is monitored at point 875 or point 876, depending on which line is being currently monitored. The receive output is monitored either at LBO/Switch monitor bus 870 for Line 1 or bus 871 for Line 2. The monitor enables the LBO/Switch module of the group selected for monitoring so as to send the receive output data onto the monitor bus.

Figure 21:
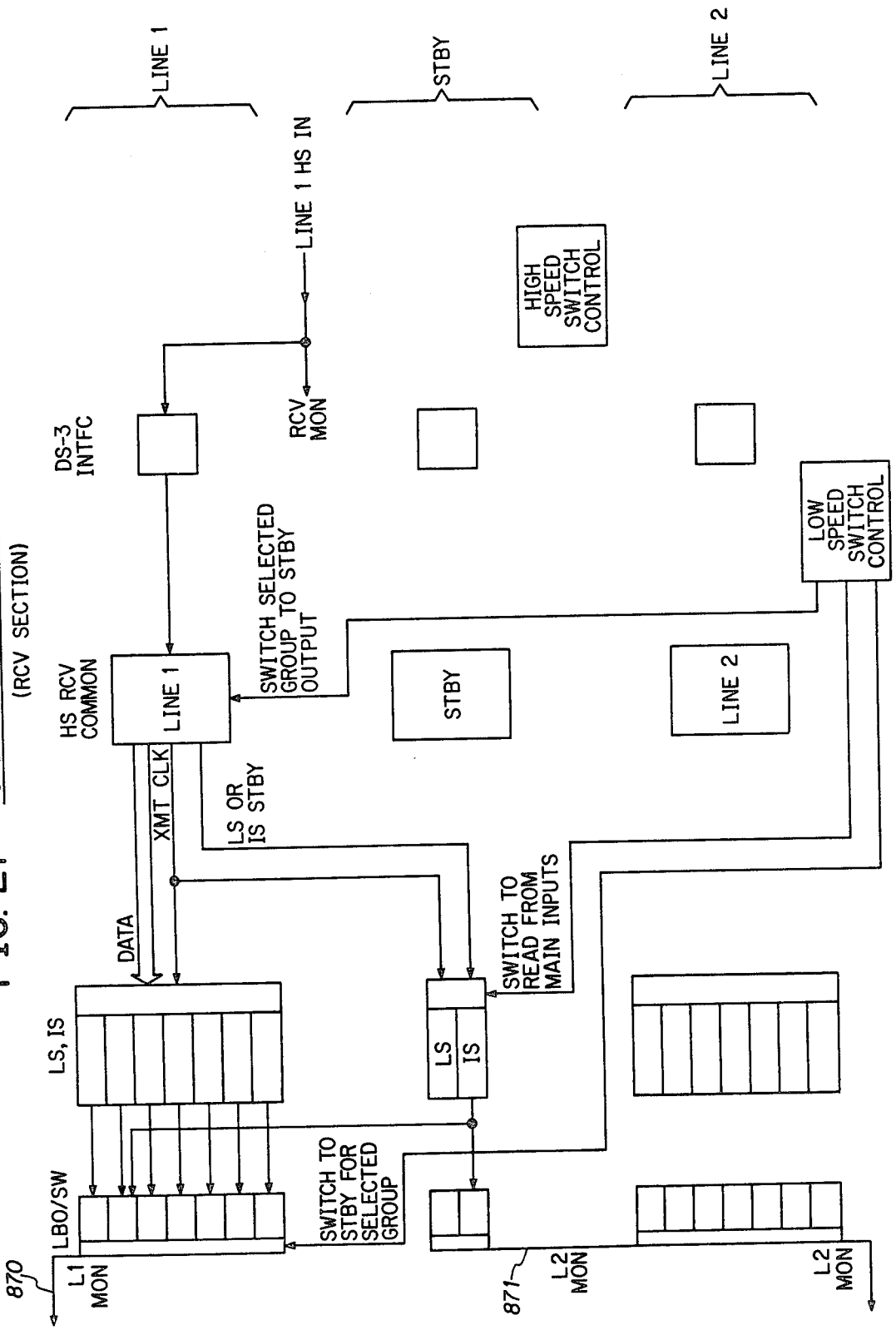
FIG. 21 is a block diagram of the receive section of the muldem of FIG. 1, illustrating a switch of the low-/intermediate speed standby unit.

In addition to the monitoring of Line 1 and Line 2 as illustrated in FIG. 26, the Sequence 5 test can also monitor the path shown in FIG. 21. In that figure, one of the intermediate speed groups in Line 1 has failed, leading to a switch to intermediate speed standby. The monitor can continue to pick up any of the seven low speed/intermediate speed groups on the Line 1 monitor bus 870, including the failed unit. Moreover, the output of the intermediate speed standby unit is monitored at its LBO/Switch, which is read by the Line 2 monitor bus 871.

Figure 22:
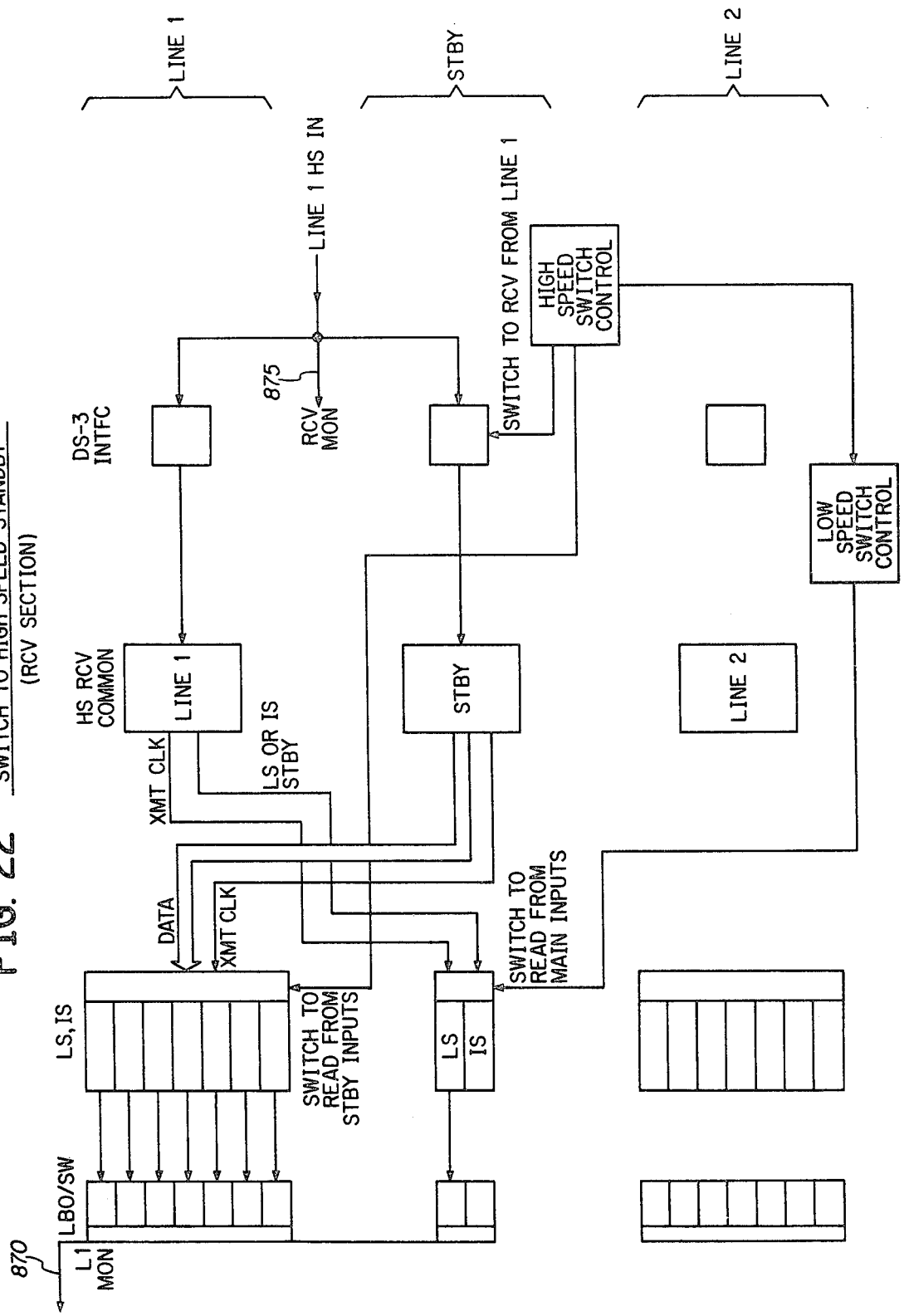
FIG. 22 is a block diagram of the receive section of the muldem of FIG. 1, illustrating a switch to the high speed standby unit.

Another example of monitoring an on-line data path is shown in FIG. 22, where there has been a switch to high speed standby from Line 1. Once again, the monitoring points are point 875 and point 870.

After the receive path to be monitored has been set up (Sequence 6) at step 5.1, then the monitor checks at step 5.2 to be sure that the High Speed Receive Common in the monitor path has been able to synchronize to the incoming data. If it has not, then there is a check at step 5.3 to determine if the High Speed Monitor Demultiplexer 822 (FIG. 13) is synchronized with the data. If Demultiplexer 822 is also not able to synchronize with the data, then the decision is made that the data received at the input to the demultiplexer is absent or bad, that is, that there is a problem external to the muldem. The monitor declares this so-called "line to receive" failure and returns.

If the High Speed Monitor Demultiplexer 822 is able to synchronize with the data, this means that there is a muldem internal problem, most probably something wrong with the High Speed Receive Common module under test which could not synchronize. Accordingly, the monitor begins preparation to switch the traffic through the high speed unit under test to the standby high speed unit. As a part of the preparation, the standby high speed receive unit is tested, beginning at step 5.20, to make sure that it will protect the traffic when it goes on-line. This testing of the standby unit will be described below in connection with Sequence 12. If the high speed standby receive unit satisfactorily passes the test, then at step 5.24 the high speed is switched to standby. If it is detected that the high speed standby unit is also failed, then at 5.22 a major alarm is reported inasmuch as the traffic cannot be protected by switching.

If there is no problem in step 5.2 with synchronization of the High Speed Receive Common module, then the monitor proceeds toward performing bit for bit testing. First in step 5.6 it makes sure that the High Speed Monitor Demultiplexer 822 can synchronize to the data. If not, then the monitor equipment is suspect and, at step 5.7 a monitor test (Sequence 7) is begun. If the monitor is synchronizing to the high speed data, then the short bit error rate test can be initiated at step 5.8. When this test is complete, if it is passed, then the test of a selected signal path is over and the path is considered good.

If the selected signal path fails the short bit-error-rate, then it is subjected at step 5.10 to the long bit-error-rate test It will be remembered that this test requires a longer observation interval and the occurrence of a preselected number of multiple error bits in order to declare a failure. It may be that in the longer test, the path performs well enough to pass, in which case this test of the selected path is over.

If the selected path fails the long bit-error-rate test, then the monitor attempts to determine if the failure is in the low speed/intermediate speed section of the path or in the high speed section. This determination is made at step 5.12, where the monitor undertakes to perform the short-bit-error rate test on all the equipped groups in the selected line, counting the number of passes and the number of failures. If the number of failures is greater than the number of passes, then it is probably the high speed section, common to all groups, which is at fault. In this case, the monitor begins at step 5.20 the same kind of preparation for switching to high speed standby that was described above.

By comparing the number of failures and passes, the monitor is employing a majority voting procedure for fault localization. Groups may be added or removed, even while the muldem is in operation, without disruption to such a procedure.

If there are not more failures than passes, then there is probably simply a low speed/intermediate speed failure in the group originally selected for test. In this case, the monitor begins preparations for a protective switch to the low speed or intermediate speed standby units. Once again, at step 5.14, it checks the low speed/intermediate speed standby units to make sure they will be able to protect the traffic after switching. If it is determined that they will not, then a major alarm is reported. If the low speed/intermediate speed standby units are functional, then traffic is switched onto the standby path.

| Sequence 6 Set Up Path to be Monitored |
|---|
| 6.0 Enter |
| 6.1 Select line, group and channel at Monitor Line Selector, High Speed Monitor Demultilexer, Low Speed Monitor Demultiplexer and Data Comparator Interface |
| 6.2 Select line, group and channel at LBO/Switch module |
| 6.3 Read identity bits at LBO/Switch module |
| 6.4 Is the group equipped?<br>Yes - Go to 6.7<br>No - Go to 6.5 |
| 6.5 Has this group been equipped previously?<br>No - Flag and return<br>Yes - Go to 6.6 |
| 6.6 Report alarm condition and Return |
| 6.7 Is this group locked out (prohibited from being switched to standby)?<br>No - Go to 6.9<br>Yes - Go to 6.8 |
| 6.8 Check memory for previously read identity bits, to find whether this group is LS or IS |
| 6.9 Send proper delay to comparator, based on whether group is IS or LS |
| 6.10 Allow time for synchronizing by High Speed Monitor Demultiplexer and Low Speed Monitor Demultiplexer |
| 6.11 Return |

In setting up the path to be monitored, the monitor must issue line, group and channel codes to the Monitor Line Selector 814 (FIG. 13), the High and Low Speed Monitor Speed Demultiplexers 822 and 836 and the Data Comparator Interface 810. Further, as will be recalled from FIGS. 4 and 5, the monitor must issue to an LBO/Switch module group enable, transmit/receive select and channel select codes. The selected LBO/Switch is enabled to pass information onto one of the monitor buses.

The monitor reads the identity bits from the selected LBO/Switch module, at step 6.3. From the identity bits, the monitor can determine whether the selected group is low speed, intermediate speed, unequipped or locked out. "Lockout" means that this data path is not to be switched to standby, and can be indicated by both identity bits being a logical one. If the group is unequipped, having no LBO/Switch, then both identity bits will be absent, which can be read as both logical zero. If it is determined from the identity bits that the group is not presently equipped, but a code stored in memory indicates in step 6.5 that the group was previously equipped, then an alarm condition is reported. This alarm can be manually cleared if the group is no longer going to be equipped. If it is determined in step 6.7 that the group is locked out, then the memory is checked for previously read identity bits to find whether the group is intermediate speed or low speed. Based on whether the selected group is intermediate or low speed, the proper delay is sent to data comparator 880 (FIG. 13), then time is allowed for synchronization of the high speed monitor demultiplexer 822, and the low speed monitor demultiplexer 836, if necessary.

The ability of the monitor to detect from the identity bits whether a group is equipped or not permits a group to be added or removed while the muldem continues to operate. An ability to detect low speed groups which are partially equipped with channels (Sequence 20) is likewise important in adding and removing circuits. If a group (or channel) is equipped, it is monitored; otherwise it is ignored. The monitor can immediately identify whether the group is low or intermediate speed. This feature, together with the general interconnection of the transmit and receive sections (FIGS. 2 and 9) dispenses with the need for special changes to the system, such as the use of jumpers, upon addition or removal of a group. There is no need to interfere at all with the ongoing data traffic through the muldem.

| Sequence 7 Monitor Test |
| --- |
| Comment: This is entered when a first test on a data path has already failed. |

7.0 Enter
7.1 Perform a second test which is the same (XMT or RCV) as the first test, but on the standby path, and with same group and channel number as the first test, if possible (limit to short bit error rate test).
7.2 Results of test
    Passed - Go to 7.3
    Failed - Go to 7.4
7.3 Flag and Return
7.4 Perform third, fourth, fifth and sixth tests from the untested paths in the following group, using the same group and channel as the first test where possible:
    Line 1 XMT
    Line 0 XMT (standby)
    Line 2 XMT
    Line 1 RCV
    Line 0 RCV (standby)
    Line 2 RCV
7.5 Was number of failures greater than number of passes?
    Yes - Go to 7.7
    No - Go to 7.6
7.6 Flag and Return
7.7 Declare Monitor Failure This test is performed when the High Speed Monitor Demultiplexer has been found unable to synchronize or satisfy the bit-for-bit test with the data from the group selected for test, as for example, in step 5.6. In this circumstance, it is important to make a determination whether the data is bad or whether there is a monitor problem. This is accomplished by checking the response of the monitor to other groups.

In step 7.1, the monitor attempts to perform on the standby path the same kind of test which was just failed. If this test is passed, then the monitor is considered all right. If the monitor fails to form a successful test on the standby path, then it proceeds to attempt the remaining four tests in the inner loop of Sequence 1 at step 1.5. If the number of failures in the six tests is greater than the number of passes, then a monitor failure is declared.

| Sequence 8 Test of Standby LS/IS XMT in Preparation for Protective Switching |
| --- |

8.0 Enter
8.1 Is standby LS/IS unit available (i.e., not carrying traffic)?
    Yes - Go to 8.3
    No - Go to 8.2
8.2 Is the High Speed Monitor Demultiplexer in sync?
    Yes - Return
    No - Go to 8.7
8.3 Is the standby high speed unit available?
    No - Go to 8.7
    Yes - Go to 8.4
8.4 Is the High Speed Monitor Demultiplexer in sync?
    No - Go to 8.7
    Yes - Go to 8.5
8.5 Perform short bit-error-rate test on standby path
8.6 Return
8.7 Perform Monitor Test (Seq. 7)

| Sequence 8 Test of Standby LS/IS XMT in Preparation for Protective Switching |
| --- |
| -continued |

8.8 Return

| Sequence 9 Test of Standby LS/IS RCV in Preparation for Protective Switching |
| --- |

9.0 Enter
9.1 Is standby LS/IS unit available (not carrying traffic)?
    Yes - Go to 9.3
    No - Go to 9.2
9.2 Is standby high speed receive unit in sync?
    Yes - Return
    No - Go to 9.8
9.3 Is standby high speed unit available?
    No - Go to 9.8
    Yes Go to 9.4
9.4 Is the standby high speed receive unit in sync?
    No - Go to 9.8
    Yes - Go to 9.5
9.5 Is the High Speed Monitor demultiplexer in sync?
    No - Go to 9.8
    Yes - Go to 9.6
9.6 Perform short bit-error-rate test on standby path
9.7 Return
9.8 Perform Monitor Test
9.9 Return In Sequence 8, the transmit standby path is tested after having found a fault in one of the on-line low/intermediate speed signal paths, and in preparation for switching to one of the standby units. In Sequence 9, the receive standby path is tested under the same circumstances. After checking to be sure that the standby low-/intermediate speed units and high speed unit are available, and that the standby high speed receive unit can synchronize, along with the High Speed Monitor Demultiplexer, the standby path is subjected to a short bit-error-rate test. If the path passes the test, then data from the failed group or line can successfully be protected by switching it to the standby path.

| Sequence 10 Transmit Data Path Test |
| --- |

10.0 Enter and set up path to be monitored (Seq. 6)
10.1 Is the selected group equipped?
    Yes - Go to 10.2
    No - Return
10.2 Is High Speed Monitor Demultiplexer in sync?
    Yes - Go to 10.4
    No - Go to 10.3
10.3 Perform Monitor Test (Seq. 7) and Return
10.4 Perform Short Bit-Error-Rate Test (Seq. 4)
10.5 Results of Test?
    Failed - Go to 10.6
    Passed - Return
10.6 Perform Long Bit-Error-Rate Test (Seq. 4)
10.7 Results of Long Test?
    Failed - Go to 10.8
    Passed - Return
10.8 All zeroes condition?
    Yes - Go to Seq. 20 (Detecting Partially Equipped Groups)
    No - Go to 10.9
10.9 Set up and perform Short Bit-Error-Rate Test on all equipped groups in this line, counting number of passes and fails
10.10 Is number of failures greater than number of passes?
    Yes - Go to 10.17
    No - Go to 10.11
10.11 (There is probably a LS/IS failure in the path originally under test) Perform Test of Standby LS/IS XMT Before Protective Switching (Seq. 8)
10.12 Result of test
    Pass - Go to 10.15

| Sequence 10 Transmit Data Path Test |
|---|
| Fail - Go to 10.13 |
| 10.13 Report major alarm, Loss of Traffic |
| 10.14 Return |
| 10.15 Switch failed LS/IS path to standby (Seq. 17) and report alarm |
| 10.16 Return |
| 10.17 (There is probably an HS failure in the path originally under test.) Perform Test Standby Transmit Data Path Test (Seq. 11) |
| 10.18 Result of test<br>Pass - Go to 10.21<br>Fail - Go to 10.19 |
| 10.19 Report Major alarm, Loss of Traffic |
| 10.20 Return |
| 10.21 Switch failed HS unit to standby (Seq. 18) and Report Alarm |
| 10.22 Return |

Figure 19:
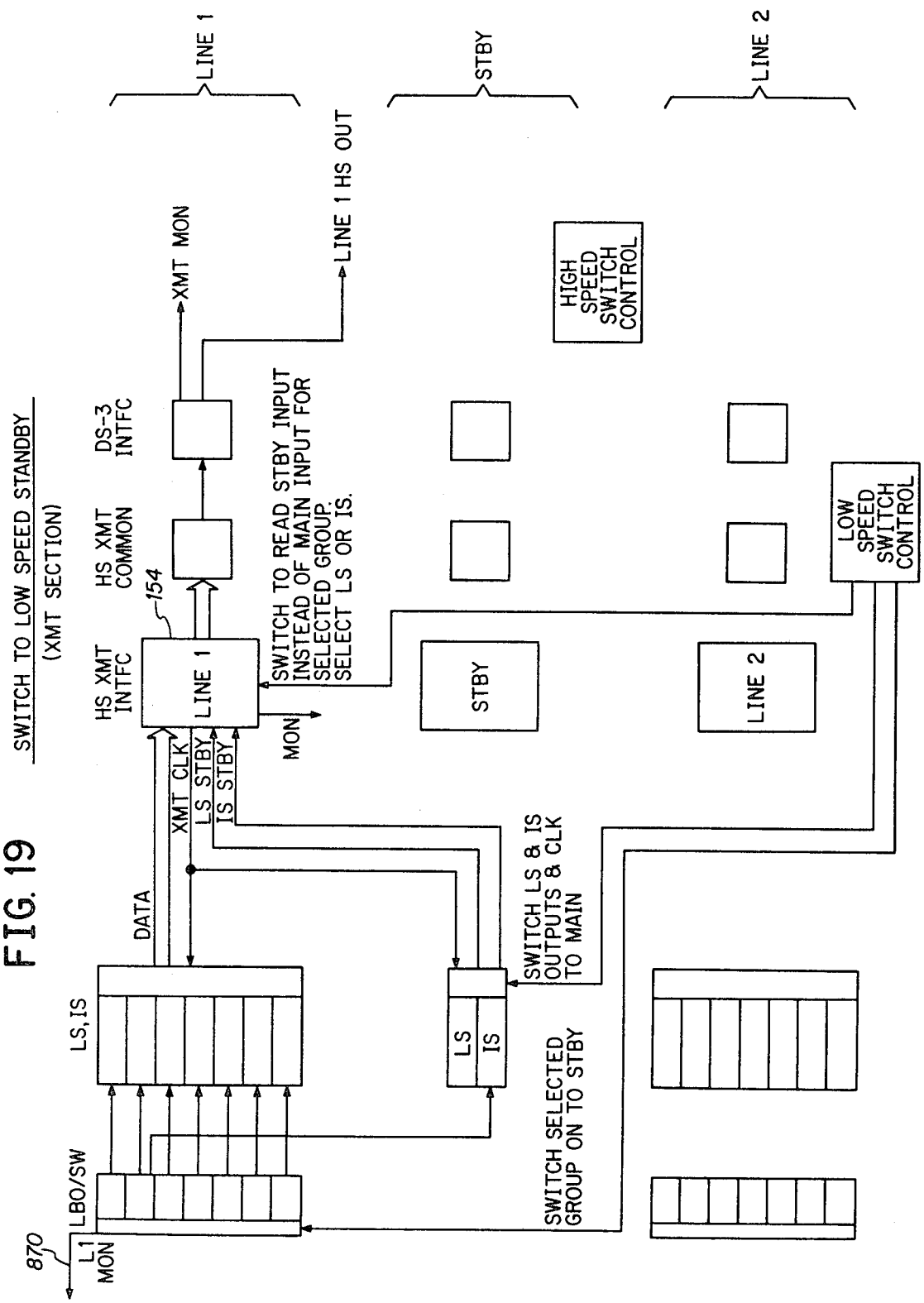
FIG. 19 is a block diagram of the transmit section of the muldem of FIG. 1, illustrating a switch to a low/intermediate speed standby unit.

Sequence 10 is the main transmit data path test. It is quite similar to the receive test in Sequence 5. FIG. 25 illustrates the signal paths for Line 1 and Line 2 which are tested by Sequence 10. The input to the group under test is monitored at the LBO/Switch modules on the monitor bus for the selected line. The output is monitored at the transmit monitor point on the selected one of the DS-3 Interfaces. FIG. 19 shows another configuration which can be tested using the same input and output monitor points. In that figure, there has been a switch to the standby intermediate speed unit. The path which includes the intermediate speed standby unit, along with the high speed section of Line 1, can be tested using the Line 1 monitor bus and DS-3 Interface monitor point, but the failed low speed unit replaced by the standby module cannot. It is monitored differently, as described in connection with Sequence 15.

Figure 20:
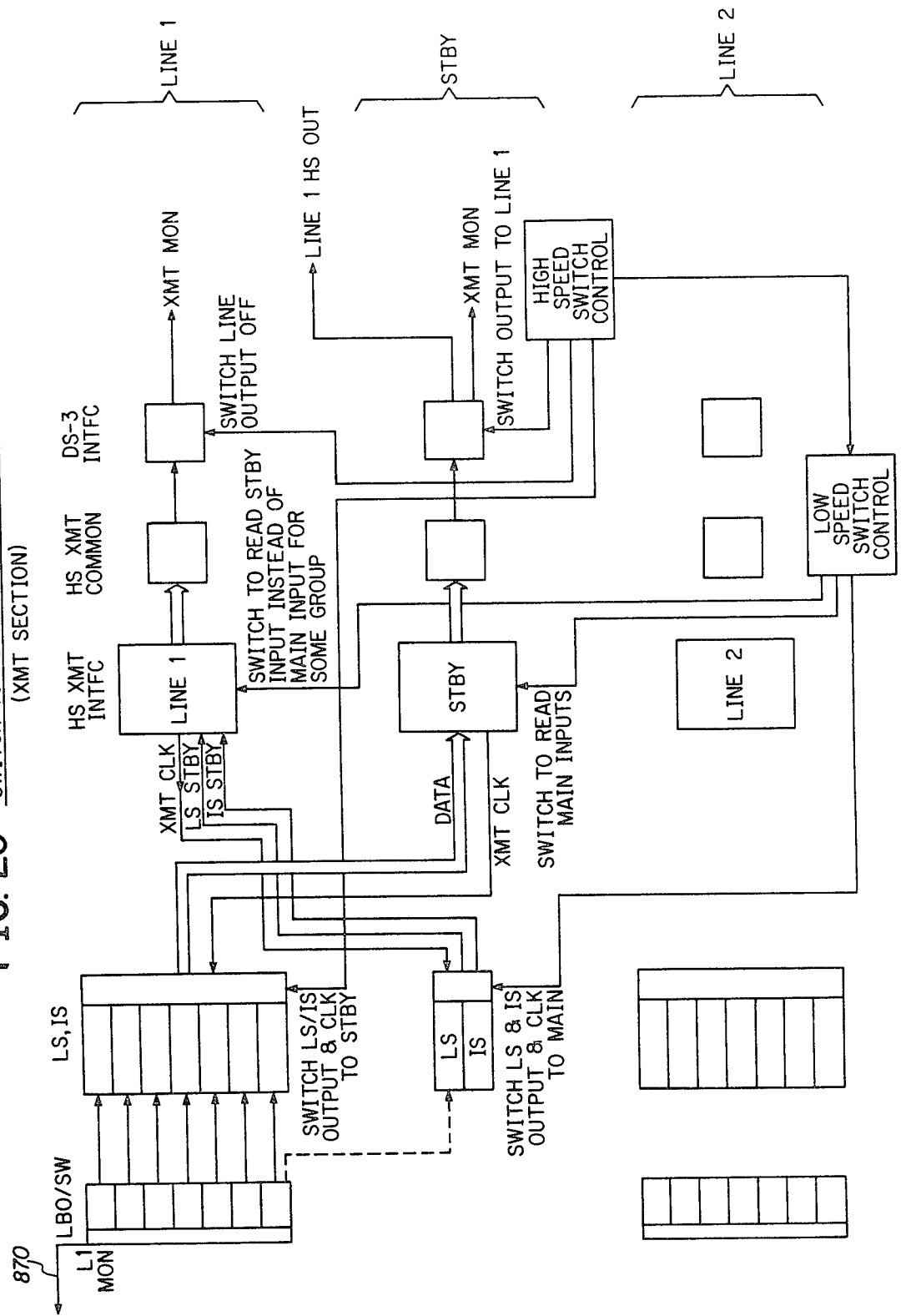
FIG. 20 is a block diagram of the transmit section of the muldem of FIG. 1, illustrating a switch to a high speed standby unit.

FIG. 20 shows the system after there has been a switch of the Line 1 traffic to the high speed standby unit. The monitoring of the switched path can be carried out, taking the input from the LBO/Switch modules and the output from the transmit monitor point of the standby DS-3 Interface.

| Sequence 11 Standby Transmit Data Path Test |
|---|
| 11.0 Enter |
| 11.1 Set up path to be monitored (Seq. 6), bridging (at LBO/Switch) to an on-line LS or IS input |
| 11.2 LS or IS?<br>LS - Go to 11.6<br>IS - Go to 11.3 |
| 11.3 Is High Speed Monitor Demultiplexer in sync?<br>Yes - Go to 11.10<br>No - Go to 11.4 |
| 11.4 Perform Monitor Test (Seq. 7) |
| 11.5 (Passed Monitor Test) Declare Standby High Speed Transmit fail and Return |
| 11.6 Is High Speed Monitor Demultiplexer in sync?<br>Yes - Go to 11.7<br>No - Go to 11.4 |
| 11.7 Is Low Speed Monitor Demultiplexer in sync?<br>Yes - Go to 11.10<br>No - Go to 11.8 |
| 11.8 Perform Monitor Test |
| 11.9 (Passed Monitor Test) Declare Standby LS/IS failure and Return |
| 11.10 Perform Short Bit-Error-Rate Test |
| 11.11 Test Result<br>Pass - Return<br>Fail - Go to 11.12 |
| 11.12 Perform Long Bit Error Rate Test |
| 11.13 Test Result?<br>Pass - Return<br>Fail - Go to 11.14 |
| 11.14 Perform Monitor Test |
| 11.15 (Passed Monitor Test) Declare LS or IS Standby Failure and Return |

| Sequence 12 Standby Receive Data Path Test |
|---|
| 12.0 Enter and Set Up Path to be Monitored (Sequence 6) |
| 12.1 Is Standby HS RCV in Sync?<br>Yes - Go to 12.5<br>No - Go to 12.2 |
| 12.2 Is High Speed Monitor Demultiplexer in Sync?<br>No - Go to 12.4<br>Yes - Go to 12.3 |
| 12.3 (Internal Problem) Declare Standby HS RCV Failure and Return |
| 12.4 (External Problem) Declare Failure of Receive Input to Muldem ("Line to Receive" Failure) and Return |
| 12.5 Is High Speed Monitor Demultiplexer in Sync?<br>Yes - Go to 12.7<br>No - Go to 12.6 |
| 12.6 Perform Monitor Test and Return |
| 12.7 Perform Short Bit-Error-Rate Test |
| 12.8 Results?<br>Pass - Return<br>Fail - Go to 12.9 |
| 12.9 Perform Long Bit-Error-Rate Test |
| 12.10 Results?<br>Pass - Return<br>Fail - Go to 12.11 |
| 12.11 Line 1 or 2 HS RCV in Sync?<br>No - Go to 12.2<br>Yes - Go to 12.12 |
| 12.12 Is HS Monitor Demultiplexer in Sync?<br>No - Go to 12.6<br>Yes - Go to 12.13 |
| 12.13 Connect the selected group data through standby LS/IS from on-Line HS RCV (Line 1 or 2) |
| 12.14 Perform Short Bit-Error-Rate Test |
| 12.15 Results of Test<br>Fail - Go to 12.17<br>Pass - Go to 12.16 |
| 12.16 Declare Standby HS RCV failure and Return |
| 12.17 Perform Long Bit-Error-Rate Test |
| 12.18 Results of Test<br>Pass - Go to 12.16<br>Fail - Go to 12.19 |
| 12.19 Declare Standby LS/IS RCV failure and Return |

Sequences 11 and 12 are the basic standby signal path monitoring tests for the transmit and receive stations respectively. It is to be anticipated that most of the time, the standby units, low, intermediate and high speed, will be off-line. If only the on-line units are tested, then there can occur a "silent failure" of the standby units, leaving the traffic unprotectable at such time as an on-line failure occurs. This is avoided by testing the off-line standby units in Sequences 11 and 12.

The transmit test (Sequence 11) is illustrated in FIG. 25, wherein low/intermediate speed data from a selected on-line group is bridged to the appropriate low-/intermediate speed standby unit for the test, as indicated by broken line signal path 401. The input is monitored on the monitor bus for the line from which the data is taken. The output is monitored at the transmit monitor point of the standby DS-3 Interface.

The receive test set up is illustrated in FIG. 26, wherein for example the high speed data from Line 1 is connected to the standby DS-3 Interface for the test.

The receive output is monitored at the LBO/Switch module for the low or intermediate speed standby unit, as appropriate. The output of the standby low speed unit is accessed on the Line 1 monitor bus while the intermediate speed standby receive output is monitored on the Line 2 monitor bus 871. The high speed receive input is monitored at point 875 for Line 1 and point 876 for Line 2.

The steps of Sequence 11 need little comment being very similar to those found in Sequence 5 and 9. Sequence 12 has several unusual features. If neither the standby High Speed Receive Common module nor the High Speed Monitor Demultiplexer can synchronize to the incoming data, then in Step 12.4 there is declared a failure of receive input to the muldem, the "line to receive" failure. This result can also be reached by another route. If the standby path fails the long bit-error-rate test in step 12.9, then there is a determination of whether the High Speed Receive Common module on Line 1 or 2 is in sync with the data, in step 12.11. If the Line 1 or 2 high speed unit can synchronize to the data and so can the High Speed Monitor Demultiplexer, then the Line 1 or 2 High Speed Receive Common units sends data through its standby output to the low/intermediate speed standby unit. This is illustrated by broken line signal paths 421 and 422 in FIG. 2a. The Line 1 or 2 High Speed Receive Common module continues to send normal data traffic through its main outputs to the on-line low/intermediate speed units.

If the data path through the on-line high speed unit and standby low/intermediate speed unit passes the short bit-error-rate test in step 12.14, then probably it was a failure in the standby High Speed Receive Common module which caused the earlier detected failures in the standby path. Accordingly, in step 12.16 there is declared a standby high speed receive failure. If the bit-error-rate test of 12.14 is failed, then probably the low/intermediate speed standby unit is at fault, and this is declared in step 12.19.

---

Sequence 13 Isolation of Low Speed Failures To Channel or Common Module 13.0 Enter
13.1 Have all equipped channels on the selected group failed?
　　Yes - Go to 13.2
　　No - Go to 13.3
13.2 Declare Low Speed Common Failure and Return
13.3 Declare Individual Channel Failure and Return

---

In step 13.1 of Sequence 13, there is expressed the simple rule which is used to determine whether a failing component is affecting a whole group or just a single low speed channel. If all the channels on the group fail then this is considered a group failure.

---

Sequence 14 Transmit Test of Off-Line Main High Speed Unit 14.0 Enter
14.1 a. Set up path to be monitored, bridging (at LBO/Switch) from an on-line LS or IS Group to the standby LS or IS unit, if available.
　　b. Connect standby LS/IS unit to failed HS unit for testing
14.2 LS or IS?
　　LS - Go to 14.6
　　IS - Go to 14.3
14.3 Is High Speed Monitor Demultiplexer in Sync?
　　Yes - Go to 14.10
　　No - Go to 14.4

-continued

Sequence 14 Transmit Test of Off-Line Main High Speed Unit 14.4 Perform Monitor Test (Sequence 7)
14.5 (Passed Monitor Test) Declare High Speed Transmit Fail and Return
14.6 Is High Speed Monitor Demultiplexer in Sync?
　　Yes - Go to 14.7
　　No - Go to 14.4
14.7 Is Low Speed Monitor Demultiplexer in Sync?
　　Yes - Go to 14.10
　　No - Go to 14.8
14.8 Perform Monitor Test
14.9 (Passed Monitor Test) Declare HS Failure and Return
14.10 Perform Short Bit-Error-Rate Test
14.11 Test result?
　　Pass - Return
　　Fail - Go to 14.12
14.12 Perform Long Bit-Error-Rate Test
14.13 Test result?
　　Pass - Return
　　Fail - Go to 14.14
14.14 Perform Monitor Test
14.15 (Passed Monitor Test) Declare HS Failure and Return

---

Sequence 14 is used to test the high speed transmit portion of line 1 or 2 after it has failed and been switched off-line. This situation is illustrated in FIG. 20. This test is performed so that a determination can be made whether the off-line high speed unit is now repaired or otherwise performing satisfactorily once again. As indicated in the figure by broken line signal path 403, data from one of the on-line low speed or intermediate speed groups is bridged through the low-/intermediate speed standby unit to the failed off-line High Speed Transmit Interface. Once the special connections have been made, the test proceeds very much the same as Sequence 11, except any failures are attributed to the previously failed off-line, main high speed unit.

---

Sequence 15 Transmit Test of Off-Line Main Low Speed Unit 15.0 Enter
15.1 Set up path to be monitored
15.2 Has the group selected for testing been switched to Standby?
　　No - Return
　　Yes - Go to 15.3
15.3 Monitor the LS or IS group at 6.312 Mb/s monitoring point of on line HS XMT Interface, performing that portion of Sequence 10 which begins at Step 10.4, and Return

---

As can be understood from a consideration of FIG. 19, when there has been a protective switch to low/intermediate speed standby, the output of the failed low or intermediate speed unit on Line 1 or 2 is no longer in the high speed output of the line and no longer at the transmit monitor point of the DS-3 Interface. This situation is provided for in the High Speed Transmit Interface modules such as module 154, shown in more detail in FIG. 18a.

Figure 18A:
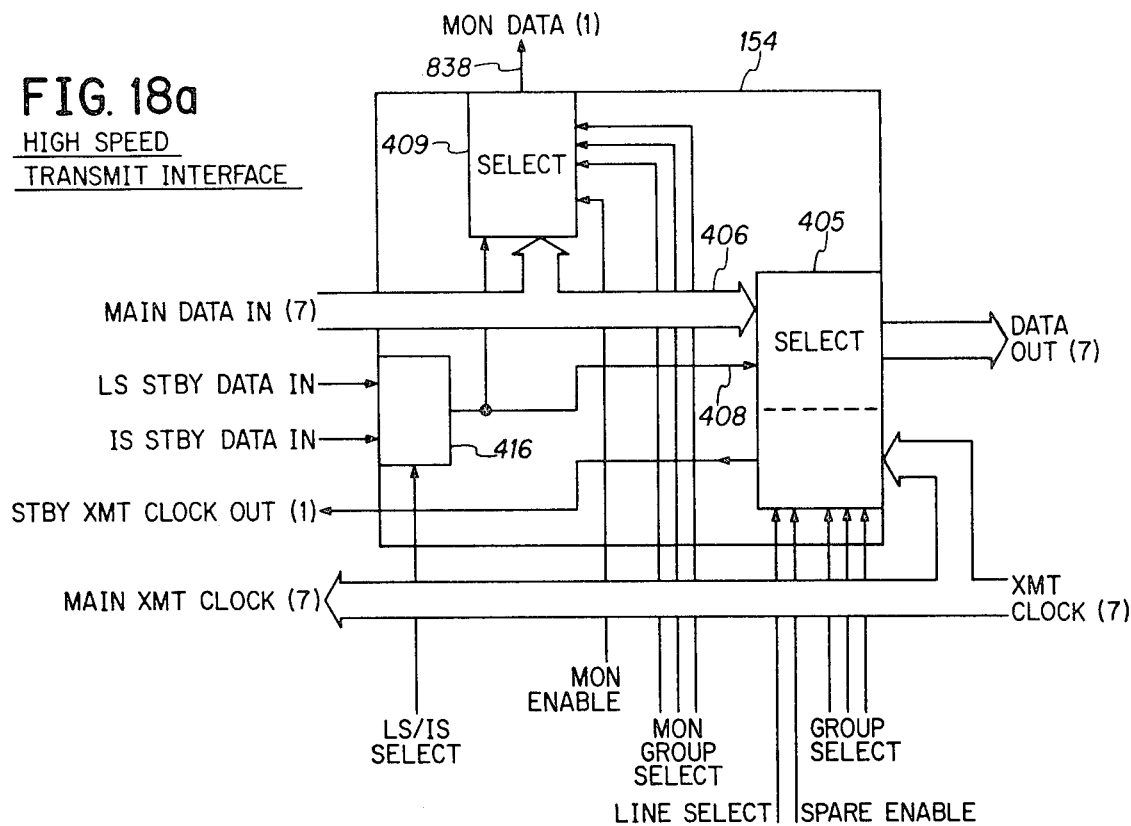
FIG. 18a is a block diagram of a High Speed Transmit Interface module for the muldem of FIG. 1.

In FIG. 18a, select circuit 405 is seen to have seven main data inputs 406 and one standby input 408. There are only seven output data groups from the module 154, and it is a function of select circuit 405 to substitute the data from standby input 408 for the data on a selected one of the seven main inputs 406. To allow monitoring of the failed low/intermediate speed group, select circuit 409 provides a monitor point 838 on which appears data from a selected one of the seven main data groups, or the standby data 408.

The data at the monitoring point 838 is at the intermediate speed bit rate, so in Sequence 15, it is referred to as the 6.312 Mb/s monitoring point. The performance of the test of Sequence 15, like that of Sequence 14, permits a determination as to whether the failed low/intermediate speed unit is again operating properly.

| | Sequence 16 Manual Monitoring |
|---|---|
| 16.0 | Enter |
| 16.1 | Set Up monitor path based on panel switches |
| 16.2 | Perform Long Bit Error Rate Test |
| 16.3 | Test Results |
| | Fail - Go to 16.4 |
| | Pass - Return to Sequence 1, Step 1.2 |
| 16.4 | Flash alarm lights |
| 16.5 | Return to Sequence 1.0, Step 1.2 |

Sequence 16 is entered from step 1.2 of Sequence 1, when a panel switch 859 (FIG. 13) commands a change from automatic monitoring to manually controlled monitoring. The effect is to set up a monitor path in accordance with line, group and channel selection from panel switches and to repeatedly perform the low bit-error-rate test on the selected path, until manually switched back to automatic mode. This allows the monitor to be used as a highly sophisticated test instrument for investigation of muldem problems. It has particular utility, where the module fails, but only occasionally. The monitor can be manually locked onto the path containing the module to detect its next failure.

| | Sequence 17 Switch to Low Speed Standby |
|---|---|
| 17.0 | Enter |
| 17.1 | Manual Low Speed Switching Override? |
| | Yes - Return |
| | No - Go to 17.2 |
| 17.2 | Restore? |
| | No - Go to 17.6 |
| | Yes - Go to 17.3 |
| 17.3 | Clear switch commands (e.g. line and group select code) |
| 17.4 | Enable Restore command through low speed switch control |
| 17.5 | Return |
| 17.6 | Selected group locked out? |
| | Yes - Return |
| | No - Go to 17.7 |
| 17.7 | Switch selected group to LS/IS Standby, sending group code, line select, spare enable and LS/IS select through low and high speed switch controls to LBO/Switch, LS XMT (RCV) Common, IS XMT (RCV) Interface, HS XMT Interface and HS RCV Common as appropriate. |
| 17.8 | Return |

| | Sequence 18 Switch to High Speed Standby |
|---|---|
| 18.0 | Enter |
| 18.1 | Manual High Speed Switching Override? |
| | Yes - Return |
| | No - Go to 18.2 |
| 18.2 | Restore? |
| | No - Go to 18.6 |
| | Yes - Go to 18.3 |
| 18.3 | Clear switch commands (e.g. line and group select code) |
| 18.4 | Is traffic of selected line on LS Standby? |
| | No - Return |
| | Yes - Go to 18.5 |
| 18.5 | Switch from LS Standby to Main and Return |
| 18.6 | Is HS Standby Available? |
| | No - Return |

| | Sequence 18 Switch to High Speed Standby -continued |
|---|---|
| | Yes - Go to 18.7 |
| 18.7 | Is Selected Line Locked Out? |
| | Yes - Return |
| | No - Go to 18.8 |
| 18.8 | Switch selected line to HS Standby, sending group code, line select, spare enable and LS/IS select through low and high speed switch controls to LS XMT (RCV) Common, IS XMT (RCV) Interface, HS XMT Interface and HS RCV Common, as appropriate. |
| 18.9 | Is traffic from selected line on LS/IS Standby? |
| | No - Return |
| | Yes - Go to 18.10 |
| 18.10 | Switch so that output of LS/IS Standby goes to HS Standby |
| 18.11 | Return |

Switching to low speed standby (Sequence 17) and high speed standby (Sequence 18) will be discussed in detail with reference to FIGS. 18–24. However, a particular emphasis is to be made on steps of 17.6 and 18.7 in the sequence listings. Muldem 100 has the capability of locking out a particular path from being switched to standby. This is useful in various situations. If a user is bringing up a group or channel, or if a path is having problems, the data on the path may be intermittently applied, as for example, test data. Moreover, modules may be switched in and out frequently. It is desirable that these changes do not interfere in any way with the real data traffic through the muldem. In another case, where there is some form of low priority data, as for example test tones, the user may not care if the traffic is protected. If this low priority path is locked out, then a lower ratio of on-line groups to standby groups has been achieved.

Various means may be used to inform the monitor that a path is locked out. For example, the line, group and channel panel switches 412–414 (FIG. 13) can be read along with lockout switch 860. For the low/intermediate speed groups, the identity bits of the LBO/-Switch modules indicate a lockout when read at step 6.3 of Sequence 6.

FIG. 18 shows details of the high speed units which are relevant to the implementation of protective switching in the system. Various switching control bits come to the high speed units from the monitor through the low speed switch control, and also through first the high and then the low speed switch control. FIG. 18*a* shows a High Speed Transmit Interface. A select circuit 416 receives a bit from the monitor commanding it to select between the low speed and the intermediate speed standby data inputs. As has already been described, select circuit 405 can substitute the data on the resulting standby path 408 for one of the seven main data inputs 406. A line select bit and spare enable bit from the monitor command select circuit 405 to make such a substitution, and three group select bits from the monitor specify which group is to be substituted for. Also as previously described, select circuit 409 sends to the 6.312 Mb/s monitor point 838 one of the seven main data inputs or the standby data 408. Select circuit 409 is controlled from the monitor by three group select bits and an enable bit.

Figure 18B:
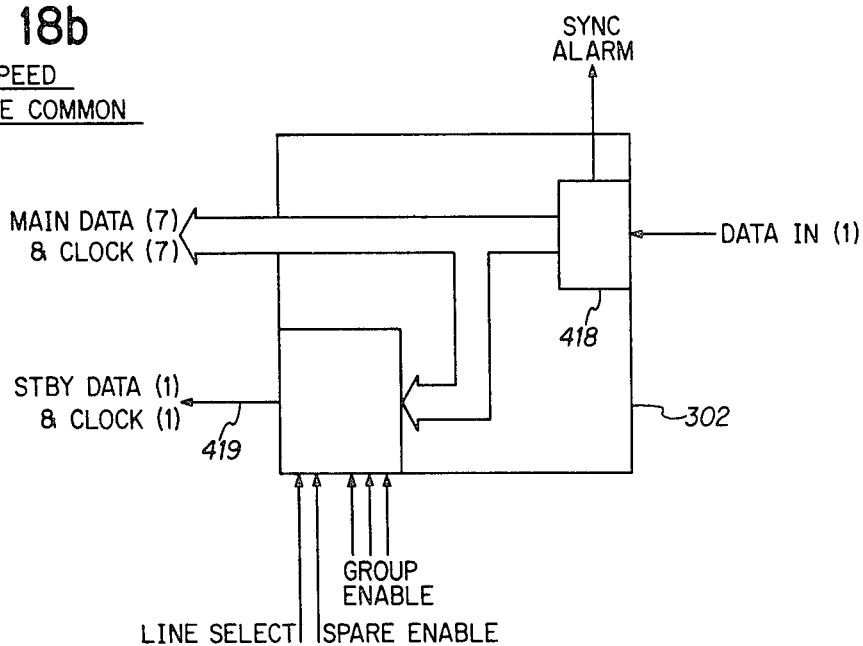
FIG. 18b is a block diagram of a High Speed Receive Common module of the muldem of FIG. 1.

In FIG. 18*b*, there is shown a High Speed Receive Common module such as module 302 (FIG. 9). A demultiplexer 418 provides seven intermediate speed outputs from the single high speed data input. Any one of these seven can be output on the standby data output 419 of the module 302. Line select and spare enable bits from the monitor command whether there is to be data on the standby output. Three group enable bits from the monitor select one of the seven main data groups which is to be output on standby.

Other switching which is important to establishing the pathways in FIGS. 19–24 are shown on various ones of the drawings. In FIG. 4, in the Intermediate Speed LBO/Switch module, relays 183 and 190 handle the main/standby switching for the transmit and receive sections, respectively. They are under the control of LBO group enable, line select and receive switch inhibit bits initiated by the monitor through the low speed switch control 150. In FIG. 5, in the Low Speed LBO/Switch module, the main/standby relays are seen to be controlled in the same way. In FIG. 7, in the Low Speed Transmit Common module, the main/standby selection of data is made at select circuit 258. The main/standby transmit clock selection is made at circuit 237. In FIG. 8, in the Intermediate Speed Transmit Interface, the selections are made at select circuits 283 and 274. In the Intermediate Speed Receive Interface of FIG. 10, main/standby selections are accomplished at circuits 322 and 323. The Low Speed Receive Common module of FIG. 11 has circuits 350 and 351 to make this selection.

In FIGS. 19–24, for clarity of presentation, the control necessary to produce the desired switching will be described functionally, rather than in terms of the various line select bit, group select bits, etc. The signals will be shown as emanating from the low speed switch control 150 and high speed switch control 151, whether they are initiated by panel switches or automatically from the monitor.

FIG. 19 shows the control required to switch to low-/intermediate speed standby for the transmit section. In this case, all the switch signals pass through the low speed switch control. The LBO/Switch module of the failed group is switched to standby, sending its output to the appropriate low speed or intermediate speed standby unit. The outputs of the low/intermediate speed standby units are switched to main. The High Speed Transmit Interface of the affected line, in the example, Line 1, is switched to read the standby input instead of the main input for the failed group. In the example shown the failure is an intermediate speed group, so the High Speed Transmit Interface 154 reads its intermediate speed standby input.

FIG. 20 shows a switch to high speed standby in the transmit section. In the example, there has been a failure in the high speed section of Line 1. The Low Speed Transmit Common modules and Intermediate Speed Transmit Interface modules for Line 1 are switched to standby in response to a signal from the high speed switch control. The standby High Speed Transmit Interface is switched to now read at its main inputs the data from the Line 1 low/intermediate speed units. The standby DS-3 Interface has a switch which couples the standby high speed output to the Line 1 high speed output. The Line 1 DS-3 Interface must be switched off. In addition, the Line 1 High Speed Transmit Interface can be switched to read its standby input to provide for monitoring the Line 1 off-line high speed units. Further in pursuance of this goal, the outputs of the low/intermediate speed units are switched to main.

FIG. 21 shows a switch to low/intermediate speed standby in the receive section. The High Speed Receive Common module of Line 1, in this case, is switched to send on its standby output the data from the failed group. The standby low/intermediate speed units are switched to main in order to read the data coming from the Line 1 High Speed Receive Common module. The LBO/Switch module for the failed Line 1 unit is switched to standby to receive the output of the standby low/intermediate standby units.

The switch to high speed standby in the receive section is shown in FIG. 22. The DS-3 Interface is switched to couple the Line 1 high speed input to the standby path. The Line 1 Low Speed Receive Common modules and Intermediate Speed Receive Interface modules are switched to read the data coming to them from the standby High Speed Receive Common module. In order to provide for monitoring the failed Line 1 high speed section, the low/intermediate speed standby units are switched to read the output of the latter section at their main inputs.

Figure 23:
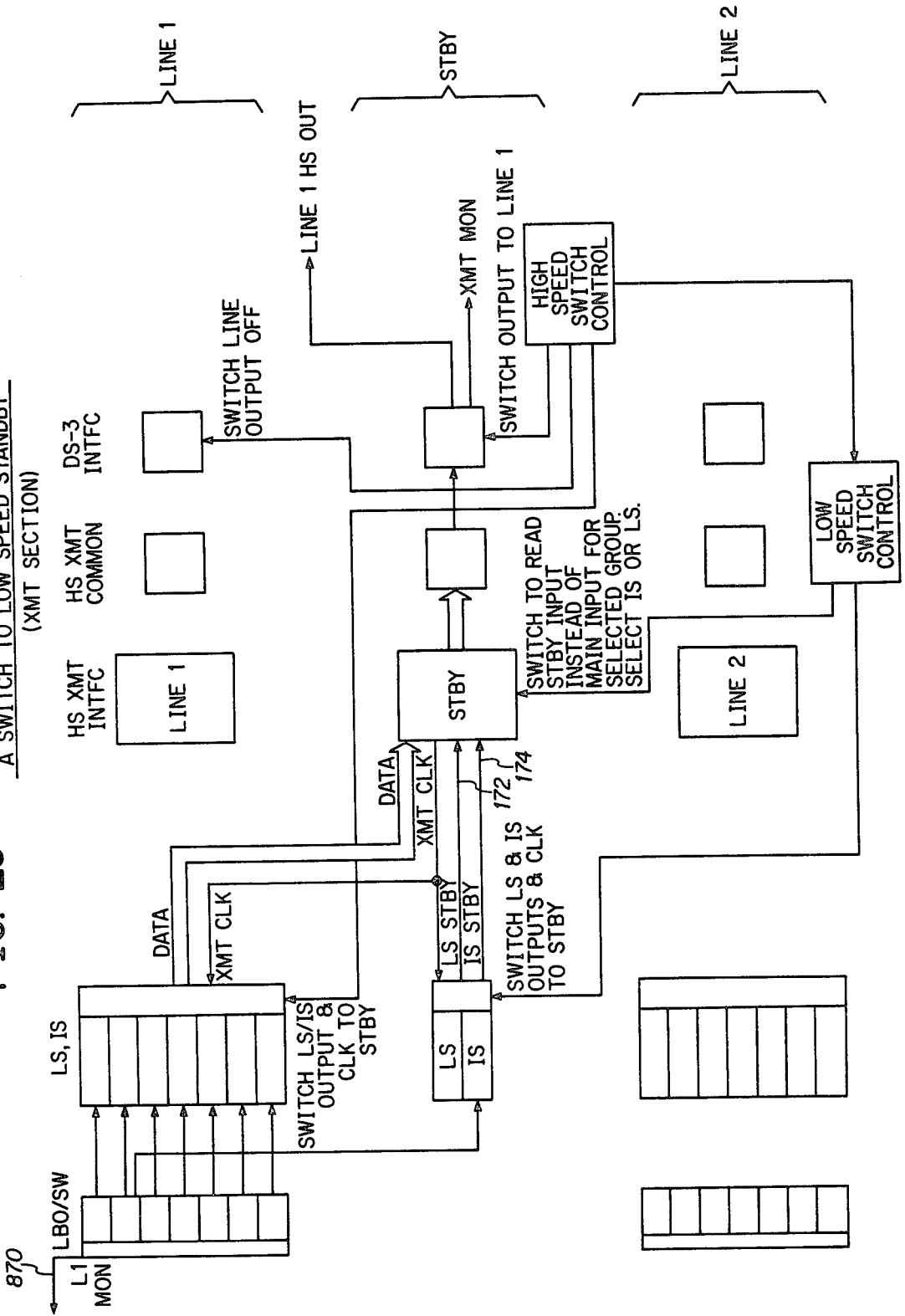
FIG. 23 is a block diagram of the transmit section of the muldem of FIG. 1, illustrating a switch to the high speed standby unit after a preceding switch to the low-/intermediate speed standby unit.

If there is a switch to low/intermediate speed standby after a previous switch to high speed standby, the control is as illustrated in FIG. 23. The LBO/Switch module of the failed low/intermediate speed group is switched onto standby. The output of the low/intermediate speed standby units are switched to go to the standby inputs 172 and 174 of the standby High Speed Transmit Interface. The High Speed Transmit Interface is switched to read its standby input in place of the main input for the failed low/intermediate speed group.

FIG. 24 illustrates the control required for a switch to high speed standby after a previous switch to low/intermediate speed standby in the transmit section. The Low Speed Transmit Common modules and Intermediate Speed Transmit Interface modules of the affected line are switched to standby, thereby sending data to the main input of the standby High Speed Transmit Interface. The outputs of the low/intermediate speed standby units are switched to the standby inputs 172 and 174 of the standby High Speed Transmit Interface. The standby High Speed Transmit Interface must be commanded to read one of these standby inputs in the place of the main input for the failed group. The standby DS-3 Interface is switched to send the high speed standby output out of Line 1, while the Line 1 DS-3 Interface is switched off.

| Sequence 19 LS/IS Alarm Updating |
| --- |
| 19.0 Enter |
| 19.1 Is there a new alarm?<br>No - Go to 19.3<br>Yes - Go to 19.2 |
| 19.2 Store and Display the Alarm |
| 19.3 Auto Revert or Manual Selected?<br>Auto - Go to 19.4<br>Manual - Go to 19.5 |
| 19.4 Is there a request for review of stored alarms?<br>No - Return<br>Yes - Go to 19.5 |
| 19.5 Display the next alarm in the sequence of stored alarms. |
| 19.6 Is the display alarm a current one?<br>Yes - Return<br>No - Go to 19.7 |
| 19.7 Clear storage of this alarm and Return |

Each low/intermediate speed alarm is stored, and the most recent alarm is displayed (Step 19.2). There is the capability to review the stored alarms by making a push-button request (Step 19.4). If a stored alarm is displayed by this review request, then the alarm is cleared out of storage.

The system may operate in the auto-revert mode in which traffic is automatically switched back to a unit which failed but has become functional again. Alternatively, in the manual restore mode not only must the failed unit become functional again, but manual permission must be given to restore. It is a consequence of the Sequence 19 that old alarms are continually cleared from storage when operating in the manual restore mode. As a result, a unit could fail, then become functional again, with the alarm indication being cleared from storage. However, since the data path would remain switched to standby in the manual restore mode, it would be possible to determine the failure condition which had caused the switch.

In the auto-revert mode, the review (Step 19.5) and clearing from storage (Step 19.7) of alarm conditions can only take place upon user request. Therefore, if a unit has failed, then become functional again and switched back into service automatically, the attendant alarms will remain stored until read out by an operator. Thus, the storage or display of the alarms is latched, despite the automatic restoring of the path.

---

Sequence 20 Detecting Partially Equipped Low Speed Groups 20.0 Enter after all zeroes detected on long bit-error-rate test of selected line, group and channel
20.1 Perform short bit-error-rate test on the rest of the equipped groups
20.2 Where all zeroes detected on all equipped groups?
    No - Go to 20.4
    Yes - Go to 20.3
20.3 Declare Monitor Failure and exit
20.4 Perform bit-error-rate test of the selected line, group and channel, for both RCV and XMT
20.5 Were all zeroes detected for both RCV and XMT?
    No - Go to 20.6
    Yes - Go to 20.7
20.6 Channel is equipped. Declare loss of Data, i.e., loss of receive output or loss of transmit input (identified as "line to transmit" failure) and Return
20.7 Flag the selected channel not equipped and Return

---

The monitor can tell whether a group is equipped by reading its identity bits, but this does not tell it whether specific channels in a low speed group might be unequipped. This determination is made in Sequence 20, particularly at step 20.4, where the monitor performs the bit-error-rate test on the channel in question, for both receive and transmit sections. If the data comparator 880 registers all zeroes detected on both receive and transmit, then it is considered that the channel is unequipped, and it is thus flagged. If all zeroes should be detected on transmit or receive, but not both, then a loss of data is declared.

A slightly different way of looking at this test is as follows. When the monitor is performing a transmit test on a selected channel and discovers all zeroes at the transmit input, then it must decide whether to declare a problem external to the muldem, namely, a loss of transmit input data. It first checks to see if the muldem is receiving input on the high speed line to the receive station, for this channel. In a conventional telecommunications system a channel would be equipped for receive, if it were equipped for transmit, and vice versa. Further a T1 line will presumably always have some bit activity on it.

Accordingly, if there is no data coming to the selected channel in the demultiplexer, the monitor will decide that the channel is unequipped. Otherwise, a loss of transmit data will be declared.

If it is a receive test that the monitor is first performing and detects all zeroes, it checks the input to the transmit section, before declaring a loss of receive data.

The data comparator has a zero counter 974 on the high speed Data A side and a zero counter 976 on the low/intermediate speed Data B side. If a channel is unequipped, the all zeroes condition can be detected at both counters, on both transmit and receive. If all zeroes are detected, say, in the transmit output for a selected channel, while the transmit input is not all zeroes this is interpreted differently, as a failure of the channel internal to the muldem.

If the data comparator detects all zeroes input to transmit section or to the receive section for an intermediate speed, which is known to be equipped from the identity bits, then a loss of data, transmit or receive as appropriate, can be declared without further investigation.

---

Sequence 21 Receive Test of Off-Line Main High Speed Unit 21.0 Enter and Set Up Path to be Monitored (Seq. 6)
21.1 Is off-line HS RCV in Sync?
    Yes - Go to 21.5
    No - Go to 21.2
21.2 Is High Speed Monitor Demultiplexer in Sync?
    No - Go to 21.4
    Yes - Go to 21.3
21.3 (Internal Problem) Declare off-line HS RCV failure and Return
21.4 (External Problem) Declare Failure of Receive Input to Muldem (Line to Receive failure) and Return
21.5 Is High Speed Monitor Demultiplexer in Sync?
    Yes - Go to 21.7
    No - Go to 21.6
21.6 Perform Monitor Test and Return
21.7 Perform Short Bit-Error-Rate Test
21.8 Results?
    Pass - Return
    Fail - Go to 21.9
21.9 Perform Long Bit-Error-Rate Test
21.10 Results?
    Pass - Return
    Fail - Go to 21.11
21.11 On-line HS RCV in Sync
    No - Go to 21.2
    Yes - Go to 21.12
21.12 Is HS Monitor Demultiplexer in Sync?
    No - Go to 21.6
    Yes - Go to 21.13
21.13 Connect the selected group data through standby LS/IS from on-line HS RCV (Line 0, 1 or 2)
21.14 Perform Short Bit-Error-Rate Test
21.15 Results of Test
    Fail - Go to 21.17
    Pass - Go to 21.16
21.16 Declare off-line HS RCV failure and Return
21.17 Perform Long Bit-Error-Rate Test
21.18 Results of Test
    Pass - Go to 21.16
    Fail - Go to 21.19
21.19 Declare Standby LS/IS RCV failure and Return

---

Sequence 21 is used to perform off-line monitoring of the Line 1 or Line 2 high speed data path, after a switch to high speed standby from that path. The sequence of steps is similar to Sequence 12. The configuration of the test is shown in FIG. 22. The output of the failed Line 1 High Speed Receive Common module is connected to the low/intermediate speed standby unit for testing purposes. In the example, the test path is shown as using the low speed standby module. The input to the test path is at the Line 1 receive monitor point, while the output is taken from the low speed LBO/Switch by means of the Line 1 monitor bus.

CONCLUSION

The muldem of the invention, as described in terms of the preferred embodiment, displays important advantages and a number of useful features. In equipping the data groups of the muldem, low speed and intermediate speed circuits can be intermingled and, indeed, can be interchanged. Groups can be left unequipped, and channels within a low speed group can be left unequipped. No special changes need be made to the system when adding or removing equipment for data groups. Circuits can be added or removed, while the moldem is in operation, resulting in no disruption of ongoing data traffic through the muldem. The monitor of the system senses the addition or removal of groups and takes this into account in its testing.

Diagnostic descisions by the monitor based on majority voting among equipped groups permit the decisions to be independent of the particular user configuration employed. The monitoring system of the muldem, including its comparator means, is able to test the operation of a low speed or intermediate speed circuit for any of the data groups of the muldem.

The monitor tests the data paths in a particular sequence which increments the high speed line number most frequently, thereby minimizing the time required to detect a failure in the high speed unit of a line, which failure would affect a number of data groups at once. The error rate threshold used as a pass/fail criterion in testing by the monitor is selectable by the muldem user. The threshold is implemented first and most often in a test over a short sampling interval. If errors in a data path exceed the threshold in the short test, the path is then tested over a longer sampling interval for improved statistical significance. A path which has failed and not yet been restored, is subjected to a higher threshold than an unfailed path, in order to prevent a marginal unit from switching in and out frequently.

The muldem has the capability of identifying some classes of failures as being external to itself rather than a failure of the muldem equipment. In addition, under certain conditions, the monitor tests itself by examining the results of its testing of a variety of paths and further by the injection of known errors into its comparator. In a useful manual mode, the monitor can be set on a selected signal path, testing it repeatedly. In another important manual mode, a selected section of the muldem can be locked out, that is, prevented from switching to standby.

When a failure is detected in the muldem of the invention, protective switching is initiated to a low or intermediate speed standby circuit or independently to a high speed circuit, as appropriate. The system displays the failure condition and can continue to do so even if it automatically switches back from standby to the main path. The monitor not only tests the on-line data paths, but also the off-line paths. Thus, before protective switching to standby, it tests the standby paths to ensure against an undetected silent failure. After protective switching, it continues to test off-line paths in order to determine when a failed circuit has returned to proper operation.

What is claimed is:

1. A multiplexer with an improved monitoring system for the detection of malfunctions, comprising in combination:
   a plurality of parallel data input groups;
   transmission means multiplexing said data input groups for serial transmission of high speed data; and
   monitor means testing active data paths through said multiplexer for detection of malfunctions in said multiplexer, said monitor means having a first threshold error rate indicative of a malfunction and a second, lower threshold error rate indicative of a corrected malfunction.

2. A multiplexer with an improved monitoring system for the detection of malfunctions, comprising in combination:
   a plurality of parallel data input groups;
   transmission means multiplexing said data input groups for serial transmission of high speed data; and
   monitor means testing data paths through said multiplexer for detection of malfunctions in said multiplexer, said monitor means having a first threshold error rate indicative of a mulfunction and a second, lower threshold error rate indicative of a corrected malfunction;
   wherein said monitor means has a first input side connected to the inputs to said data input groups and has a second input side connected to the output of said transmission means for monitoring data path failures through said multiplexer by comparing the latter's input and output,
   and wherein said monitor means comprises monitor demultiplexer means demultiplexing data at said second input side, and a data comparator comparing a data stream A from said monitor demultiplexer means with a data stream B from said first input side and performing a bit error rate test between said data streams A and B by comparing said streams bit for bit over a given sampling time interval and signaling a malfunction above said first threshold number of non-coincidences of bits in said streams and signaling a correction of said malfunction below said second threshold number of non-coincidences of bits in said streams.

3. The invention according to claim 2 wherein said multiplexer multiplexes LS and IS rate data, where IS is greater than LS, for serial transmission of data at a yet higher rate HS, and wherein:
   each said group receives LS rate data in parallel form over a plurality of channels or IS rate data in serial form;
   said transmission means comprises:
      normally on-line LS transmit means for each group which receives LS rate data, said LS transmit means multiplexing LS rate data on said channels for serial transmission of IS rate data;
      normally on-line IS transmit means for each group which receives IS rate data, said IS transmit means serially receiving and transmitting IS rate data;
      normally off-line standby LS transmit means having an input in parallel with said plurality of parallel data input groups for protective bypass switching around any said normally on-line LS transmit means;
      normally off-line standby IS transmit means having an input in parallel with said plurality of parallel data input groups for protective bypass switching around any said normally on-line IS transmit means;

normally on-line HS transmit means multiplexing parallel IS rate data for serial transmission for HS rate data over an output line;

normally off-line standby HS transmit means having an output to said output line for protective bypass switching around said normally on-line HS transmit means; and interconnection means connecting the outputs of said normally on-line LS and IS transmit means to said normally on-line HS transmit means and to said standby HS transmit means, and connecting the outputs of said standby LS and IS transmit means to said normally on-line HS transmit means and to said standby HS transmit means;

said first input side of said monitor means is connected to the parallel inputs to said normally on-line and standby LS and IS transmit means;

said second input side of said monitor means is connected to the outputs of said normally on-line and standby HS transmit means;

said monitor demultiplexer means comprises:
  first monitor demultiplexer means for demultiplexing HS rate data from said second input side to IS rate data; and
  second monitor demultiplexer means for demultiplexing IS rate data from said first monitor demultiplexer means to LS rate data; and said data comparator means compares data from said first monitor demultiplexer means with data from said first input side when the latter receives IS rate data, and compares data from said second monitor demultiplexer means with data from said first input side when the latter receives LS rate data.

4. The invention according to claim 3 wherein said monitor means has a first threshold error rate indicative of a malfunction for each of said LS and IS rate bit streams and a respective lower threshold error rate indicative of a corrected malfunction for each of said LS and IS rate bit streams.

5. A multiplexer with an improved monitoring system for the detection of malfunctions, comprising in combination:
  a plurality of parallel data input groups;
  transmission means multiplexing said data input groups for serial transmission of high speed data; and
  monitor means testing active data paths through said multiplexer for short sampling time intervals for detection of malfunctions, and expanding to a long sampling time interval upon detection of a malfunction to verify said malfunction.

6. A multiplexer with an improved monitoring system for the detection of malfunctions, comprising in combination:
  a plurality of parallel data input groups;
  transmission means multiplexing said data input groups for serial transmission of high speed data; and
  monitor means testing data paths through said multiplexer for short sampling time intervals for detection of malfunctions, and expanding to a long sampling time interval upon detection of a malfunction to verify said malfunction;
  wherein said monitor means has a first input side connected to the inputs to said data input groups and has a second input side connected to the output of said transmission means for monitoring data path failures through said multiplexer by comparing the latter's input and output, and wherein said monitor means comprises monitor demultiplexer means demultiplexing data at said second input side and a data comparator comparing a data stream A from said monitor demultiplexer means with a data stream B from said first input side and performing a bit error rate test between said data streams A and B by comparing said streams bit for bit over said short sampling time interval and preliminarily indicating a malfunction above a given threshold number of non-coincidences of bits in said streams, said comparator means responding to said preliminary indication to compare said streams bit for bit over said long sampling time interval and verifying said malfunction above another given threshold number of non-coincidences of bits in said streams to improve the statistical accuracy of said test.

7. The invention according to claim 6 wherein said second mentioned threshold number is greater than said first mentioned threshold number by a factor equal to the ratio of said long sampling time interval to said short sampling time interval.

8. The invention according to claim 6 wherein said multiplexer multiplexes LS and IS rate data, where IS is greater than LS, for serial transmission of data at a yet higher rate HS, and wherein:
  each said group receives LS rate data in parallel form over a plurality of channels or IS rate data in serial form;
  said transmission means comprises:
    normally on-line LS transmit means for each group which receives LS rate data, said LS transmit means multiplexing LS rate data on said channels for serial transmission of IS rate data;
    normally on-line IS transmit means for each group which receives IS rate data, said IS transmit means serially receiving and transmitting IS rate data;
    normally off-line standby LS transmit means having an input in parallel with said plurality of parallel data input groups for protective bypass switching around any said normally on-line LS transmit means;
    normally off-line standby IS transmit means having an input in parallel with said plurality of parallel data input groups for protective bypass switching around any said normally on-line IS transmit means;
    normally on-line HS transmit means multiplexing parallel IS rate data for serial transmission of HS rate data over an output line;
    normally off-line standby HS transmit means having an output to said output line for protective bypass switching around said normally on-line HS transmit means; and
    interconnection means connecting the outputs of said normally on-line LS and IS transmit means to said normally on-line HS transmit means and to said standby HS transmit means, and connecting the outputs of said standby LS and IS transmit means to said normally on-line HS transmit means and to said standby HS transmit means;
  said first input side of said monitor means is connected to the parallel inputs to said normally on-line and standby LS and IS transmit means;

said second input side of said monitor means is connected to the outputs of said normally on-line and standby HS transmit means;
said monitor demultiplexer means comprises:
   first monitor demultiplexer means for demultiplexing HS rate data from said second input side to IS rate data; and
   second monitor demultiplexer means for demultiplexing IS rate data from said first monitor demultiplexer means to LS rate data; and
said data comparator compares data from said first monitor demultiplexer means with data from said first input side when the latter receives IS rate data, and compares data from said second monitor demultiplexer means with data from said first input side when the latter receives LS rate data.

9. The invention according to claim 8 wherein said monitor means has a variable window for counting noncoincidences of bits during short and long sampling time intervals for both LS and IS rate bit streams.

10. A multiplexer with an improved monitoring system for the detection of malfunctions, comprising in combination:
a plurality of parallel data input groups;
transmission means multiplexing said groups of serial transmission of high speed data; and
monitor means testing active data paths through said multiplexer for detection of malfunctions, said monitor means having a first input side connected to the input to said multiplexer and a second input side connected to the output of said multiplexer, and comprising signal conversion means delivering a data stream A from said second input side and a data stream B from said first input side, and comprising a data comparator for comparing data streams A and B bit for bit, said monitor means including user selectable threshold means for adjustably setting the data path error rate indicative of a malfunction.

11. A multiplexer with an improved monitoring system for the detection of malfunctions, comprising in combination:
a plurality of parallel data input groups;
transmission means multiplexing said groups for serial transmission of high speed data; and
monitor means testing data paths through said multiplexer for detection of malfunctions, said monitor means having a first input side connected to the input to said multiplexer and a second input side connected to the output of said multiplexer, and comprising signal conversion means delivering a data stream A from said second input side and a data stream B from said first input side, and comprising a data comparator for comparing data streams A and B bit for bit, said monitor means including user selectable threshold means for adjustably setting the data path error rate indicative of a malfunction;
wherein said monitor means comprises monitor demultiplexer means for demultiplexing data at said second input side for delivery as data stream A, and wherein said data comparator performs a bit error rate test between data streams A and B by comparing said streams bit for bit over a given sampling time interval and signaling a malfunction above said adjustable threshold number of non-coincidences of bits in said streams.

12. A multiplexer with an improved monitoring system for the detection of malfunctions, comprising in combination:
a plurality of parallel data input groups;
transmission means multiplexing said data input groups for serial transmission of high speed data; and
monitor means testing active data paths through said multiplexer for detection of malfunctions in said multiplexer, and comprising:
   means having a first threshold error rate indicative of a malfunction and a second lower threshold error rate indicative of a corrected malfunction; and
   variable window means testing data paths through said multiplexer for short sampling time intervals for detection of malfunctions, and expanding to a long sampling time interval upon detection of a malfunction to verify said malfunction to a higher degree of statistical accuracy.

13. A multiplexer with an improved monitoring system for the detection of malfunctions, comprising in combination:
a plurality of parallel data input groups;
transmission means multiplexing said data input groups for serial transmission of high speed data; and
monitor means testing data paths through said multiplexer for detection of malfunctions in said multiplexer, and comprising:
   means having a first threshold error rate indicative of a malfunction and a second lower threshold error rate indicative of a corrected malfunction; and
   variable window means testing data paths through said multiplexer for short sampling time intervals for detection of malfunctions, and expanding to a long sampling time interval upon detection of a malfunction to verify said malfunction to a higher degree of statistical accuracy;
wherein said monitor means further comprises user selectable threshold means for adjustably setting the data path error rate indicative of a malfunction.

14. A multiplexer with an improved monitoring system for the detection of malfunctions, comprising in combination:
a plurality of parallel data input groups;
transmission means multiplexing said data input groups for serial transmission of high speed data;
monitor means testing active data paths through said multiplexer for detection of malfunctions in said multiplexer, said monitor means having a first input side connected to the inputs to said data input groups and having a second input side connected to the output of said transmission means for monitoring data path failures through said multiplexer by comparing the latter's input and output, said monitor means comprising:
   signal conversion means deriving identical rate data streams A and B from said second and first input sides, respectively;
   a data comparator comparing data streams A and B; and
   means performing a bit error rate test between data streams A and B over a selected sampling time interval according to the data rate of streams A and B.

15. A multiplexer with an improved monitoring system for the detection of malfunctions, comprising in combination:
a plurality of parallel data input groups;
transmission means multiplexing said data input groups for serial transmission of high speed data;
monitor means testing data paths through said multiplexer for detection of malfunctions in said multiplexer, said monitor means having a first input side connected to the inputs to said data input groups and having a second input side connected to the output of said transmission means for monitoring data path failures through said multiplexer by comparing the latter's input and output, said monitor means comprising:
signal conversion means deriving identical rate data streams A and B from said second and first input sides, respectively:
a data comparator comparing data streams A and B; and
means performing a bit error rate test between data streams A and B over a selected sampling time interval according to the data rate of streams A and B;
wherein said means for performing a bit error rate test expands said sampling time interval in response to a decreased data rate of streams A and B, and contracts said sampling time interval in response to an increased data rate of streams A and B.

16. A multiplexer with an improved monitoring system for the detection of malfunctions, comprising in combination:
a plurality of parallel data input groups;
transmission means multiplexing said data input groups for serial transmission of high speed data;
monitor means testing data paths through said multiplexer for detection of malfunctions in said multiplexer, said monitor means having a first input side connected to the inputs to said data input groups and having a second input side connected to the output of said transmission means for monitoring data path failures through said multiplexer by comparing the latter's input and output, said monitor means comprising:
signal conversion means deriving identical rate data streams A and B from said second and first input sides, respectively;
a data comparator comparing data streams A and B; and
means performing a bit error rate test between data streams A and B over a selected sampling time interval according to the data rate of streams A and B;
wherein said multiplexer multiplexes LS and IS rate data, where IS is greater than LS, for serial transmission of data at a yet higher rate HS, and wherein;
each said group receives LS rate data in parallel form over a plurality of channels, or IS rate data in serial form;
said transmission means comprises:
LS transmit means for each group which receives LS rate data, said LS transmit means multiplexing LS rate data on said channels for serial transmission of IS rate data;
IS transmit means for each group which receives IS rate data, said IS transmit means serially receiving and transmitting IS rate data; and
HS transmit means multiplexing parallel IS rate data from said LS and IS transmit means for serial transmission of HS rate data over an output line;
said first input side of said monitor means is connected to the parallel inputs to said LS and IS transmit means;
said second input side of said monitor means is connected to the output of said HS transmit means;
said monitor means includes:
first monitor demultiplexer means for demultiplexing HS rate data from said second input side to IS rate data; and
second monitor demultiplexer means for demultiplexing IS rate data from said first monitor demultiplexer means to LS rate data;
said data comparator compares data from said first monitor demultiplexer means as data stream A with data from said first input side as data stream B when the latter receives IS rate data, and compares data from said second monitor demultiplexer means as data stream A with data from said first input side as data stream B when the latter receives LS rate data; and
said means performing a bit error rate test performs such test over a first given sampling time interval for LS rate data streams A and B, and over a second, shorter, given sampling time interval for IS rate data streams A and B.

17. The invention according to claim 16 wherein:
said data comparator comprises:
resync means synchronizing data streams A and B bit for bit;
error detector means connected to the output of said resync means for detecting bit errors between data streams A and B; and
sync control means providing a sync signal upon synchronization of data streams A and B; and
said means performing a bit error rate test starts said sampling time interval in response to said sync signal.

18. The invention according to claim 17 wherein:
said data comparator comprises error counter means for counting bit errors detected by said error detector means; and
said means performing a bit error rate test reads the count in said error counter means at the end of said sampling time interval.

19. A multiplexer with an improved monitoring system for the detection of malfunctions, comprising in combination:
a plurality of parallel data input groups;
transmission means multiplexing said groups for serial transmission of high speed data;
monitor means testing data paths through said multiplexer for detection of malfunctions, said monitor means having a first input side connected to the input to said multiplexer and a second input side connected to the output of said multiplexer, and including signal conversion means deriving a data stream A from said second input side and a data stream B from said first input side, and comprising a data comparator for comparing data streams A and B;
said data comparator comprising:
selectable delay means for delaying data stream B;
elastic buffer means for shifting data stream A;
resync means for receiving data stream B from said selectable delay means and data stream A from said elastic buffer means, and delivering synchronized bit streams A and B;

error detector means connected to the output of said resync means for detecting bit errors between data streams A and B; and error counter means for counting bit errors detected by said error detector means.

20. The invention according to claim 19 wherein said data comparator further comprises:

slip counter enable means for driving said elastic buffer means to slip shift data stream A; and sync control means responsive to said error detector means for gating said slip counter enable means to drive said elastic buffer means until the passage of a predetermined consecutive numer of non-error bits through said error detector means.

21. The invention according to claim 20 wherein said sync control means provides a sync signal after said passage of said predetermined consecutive number of non-error bits through said error detector means and disables said slip counter enable means and enables said error counter means.

22. The invention according to claim 21 wherein said multiplexer multiplexes LS and IS rate data, where IS is greater than LS, for serial transmission of data at a higher rate HS, and wherein:

· each said group receives LS rate data in parallel form over a plurality of channels or IS rate data in serial form;

said transmission means comprises:

normally on-line LS transmit means for each group which receives LS rate data, said LS transmit means multiplexing said LS rate data on said channels for serial transmission of IS rate data;

normally on-line IS transmit means for each group which receives IS rate data, said IS transmit means serially receiving and transmitting IS rate data;

normally on-line HS transmit means multiplexing parallel IS rate data from said LS and IS transmit means for serial transmission of HS rate data over an output line;

said multiplexer further comprising:

normally off-line standby LS transmit means in parallel with each of said normally on-line LS transmit means;

normally off-line standby IS transmit means in parallel with each of said normally on-line IS transmit means;

normally off-line standby HS transmit means in parallel with each of said normally on-line HS transmit means;

data protective switching means providing standby alternate data paths through said multiplexer by switching normally on-line traffic through one or more of said standby LS, IS and HS transmit means;

said first input side of said monitor means is connected to the parallel inputs to said normally on-line and standby LS and IS transmit means;

said second input side of said monitor means is connected to the outputs of said normally on-line and standby HS transmit means;

said monitor demultiplexer means comprises:

first monitor demultiplexer means for demultiplexing HS rate data from said second input side to IS rate data;

second monitor demultiplexer means for demultiplexing IS rate data from said first monitor demultiplexer means to LS rate data; and said data comparator compares data from said first monitor demultiplexer means with data from said first input side when the latter receives IS rate data, and compares data from said second monitor demultiplexer means with data from said first input side when the latter receives LS rate data.

23. A demultiplexer with an improved monitoring system for the detection of malfunctions, comprising in combination:

a plurality of parallel data output groups;

reception means demultiplexing serial high speed input data for parallel transmission over said groups; and monitor means testing active data paths through said demultiplexer for detection of malfunctions in said demultiplexer, said monitor means having a first threshold error rate indicative of a malfunction and a second lower threshold error rate indicative of a corrected malfunction.

24. A demultiplexer with an improved monitoring system for the detection of malfunctions, comprising in combination:

a plurality of parallel data output groups;

reception means demultiplexing serial high speed input data for parallel transmission over said groups; and monitor means testing data paths through said demultiplexer for detection of malfunctions in said demultiplexer, said monitor means having a first threshold error rate indicative of a malfunction and a second lower threshold error rate indicative of a corrected malfunction;

wherein said monitor means has a first input side connected to the outputs of said data output groups and has a second input side connected to the input to said reception means for monitoring data path failures through said demultiplexer by comparing the latter's input and output, and wherein said monitor means comprises monitor demultiplexer means demultiplexing data at said second input side, and a data comparator comprising a data stream A from said monitor demultiplexer means with a data stream B from said first input side and performing a bit error rate test between said data streams A and B by comparing said streams bit for bit over a given sampling time interval and signaling a malfunction above said first threshold number of noncoincidences of bits in said streams and signaling a correction of said malfunction below said second threshold number of noncoincidences of bits in said streams.

25. The invention according to claim 24 wherein said demultiplexer delivers LS and IS rate data, where IS is greater than LS, from serial input data of higher rate HS, and wherein:

each said group transmits LS rate data in parallel form over a plurality of output channels or IS rate data in serial form;

said reception means comprises:

normally on-line LS receiver means for each group which transmits LS rate data, said LS receiver means demultiplexing IS rate data for parallel transmission of LS rate data on said channels;

normally on-line IS receiver means for each group which transmits IS rate data, said IS receiver means serially receiving and transmitting IS rate data;

normally on-line HS receiver means demultiplexing serial HS rate data from an input line for parallel transmission of IS rate data to said LS and IS receiver means;

said demultiplexer further comprising:

normally off-line standby LS receiver means in parallel with each of said normally on-line LS receiver means;

normally off-line standby IS receiver means in parallel with each of said normally on-line IS receiver means;

normally off-line standby HS receiver means in parallel with each of said normally on-line HS receiver means;

data protective switching means providing standby alternate data paths through said demultiplexer by switching normally on-line traffic through one or more of said standby LS, IS and HS receiver means;

said first input side of said monitor means is connected to the parallel outputs of said normally on-line and standby LS and IS receiver means;

said second input side of said monitor means is connected to the input to said normally on-line and standby HS receiver means;

said monitor demultiplexer means comprises:

first monitor demultiplexer means for demultiplexing HS rate data at said second input side to IS rate data;

second monitor demultiplexer means for demultiplexing IS rate data from said first monitor demultiplexer means to LS rate data;

said data comparator compares data from said first monitor demultiplexer means with data from said first input side when the latter receives IS rate data, and compares data from said second monitor demultiplexer means with data from said first input side when the latter receives LS rate data.

26. The invention according to claim 25 wherein said monitor means has a first threshold error rate indicative of a malfunction for each of said LS and IS rate bit streams and a respective lower threshold error rate indicative of a corrected malfunction for each of said LS and IS rate bit streams.

27. A demultiplexer with an improved monitoring system for the detection of malfunctions, comprising in combination:

a plurality of parallel data output groups;

reception means demultiplexing serial high speed input data for parallel transmission over said groups; and monitor means testing active data paths through said demultiplexer for short sampling time intervals for detection of malfunctions, and expanding to a long sampling time interval upon detection of a malfunction to verify said malfunction.

28. A demultiplexer with an improved monitoring system for the detection of malfunctions, comprising in combination:

a plurality of parallel data output groups;

reception means demultiplexing serial high speed input data for parallel transmission over said groups; and monitor means testing data paths through said demultiplexer for short sampling time intervals for detection of malfunctions, and expanding to a long sampling time interval upon detection of a malfunction to verify said malfunction;

wherein said monitor means has a first input side connected to the outputs of said data output groups and has a second input side connected to the input to said reception means for monitoring data path failures through said demultiplexer by comparing the latter's input and output, and wherein said monitor means comprises monitor demultiplexer means demultiplexing data at said second input side and a data comparator comparing a data stream A from said monitor demultiplexer means with a data stream B from said first input side and performing a bit error rate test between said data streams A and B by comparing said streams bit for bit over said short sampling time interval and preliminarily indicating a malfunction above a given threshold number of noncoincidences of bits in said streams, said comparator means responding to said preliminary indication to compare said streams bit for bit over said long sampling time interval and verifying said malfunction above another given threshold number of noncoincidences of bits in said streams to improve the statistical accuracy of said test.

29. The invention according to claim 28 wherein said second mentioned threshold number is greater than said first mentioned threshold number by a factor equal to the ratio of said long sampling time interval to said short sampling time interval.

30. The invention according to claim 28 wherein said demultiplexer delivers LS and IS rate data, where IS is greater than LS, from serial input data of higher rate HS, and wherein:

each said group transmits LS rate data in parallel form over a plurality of output channels or IS rate data in serial form;

said reception means comprises:

normally on-line LS receiver means for each group which transmits LS rate data, said LS receiver means demultiplexing serial IS rate data for parallel transmission of LS rate data on said channels;

normally on-line IS receiver means for each group which transmits IS rate data, said IS receiver means serially receiving and transmitting IS rate data;

normally off-line standby LS receiver means having an output in parallel with said plurality of parallel data output groups for protective by-pass switching around any said normally on-line LS receiver means;

normally off-line standby IS receiver means having an output in parallel with said plurality of parallel data output groups for protective by-pass switching around any said normally on-line IS receiver means;

normally on-line HS receiver means demultiplexing serial HS rate data from an input line for parallel transmission of IS rate data;

normally off-line standby HS receiver means having an input from said input line for protective by-pass switching around said normally on-line HS receiver means; and interconnection means connecting the outputs of said normally on-line HS receiver means to said normally on-line LS and IS receiver means and to said standby LS and IS receiver means, and connecting the outputs of said standby HS receiver means to said normally on-line LS and IS receiver means and to said standby LS and IS receiver means;

said first input side of said monitor means is connected to the parallel outputs of said normally on-line and standby LS and IS receiver means;

said second input side of said monitor means is connected to the input to said normally on-line and standby HS receiver means;

said monitor demultiplexer means comprises:
first monitor demultiplexer means for demultiplexing HS rate data from said second input side to IS rate data;
second monitor demultiplexer means for demultiplexing IS rate data from said first monitor demultiplexer means to LS rate data;
said data comparator compares data from said first monitor demultiplexer means with data from said first input side when the latter receives IS rate data, and compares data from said second monitor demultiplexer means with data from said first input side when the latter receives LS rate data.

31. The invention according to claim 30 wherein said monitor means has a variable window for counting noncoincidences of bits during short and long sampling time intervals for both LS and IS rate bit streams.

32. A demultiplexer with an improved monitoring system for the detection of malfunctions, comprising in combination:
a plurality of parallel data output groups;
reception means demultiplexing serial high speed data for parallel transmission over said groups; and
monitor means testing active data paths through said demultiplexer for detection of malfunctions, said monitor means having a first input side connected to the output of said demultiplexer and a second input side connected to the input to said demultiplexer, and including signal conversion means delivering a data stream A from said second input side and a data stream B from said first input side, and comprising a data comparator for comparing data streams A and B bit for bit, said monitor means including user selectable threshold means for adjustably setting the data path error rate indicative of a malfunction.

33. A demultiplexer with an improved monitoring system for the detection of malfunctions, comprising in combination:
a plurality of parallel data output groups;
reception means demultiplexing serial high speed data for parallel transmission over said groups; and
monitor means testing data paths through said demultiplexer for detection of malfunctions, said monitor means having a first input side connected to the output of said demultiplexer and a second input side connected to the input to said demultiplexer, and including signal conversion means delivering a data stream A from said second input side and a data stream B from said first input side, and comprising a data comparator for comparing data streams A and B bit for bit, said monitor means including user selectable threshold means for adjustably setting the data path error rate indicative of a malfunction;
and wherein said monitor means comprises monitor demultiplexer means for demultiplexing data at said second input side for delivery as data stream A, and wherein said data comparator performs a bit-error-rate test between data streams A and B by comparing said streams bit for bit over a given sampling time interval and signaling a malfunction above said adjustable threshold number of noncoincidences of bits in said stream.

34. A demultiplexer with an improved monitoring system for the detection of malfunctions, comprising in combination:
a plurality of parallel data output groups;
reception means demultiplexing serial high speed input data for parallel transmission over said groups; and
monitor means testing active data paths through said demultiplexer for detection of malfunctions in said demultiplexer, and comprising:
means having a first threshold error rate indicative of a malfunction and a second lower threshold error rate indicative of a corrected malfunction; and
variable window means testing data paths through said demultiplexer for short sampling time intervals for detection of malfunctions, and expanding to a long sampling time interval upon detection of a malfunction to verify said malfunction to a higher degree of statistical accuracy.

35. A demultiplexer with an improved monitoring system for the detection of malfunctions, comprising in combination:
a plurality of parallel data output groups;
reception means demultiplexing serial high speed input data for parallel transmission over said groups; and
monitor means testing data paths through said demultiplexer for detection of malfunctions in said demultiplexer, and comprising:
means having a first threshold error rate indicative of a malfunction and a second lower threshold error rate indicative of a corrected malfunction; and
variable window means testing data paths through said demultiplexer for short sampling time intervals for detection of malfunctions, and expanding to a long sampling time interval upon detection of a malfunction to verify said malfunction to a higher degree of statistical accuracy;
and wherein said monitor means further comprises user selectable threshold means for adjustably setting the data path error rate indicative of a malfunction.

36. A demultiplexer with an improved monitoring system for the detection of malfunctions, comprising in combination:
a plurality of parallel data output groups;
reception means demultiplexing serial high speed input data for parallel transmission over said groups; and
monitor means testing active data paths through said demultiplexer for detection of malfunctions in said demultiplexer, said monitor means having a first input side connected to the outputs of said data output groups and having a second input side connected to the input to said reception means for monitoring data path failures through said demultiplexer by comparing the latter's input and output, said monitor means comprising:
signal conversion means deriving identical rate data streams A and B from said second and first input sides, respectively;

a data comparator comparing data streams A and B; and means performing a bit error rate test between data streams A and B over a selected sampling time interval according to the data rate of streams A and B.

37. A demultiplexer with an improved monitoring system for the detection of malfunctions, comprising in combination:

a plurality of parallel data output groups;

reception means demultiplexing serial high speed input data for parallel transmission over said groups; and monitor means testing data paths through said demultiplexer for detection of malfunctions in said demultiplexer, said monitor means having a first input side connected to the outputs of said data output groups and having a second input side connected to the input to said reception means for monitoring data path failures through said demultiplexer by comparing the latter's input and output, said monitor means comprising:

signal conversion means deriving identical rate data streams A and B from said second and first input sides, respectively;

a data comparator comparing data streams A and B; and means performing a bit error rate test between data streams A and B over a selected sampling time interval according to the data rate of streams A and B;

wherein said means for performing a bit error rate test expands said sampling time interval in response to a decreased data rate of streams A and B, and contracts said sampling time interval in response to an increased data rate of streams A and B.

38. The invention according to claim 37 wherein said demultiplexer delivers LS and IS rate data, where IS is greater than LS, from serial input data of higher rate HS, and wherein:

each said group transmits LS rate data in parallel form over a plurality of output channels, or IS rate data in serial form;

said reception means comprises:

LS receiver means for each group which transmits LS rate data, said LS receiver means demultiplexing serial IS rate data for parallel transmission of LS rate data on said channels;

IS receiver means for each group which transmits IS rate data, said IS receiver means serially receiving and transmitting IS rate data; and HS receiver means demultiplexing serial HS rate data from an input line for parallel transmission of IS rate data to said LS and IS receiver means;

said first input side of said monitor means is connected to the parallel outputs of said LS and IS receiver means;

said second input side of said monitor means is connected to the input to said HS receiver means;

said monitor means includes:

first monitor demultiplexer means for demultiplexing HS rate data at said second input side to IS rate data; and second monitor demultiplexer means for demultiplexing IS rate data from said first monitor demultiplexer means to LS rate data;

said data comparator compares data from said first monitor demultiplexer means as data stream A with data from said first input side as data stream B when the latter receives IS rate data, and compares data from said second monitor demultiplexer means as data stream A with data from said first input side as data stream B when the latter receives LS rate data; and said means performing a bit error rate test performs such test over a first given sampling time interval for LS rate data streams A and B, and over a second, shorter, given sampling time interval for IS rate data streams A and B.

39. The invention according to claim 38 wherein:

said data comparator comprises:

resync means synchronizing data streams A and B bit for bit;

error detector means connected to the output of said resync means for detecting bit errors between data streams A and B; and sync control means providing a sync signal upon synchronization of data streams A and B; and said means performing a bit error rate test starts said sampling time interval in response to said sync signal.

40. The invention according to claim 39 wherein:

said data comparator comprises error counter means for counting bit errors detected by said error detector means; and said means performing a bit error rate test reads the count in said error counter means at the end of said sampling time interval.

41. A demultiplexer with an improved monitoring system for the detection of malfunctions, comprising in combination:

a plurality of parallel data output groups;

reception means demultiplexing serial high speed data for parallel transmission over said groups;

monitor means testing data paths through said demultiplexer for detection of malfunctions, said monitor means having a first input side connected to the input to said demultiplexer and a second input side connected to the input to said demultiplexer, and including signal conversion means deriving a data stream A from said second input side and a data stream B from said first input side, and including a data comparator for comparing data streams A and B;

said data comparator comprising:

selectable delay means for delaying data stream B;

elastic buffer means for shifting data stream A;

resync means for receiving data stream B from said selectable delay means and data stream A from said elastic buffer means, and delivering synchronized bit streams A and B;

error detector means connected to the output of said resync means for detecting bit errors between data streams A and B; and error counter means for counting bit errors detected by said error detector means.

42. The invention according to claim 41 wherein said data comparator further comprises:

slip counter enable means for driving said elastic buffer means to slip shift data stream A; and sync control means responsive to said error detector means for gating said slip counter enable means to drive said elastic buffer means until the passage of a predetermined consecutive number of non-error bits through said error detector means.

43. The invention according to claim 42 wherein said sync control means provides a sync signal after said passage of said predetermined consecutive number of non-error bits through said error detector means and disables such slip counter enable means and enables said error counter means.

44. The invention according to claim 43 wherein said demultiplexer delivers LS and IS rate data, where IS is greater than LS, from serial input data of higher rate HS, and wherein:

each said group transmits LS rate data in parallel form over a plurality of output channels or IS rate data in serial form;

said reception means comprises:

normally on-line LS receiver means for each group which transmits LS rate data, said LS receiver means demultiplexing serial IS rate data for parallel transmission of LS rate data on said channels;

normally on-line IS receiver means for each group which transmits IS rate data, said IS receiver means serially receiving and transmitting IS rate data;

normally off-line standby LS receiver means having an output in parallel with said plurality of parallel data output groups for protective by-pass switching around any said normally on-line LS receiver means;

normally off-line standby IS receiver means having an output in parallel with said plurality of parallel data output groups for protective by-pass switching around any said normally on-line IS receiver means;

normally on-line HS receiver means demultiplexing serial HS rate data from an input line for parallel transmission of IS rate data;

normally off-line standby HS receiver means having an input from said input line for protective by-pass switching around said normally on-line HS receiver means; and interconnection means connecting the outputs of said normally on-line HS receiver means to said normally on-line LS and IS receiver means and to said standby LS and IS receiver means, and connecting the outputs of said standby HS receiver means to said normally on-line LS and IS receiver means and to said standby LS and IS receiver means;

said first input side of said monitor means is connected to the parallel outputs of said normally on-line and standby LS and IS receiver means;

said second input side of said monitor means is connected to the input to said normally on-line and standby HS receiver means;

said monitor demultiplexer means comprises:

first monitor demultiplexer means for demultiplexing HS rate data at said second input side to IS rate data;

second monitor demultiplexer means for demultiplexing IS rate data from said first monitor demultiplexer means to LS rate data;

said data comparator compares data from said first monitor demultiplexer means with data from said first input side when the latter receives IS rate data, and compares data from said second monitor demultiplexer means with data from said first input side when the latter receives LS rate data.

45. A muldem comprising:

a plurality of parallel data input transmission groups;

a plurality of parallel data output reception groups;

transmission means for multiplexing said input transmission groups for serial transmission of high speed data;

receiver means for demultiplexing serial high speed data for parallel transmission over said output reception groups;

monitor means for testing data paths through said muldem for detection of malfunctions;

said monitor means having a first input side connected to the inputs to said data input transmission groups and to the outputs of said data output reception groups, and having a second input side connected to the output of said transmission means and to the input to said receiver means;

said monitor means including signal conversion means for delivering identical rate data streams A and B from said second input side and said first input side, respectively;

said monitor means also including a data comparator for comparing data streams A and B bit for bit, said data comparator comprising:

fixed delay means for delaying data stream A by a given amount, long enough to ensure that data stream A will lag data stream B when a reception path is tested; and selectable delay means for variably delaying data stream B.

46. The invention according to claim 45 wherein said muldem multiplexes LS and IS rate data, where IS is greater than LS, for serial transmission of data at a higher rate HS, and delivers LS and IS rate data from serial input data of rate HS, and wherein:

each said input transmission group receives LS rate data in parallel form over a plurality of input transmission channels or IS rate data in serial form;

each said output reception group transmits LS rate data in parallel form over a plurality of output reception channels or IS rate data in serial form.

47. The invention according to claim 46 wherein said selectable delay means for variably delaying data stream B provides at least four different delays of data stream B, one each for monitored LS transmit, LS receive, IS transmit and IS receive.

48. The invention according to claim 45 wherein said data comparator further comprises:

resync means for receiving delayed data streams A and B and delivering synchronized bit streams A and B; and error detector means connected to the output of said resync means for detecting bit errors between data streams A and B.

49. The invention according to claim 48 wherein said data comparator further comprises:

elastic buffer means for shifting data stream A prior to delivery to said resync means;

slip counter enable means for driving said elastic buffer means to slip shift data stream A; and sync control means responsive to said error detector means for gating said slip counter enable means to drive said elastic buffer means until the passage of a predetermined consecutive number of non-error bits through said error detector means.

50. The invention according to claim 49 wherein said data comparator further comprises:

error detector means for counting bit errors detected by said error detector means;

and wherein said sync control means provides a sync signal after said passage of said predetermined consecutive number of non-error bits through said error detector means and disables said slip counter enable means and enables said error counter means.

51. The invention according to claim 50 wherein said monitor means includes user selectable threshold means for adjustably setting the data path error rate indicative of a malfunction.

52. The invention according to claim 51 wherein said monitor means comprises monitor demultiplexer means for demultiplexing data at said second input side for delivery as data stream A, and wherein said data comparator performs a bit-error-rate test between data streams A and B by comparing said streams bit for bit over a given sampling time interval and signaling a malfunction above said adjustable threshold number of noncoincidences of bits in said streams.

53. The invention according to claim 52 wherein said muldem multiplexes LS and IS rate data, where IS is greater than LS, for serial transmission of data at a higher rate HS, and delivers LS and IS rate data from serial input data of rate HS, and wherein:
 each said input transmission group receives LS rate data in parallel form over a plurality of input transmission channels or IS rate data in serial form;
 each said output reception group transmits LS rate data in parallel form over a plurality of output reception channels or IS rate data in serial form;
 said transmission means comprises:
  normally on-line LS transmit means for each input transmission group which receives LS rate data, said LS transmit means multiplexing LS rate data on said input transmission channels for serial transmission of IS rate data;
  normally on-line IS transmit means for each input transmission group which receives IS rate data, said IS transmit means serially receiving and transmitting IS rate data;
  normally on-line HS transmit means multiplexing parallel IS rate data from said LS and IS transmit means for serial transmission of HS rate data over an output transmission line;
 said reception means comprises:
  normally on-line LS receiver means for each output reception group which transmits LS rate data, said LS receiver means demultiplexing serial IS rate data for parallel rate transmission of LS rate data on said output reception channels;
  normally on-line IS receiver means for each output reception group which transmits IS rate data, said IS receiver means serially receiving and transmitting IS rate data;
  normally on-line HS receiver means demultiplexing serial HS rate data from an input reception line for parallel transmission of IS rate data to said LS and IS receiver means;
 said multiplexer further comprising:
  normally off-line standby LS transmit means in parallel with each of said normally on-line LS transmit means;
  normally off-line standby IS transmit means in parallel with each of said normally on-line IS transmit means;
  normally off-line standby HS transmit means in parallel with each of said normally on-line HS transmit means;
  normally off-line standby LS receiver means in parallel with each of said normally on-line LS receiver means;
  normally off-line standby IS receiver means in parallel with each of said normally on-line IS receiver means;
  normally off-line standby HS receiver means in parallel with each of said normally on-line HS receiver means;
  data protective switching means providing standby alternate data paths through said muldem by switching normally on-line traffic through one or more of said standby LS, IS and HS transmit and receiver means;
 said monitor demultiplexer means comprises:
  first monitor demultiplexer means for demultiplexing HS rate data from said second input side to IS rate data;
  second monitor demultiplexer means for demultiplexing IS rate data from said first monitor demultiplexer means to LS rate data;
 said data comparator compares data from said first monitor demultiplexer means with data from said first input side when the latter receives IS rate data, and compares data from said second monitor demultiplexer means with data from said first input side when the latter receives LS rate data.

54. A muldem with an improved monitoring system for the detection of malfunctions, comprising in combination:
 a plurality of parallel data input transmission groups;
 transmission means multiplexing said data input transmission groups for serial transmission of high speed data;
 a plurality of parallel data output groups;
 reception means demultiplexing serial high speed input data for parallel transmission over said output reception groups; and
 monitor means testing active data paths through said muldem for detection of malfunctions in said muldem, said monitor means having a first threshold error rate indicative of a malfunction and a second, lower threshold error rate indicative of a corrected malfunction.

55. A muldem with an improved monitoring system for the detection of malfunctions, comprising in combination:
 a plurality of parallel data input transmission groups;
 transmission means multiplexing said data input transmission groups for serial transmission of high speed data;
 a plurality of parallel data output groups;
 reception means demultiplexing serial high speed input data for parallel transmission over said output reception groups; and
 monitor means testing data paths through said muldem for detection of malfunctions in said muldem, said monitor means having a first threshold error rate indicative of a malfunction and a second, lower threshold error rate indicative of a corrected malfunction;
 wherein said monitor means has a first input side connected to the inputs to said data input transmission groups and to the outputs of said data output reception groups, and has a second input side connected to the output of said transmission means and to the input to said reception means for monitoring data path failures through said muldem by comparing the latter's input and output, and wherein said monitor means comprises monitor demultiplexer means demultiplexing data at said second input side, and a data comparator comparing a data stream A from said monitor demultiplexer means with a data stream B from said first input side and performing a bit error rate test between said data streams A and B by comparing said streams bit for bit over a given sampling time interval and signaling a malfunction above said first threshold number of noncoincidences of bits in said streams and signaling a correction of said malfunction below said second threshold number of noncoincidences of bits in said streams.

56. The invention according to claim 55 wherein said muldem multiplexes LS and IS rate data, where IS is greater than LS, for serial transmission of data at a yet higher rate HS, and delivers LS and IS rate data from serial input data of rate HS, and wherein:

each said input transmission group receives LS rate data in parallel form over a plurality of input transmission channels, or IS rate data in serial form;

each said output reception group transmits LS rate data in parallel form over a plurality of output reception channels, or IS rate data in serial form;

said transmission means comprises:

normally on-line LS transmit means for each input transmission group which receives LS rate data, said LS transmit means multiplexing LS rate data on said input transmission channels for serial transmission of IS rate data;

normally on-line IS transmit means for each input transmission group which receives IS rate data, said IS transmit means serially receiving and transmitting IS rate data;

normally off-line standby LS transmit means having an input in parallel with said plurality of parallel data input transmission groups for protective bypass switching around any said normally on-line LS transmit means;

normally off-line standby IS transmit means having an input in parallel with said plurality of parallel data input transmission groups for protective bypass switching around any said normally on-line IS transmit means;

normally on-line HS transmit means multiplexing parallel IS rate data for serial transmission of HS rate data over an output transmission line;

normally off-line standby HS transmit means having an output to said output transmission line for protective bypass switching around said normally on-line HS transmit means; and interconnection means connecting the outputs of said normally on-line LS and IS transmit means to said normally on-line HS transmit means and to said standby HS transmit means, and connecting the outputs of said standby LS and IS transmit means to said normally on-line HS transmit means and to said standby HS transmit means;

said reception means comprises:

normally on-line LS receiver means for each output reception group which transmits LS rate data, said LS receiver means demultiplexing serial IS rate data for parallel transmission of LS rate data on said output reception channel;

normally on-line IS receiver means for each output reception group which transmits IS rate data, said IS receiver means serially receiving and transmitting IS rate data;

normally off-line standby LS receiver means having an output in parallel with said plurality of parallel data output reception groups for protective bypass switching around any said normally on-line LS receiver means;

normally off-line standby IS receiver means having an output in parallel with said plurality of parallel data output reception groups for protective bypass switching around any said normally on-line IS receiver means;

normally on-line HS receiver means demultiplexing serial HS rate data from an input reception line for parallel transmission of IS rate data;

normally off-line standby HS receiver means having an input from said input reception line for protective bypass switching around said normally on-line HS receiver means; and interconnection means connecting the outputs of said normally on-line HS receiver means to said normally on-line LS and IS receiver means and to said standby LS and IS receiver means, and connecting the outputs of said standby HS receiver means to said normally on-line LS and IS receiver means and to said standby LS and IS receiver means;

said first input side of said monitor means is connected to the parallel inputs to said normally on-line and standby LS and IS transmit means and to the parallel outputs of said normally on-line and standby LS and IS receiver means;

said second input side of said monitor means is connected to the outputs of said normally on-line and standby HS transmit means and to the input to said normally on-line and standby HS receiver means;

said monitor demultiplexer means comprises:

first monitor demultiplexer means for demultiplexing HS rate data from said second input side to IS rate data;

second monitor demultiplexer means for demultiplexing IS rate data from said first monitor demultiplexer means to LS rate data;

said data comparator compares data from said first monitor demultiplexer means with data from said first input side when the latter receives IS rate data, and compares data from said second monitor demultiplexer means with data from said first input side when the latter receives LS rate data.

57. The invention according to claim 56 wherein said monitor means has a first threshold error rate indicative of a malfunction for each of said LS and IS rate bit streams and a respective lower threshold error rate indicative of a corrected malfunction for each of said LS and IS rate bit streams.

58. A muldem with an improved monitoring system for the detection of malfunctions, comprising in combination:

a plurality of parallel data input transmission groups;

transmission means multiplexing said data input transmission groups for serial transmission of high speed data;

a plurality of parallel data output reception groups;

reception means demultiplexing serial high speed input data for parallel transmission over said output reception groups; and monitor means testing active data paths through said muldem for short sampling time intervals for detection of malfunctions, and expanding to a long sampling time interval upon detection of a malfunction to verify said malfunction.

59. A muldem with an improved monitoring system for the detection of malfunctions, comprising in combination:
a plurality of parallel data input transmission groups;
transmission means multiplexing said data input transmission groups for serial transmission of high speed data;
a plurality of parallel data output reception groups;
reception means demultiplexing serial high speed input data for parallel transmission over said output reception groups; and
monitor means testing data paths through said muldem for short sampling time intervals for detection of malfunctions, and expanding to a long sampling time interval upon detection of a malfunction to verify said malfunction;
wherein said monitor means has a first input side connected to the inputs to said data input transmission groups and to the outputs of said data output reception groups and has a second input side connected to the output of said transmission means and to the input to said reception means for monitoring data path failures through said muldem by comparing the latter's input and output, and wherein said monitor means comprises monitor demultiplexer means demultiplexing data at said second input side and a data comparator comparing a data stream A from said monitor demultiplexer means with a data stream B from said first input side and performing a bit-error-rate test between said data streams A and B by comparing said stream bit for bit over said short sampling time interval and preliminarily indicating a malfunction above a given number of non-coincidences of bits in said streams, said comparator means responding to said preliminary indication to compare said streams bit for bit over said long sampling time interval and verifying said malfunction above another given threshold number of non-coincidences of bits in said streams to improve the statistical accuracy of said test.

60. The invention according to claim 59 wherein said second mentioned threshold number is greater than said first mentioned threshold number by a factor equal to the ratio of said long sampling time interval to said short sampling time interval.

61. The invention according to claim 59 wherein said muldem multiplexes LS and IS rate data, where IS is greater than LS, for serial transmission of data at a yet higher rate HS, and delivers LS and IS rate data from serial input data of rate HS, and wherein:
each said input transmission group receives LS rate data in parallel form over a plurality of input transmission channels or IS rate data in serial form;
each said output reception group transmits LS rate data in parallel form over a plurality of output reception channels or IS rate data in serial form;
said transmission means comprises:
normally on-line LS transmit means for each input transmission group which receives LS rate data, said LS transmit means multiplexing LS rate data on said input transmission channels for serial transmission of IS rate data;
normally on-line IS transmit means for each input transmission group which receives IS rate data, said IS transmit means serially receiving and transmitting IS rate data;
normally off-line standby LS transmit means having an input in parallel with said plurality of parallel data input transmission groups for protective bypass switching around any said normally on-line LS transmit means;
normally off-line standby IS transmit means having an input in parallel with said plurality of parallel data input transmission groups for protective bypass switching around any said normally on-line IS transmit means;
normally on-line HS transmit means multiplexing parallel IS rate data for serial transmission of HS rate data over an output transmission line;
normally off-line standby HS transmit means having an output to said output transmission line for protective bypass switching around said normally on-line HS transmit means; and
interconnection means connecting the outputs of said normally on-line LS and IS transmit means to said normally on-line HS transmit means and to said standby HS transmit means, and connecting the outputs of said standby LS and IS transmit means to said normally on-line HS transmit means and to said standby HS transmit means;
said reception means comprises:
normally on-line LS receiver means for each output reception group which transmits LS rate data, said LS receiver means demultiplexing serial IS rate data for parallel transmission of LS rate data on said output reception channels;
normally on-line IS receiver means for each output reception group which transmits IS rate data, said IS receiver means serially receiving and transmitting IS rate data;
normally off-line standby LS receiver means having an output in parallel with said plurality of parallel data output reception groups for protective bypass switching around any said normally on-line LS receiver means;
normally on-line HS receiver means demultiplexing serial HS rate data from an input reception line for parallel transmission of IS rate data;
normally off-line standby HS receiver means having an input from said input reception line for protective bypass switching around said normally on-line HS receiver means; and
interconnection means connecting the outputs of said normally on-line HS receiver means to said normally on-line LS and IS receiver means and to said standby LS and IS receiver means, and connecting the outputs of said standby HS receiver means to said normally on-line LS and IS receiver means and to said standby LS and IS receiver means;
said first input side of said monitor means is connected to the parallel inputs to said normally on-line and standby LS and IS transmit means and to the parallel outputs of said normally on-line and standby LS and IS receiver means;
said second input side of said monitor means is connected to the outputs of said normally on-line and standby HS transmit means and to the input to said normally on-line and standby HS receiver means;
said monitor demultiplexer means comprises:

first monitor demultiplexer means for demultiplexing HS rate data from said second input side to IS rate data;

second monitor demultiplexer means for demultiplexing IS rate data from said first monitor demultiplexer means to IS rate data;

said data comparator compares data from said first monitor demultiplexer means with data from said first input side when the latter receives IS rate data, and compares data from said second monitor demultiplexer means with data from said first input side when the latter receives LS rate data.

62. The invention according to claim 61 wherein said comparator means has a variable window for counting noncoincidences of bits during short and long sampling time intervals for both LS and IS rate bit streams.

63. A muldem with an improved monitoring system for the detection of malfunctions, comprising in combination:

a plurality of parallel data input transmission groups;

transmission means multiplexing said data input transmission groups for serial transmission of high speed data;

a plurality of parallel data output reception groups;

reception means demultiplexing serial high speed input data for parallel transmission over said data output reception groups; and monitor means testing active data paths through said muldem for detection of malfunctions in said muldem, and comprising:

means having a first threshold error rate indicative of a malfunction and a second lower threshold error rate indicative of a corrected malfunction; and variable window means testing data paths through said muldem for short sampling time intervals for detection of malfunctions, and expanding to a long sampling time interval upon detection of a malfunction to verify said malfunction to a higher degree of statistical accuracy.

64. A muldem with an improved monitoring system for the detection of malfunctions, comprising in combination:

a plurality of parallel data input transmission groups;

transmission means multiplexing said data input transmission groups for serial transmission of high speed data;

a plurality of parallel data output reception groups;

reception means demultiplexing serial high speed input data for parallel transmission over said data output reception groups; and monitor means testing data paths through said muldem for detection of malfunctions in said muldem, and comprising:

means having a first threshold error rate indicative of a malfunction and a second lower threshold error rate indicative of a corrected malfunction; and variable window means testing data paths through said muldem for short sampling time intervals for detection of malfunctions, and expanding to a long sampling time interval upon detection of a malfunction to verify said malfunction to a higher degree of statistical accuracy;

and wherein said monitor means further comprises user selectable threshold means for adjustably setting the data path error rate indicative of a malfunction.

65. A muldem with an improved monitoring system for the detection of malfunctions, comprising in combination:

a plurality of parallel data input transmission groups;

transmission means multiplexing said data input transmission groups for serial transmission of high speed data;

a plurality of parallel data output groups;

reception means demultiplexing serial high speed data input data for parallel transmission over said output reception groups; and monitor means testing active data paths through said muldem for detection of malfunctions in said muldem, said monitor means having a first input side connected to the inputs to said data input transmission groups and to the outputs of said data output reception groups, and having a second input side connected to the output of said transmission means and to the input to said reception means for monitoring data path failures through said muldem by comparing the latter's input and output, said monitor means comprising:

signal conversion means deriving identical rate data streams A and B from said second and first input sides, respectively;

a data comparator comparing data streams A and B; and means performing a bit error rate test between data streams A and B over a selected sampling time interval according to the data rate of streams A and B.

66. A muldem with an improved monitoring system for the detection of malfunctions, comprising in combination:

a plurality of parallel data input transmission groups;

transmission means multiplexing said data input transmission groups for serial transmission of high speed data;

a plurality of parallel data output groups;

reception means demultiplexing serial high speed data input data for parallel transmission over said output reception groups; and monitor means testing data paths through said muldem for detection of malfunctions in said muldem, said monitor means having a first input side connected to the inputs to said data input transmission groups and to the outputs of said data output reception groups, and having a second input side connected to the output of said transmission means and to the input to said reception means for monitoring data path failures through said muldem by comparing the latter's input and output, said monitor means comprising:

signal conversion means deriving identical rate data streams A and B from said second and first input sides, respectively;

a data comparator comparing data streams A and B; and means performing a bit error rate test between data streams A and B over a selected sampling time interval according to the data rate of streams A and B;

and wherein said means for performing a bit error rate test expands said sampling time interval in response to a decreased date rate of streams A and B, and contracts said sampling time interval in response to an increased data rate of streams A and B.

67. A muldem with an improved monitoring system for the detection of malfunctions, comprising in combination:

a plurality of parallel data input transmission groups;

transmission means mutiplexing said data input transmission groups for serial transmission of high speed data;

a plurality of parallel data output groups;

reception means demultiplexing serial high speed data input data for parallel transmission over said output reception groups; and monitor means testing data paths through said muldem for detection of malfunctions in said muldem, said monitor means having a first input side connected to the inputs to said data input transmission groups and to the outputs of said data output reception groups, and having a second input side connected to the output of said transmission means and to the input to said reception means for monitoring data path failures through said muldem by comparing the latter's input and output, said monitor means comprising:

signal conversion means deriving identical rate data streams A and B from said second and first input sides, respectively;

a data comparator comparing data streams A and B; and means performing a bit error rate test between data streams A and B over a selected sampling time interval according to the data rate of streams A and B;

wherein said muldem multiplexes LS and IS rate data, where IS is greater than LS, for serial transmission of data at a yet higher rate HS, and delivers LS and IS rate data from serial input data of rate HS, and wherein:

each said input transmission group receives LS rate data in parallel form over a plurality of input transmission channels, or IS rate data in serial form;

each said output reception group transmits LS rate data in parallel form over a plurality of output reception channels, or IS rate data in serial form;

said transmission means comprises:

LS transmit means for each input transmission group which receives LS rate data, said LS transmit means multiplexing LS rate data on said input transmission channels for serial transmission of IS rate data;

IS transmit means for each input transmission group which receives IS rate data, said IS transmit means serially receiving and transmitting IS rate data; and HS transmit means multiplexing parallel IS rate data from said LS and IS transmit means for serial transmission of HS rate data over an output transmission line;

said reception means comprises:

LS receiver means for each output reception group which transmits LS rate data, said LS receiver means demultiplexing serial IS rate data for parallel transmission of LS rate data on an output reception channel;

IS receiver means for each output reception group which transmits IS rate data, said IS receiver means serially receiving and transmitting IS rate data; and HS receiver means demultiplexing serial HS rate data from an input reception line for parallel transmission of IS rate data to said LS and IS receiver means;

said first input side of said monitor means is connected to the parallel inputs to said LS and IS transmit means and to the parallel outputs of said LS and IS receiver means;

said second input side of said monitor means is connected to the output of said HS transmit means and to the input to said HS receiver means;

said monitor means includes:

first monitor demultiplexer means for demultiplexing HS rate data from said second input side to IS rate data; and second monitor demultiplexer means for demultiplexing IS rate data from said first monitor demultiplexer means to LS rate data;

said data comparator compares data from said first monitor demultiplexer means as data stream A with data from said first input side as data stream B when the latter receives IS rate data, and compares data from said second monitor demultiplexer means as data stream A with data from said first input side as data stream B when the latter receives LS rate data; and said means performing a bit error rate test performs such test over a first given sampling time interval for LS rate data streams A and B, and over a second, shorter, given sampling time interval for IS rate data streams A and B.

68. The invention according to claim 67 wherein: said data comparator comprises:

resync means synchronizing data streams A and B bit for bit;

error detector means connected to the output of said resync means for detecting bit errors between data streams A and B; and sync control means providing a sync signal upon synchronization of data streams A and B; and said means performing a bit error rate test starts said sampling time interval in response to said sync signal.

69. The invention according to claim 68 wherein:

said data comparator comprises error counter means for counting bit errors detected by said error detector means; and said means performing a bit error rate test reads the count in said error counter means at the end of said sampling time interval.

70. A muldem with an improved monitoring system for the detection of malfunctions, comprising in combination:

a plurality of parallel data input transmission groups;

transmission means multiplexing said data input transmission groups for serial transmission of high speed data;

a plurality of parallel data output groups;

reception means demultiplexing serial high speed data input data for parallel transmission over said output reception groups; and monitor means testing data paths through said muldem for detection of malfunctions in said muldem, said monitor means having a first input side connected to the inputs to said data input transmission groups and to the outputs of said data output reception groups, and having a second input side connected to the output of said transmission means and to the input to said reception means for monitoring data path failures through said muldem by comparing the latter's input and output, said monitor means comprising:

signal conversion means deriving identical rate data streams A and B from said second and first input sides, respectively;

a data comparator comparing data streams A and B; and means performing a bit error rate test between data streams A and B over a selected sampling time interval according to the data rate of streams A and B;

wherein said muldem multiplexes LS and IS rate data, where IS is greater than LS, for serial transmission of data at a higher rate HS, and delivers LS and IS rate data from serial input data of rate HS, and wherein:

each said input transmission group receives LS rate data in parallel form over a plurality of input transmission channels, or IS rate data in serial form;

each said output reception group transmits LS rate data in parallel form over a plurality of output reception channels, or IS rate data in serial form;

said means performing a bit error rate test performs such test over a first short sampling time interval for IS data rate streams A and B, and includes means expanding to a first long sampling time interval upon detection of a malfunction to verify said malfunction to a higher degree of statistical accuracy;

said means performing a bit error rate test performs such test over a second short sampling time interval, longer said first mentioned short sampling time interval, for LS data rate streams A and B, and expands to a second long sampling time interval, longer said first mentioned long sampling time interval, upon detection of a malfunction to verify said malfunction to a higher degree of statistical accuracy.

71. The invention according to claim 70 wherein said monitor means includes means having a first threshold error rate indicative of a malfunction and a second lower threshold error rate indicative of a corrected malfunction.

* * * * *